(12) United States Patent
Engel et al.

(10) Patent No.: US 9,835,890 B2
(45) Date of Patent: Dec. 5, 2017

(54) LIQUID CRYSTAL DISPLAY

(71) Applicant: Merck Patent GmbH, Darmstadt (DE)

(72) Inventors: Martin Engel, Darmstadt (DE); Helmut Haensel, Muehltal (DE); Nico John, Gross-Gerau (DE)

(73) Assignee: MERCK PATENG GMBH, Darmstadt (DE)

( * ) Notice: Subject to any disclaimer, the term of this patent is extended or adjusted under 35 U.S.C. 154(b) by 96 days.

(21) Appl. No.: 14/600,146

(22) Filed: Jan. 20, 2015

(65) Prior Publication Data
US 2015/0205158 A1 Jul. 23, 2015

(30) Foreign Application Priority Data
Jan. 21, 2014 (EP) .................... 14000204

(51) Int. Cl.
| | | |
|---|---|---|
| *C09K 19/00* | (2006.01) | |
| *G02F 1/1333* | (2006.01) | |
| *C09K 19/02* | (2006.01) | |
| *G02F 1/1341* | (2006.01) | |
| *C09K 19/04* | (2006.01) | |
| *C09K 19/12* | (2006.01) | |
| *C09K 19/30* | (2006.01) | |
| *G02F 1/1343* | (2006.01) | |
| *G02F 1/1337* | (2006.01) | |
| *G02F 1/137* | (2006.01) | |

(52) U.S. Cl.
CPC ........ *G02F 1/133365* (2013.01); *C09K 19/02* (2013.01); *G02F 1/1341* (2013.01); *G02F 1/134309* (2013.01); *G02F 1/134363* (2013.01); *C09K 2019/0448* (2013.01); *C09K 2019/122* (2013.01); *C09K 2019/301* (2013.01); *C09K 2019/3004* (2013.01); *C09K 2019/3016* (2013.01); *G02F 1/133723* (2013.01); *G02F 2001/13712* (2013.01); *G02F 2001/13775* (2013.01); *G02F 2001/134372* (2013.01); *Y10T 428/10* (2015.01)

(58) Field of Classification Search
CPC ........ G02F 1/133365; G02F 1/133723; G02F 1/134309; G02F 1/134363; G02F 2001/134372; G02F 2001/13712; G02F 2001/13775; G02F 2001/133738; G02F 2001/133345; C09K 19/02; C09K 19/20; C09K 19/12; C09K 2019/0448; C09K 2019/122; C09K 2019/3004; C09K 2019/301; C09K 2019/3016; Y10T 428/10; Y10T 428/1005; Y10T 428/1018

USPC .................. 428/1.1, 1.2, 1.26; 349/123, 132; 568/659, 660; 252/299.4, 299.61, 252/299.63–299.66

See application file for complete search history.

(56) References Cited

U.S. PATENT DOCUMENTS

| | | | |
|---|---|---|---|
| 2004/0011996 A1* | 1/2004 | Klasen-Memmer ... | C09K 19/42 252/299.63 |
| 2009/0231530 A1* | 9/2009 | Nishimura ............ | G02F 1/1323 349/129 |
| 2013/0183460 A1 | 7/2013 | Klasen-Memmer et al. | |
| 2013/0308081 A1 | 11/2013 | Taugerbeck et al. | |
| 2014/0008570 A1 | 1/2014 | Taugerbeck et al. | |
| 2014/0010973 A1 | 1/2014 | Gotoh et al. | |
| 2014/0028964 A1 | 1/2014 | Klasen-Memmer et al. | |
| 2015/0036095 A1 | 2/2015 | Jeong et al. | |

FOREIGN PATENT DOCUMENTS

| | | |
|---|---|---|
| DE | 102012004871 A1 | 10/2012 |
| EP | 2607451 A1 | 6/2013 |
| EP | 2682448 A2 | 1/2014 |
| WO | 2012097858 A1 | 7/2012 |
| WO | 2013124040 A1 | 8/2013 |

OTHER PUBLICATIONS

European Search Report from European Patent Application No. EP14004362, dated May 15, 2015.

\* cited by examiner

*Primary Examiner* — Ruiyun Zhang
(74) *Attorney, Agent, or Firm* — Millen, White, Zelano, Branigan, P.C.

(57) ABSTRACT

The present invention relates to a liquid crystal (LC) display of the FFS type comprising a liquid crystal medium with negative dielectric anisotropy and a di- or multireactive polymerizable compound, and an alignment layer inducing planar alignment in the LC medium.

33 Claims, No Drawings

LIQUID CRYSTAL DISPLAY

The present invention relates to a liquid crystal (LC) display of the FFS type comprising a liquid crystal medium with negative dielectric anisotropy and a di- or multireactive polymerizable compound, and an alignment layer inducing planar alignment in the LC medium.

BACKGROUND OF THE INVENTION

The liquid crystal displays (LC displays) used at present are usually those of the TN ("twisted nematic") type. However, these have the disadvantage of a strong viewing-angle dependence of the contrast.

In addition, so-called VA ("vertically aligned") displays are known which have a broader viewing angle. The LC cell of a VA display contains a layer of an LC medium between two transparent electrodes, where the LC medium usually has a negative value of the dielectric (DC) anisotropy. In the switched-off state, the molecules of the LC layer are aligned perpendicular to the electrode surfaces (homeotropically) or have a tilted homeotropic alignment. On application of an electrical voltage to the two electrodes, a realignment of the LC molecules parallel to the electrode surfaces takes place.

Furthermore, so-called FFS ("fringe-field switching") displays have been reported (see, inter alia, S. H. Jung et al., Jpn. J. Appl. Phys., Volume 43, No. 3, 2004, 1028), which contain two electrodes on the same substrate, one of which structured in a comb-shaped manner and the other is unstructured. A strong, so-called "fringe field" is thereby generated, i.e. a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy, and an alignment layer, usually of polyimide, which provides planar alignment to the molecules of the LC medium.

FFS displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, as known from the prior art.

Furthermore, FFS displays have been disclosed (see S. H. Lee et al., Appl. Phys. Lett. 73(20), 1998, 2882-2883 and S. H. Lee et al., Liquid Crystals 39(9), 2012, 1141-1148), which have similar electrode design and layer thickness as FFS displays, but comprise a layer of an LC medium with negative dielectric anisotropy instead of an LC medium with positive dielectric anisotropy. The LC medium with negative dielectric anisotropy shows a more favorable director orientation that has less tilt and more twist orientation compared to the LC medium with positive dielectric anisotropy, as a result of which these displays have a higher transmission.

However, the use of LC media with negative dielectric anisotropy in FFS displays has also several drawbacks. For example, they have a significantly lower reliability compared to LC media with positive dielectric anisotropy.

The term "reliability" as used hereinafter means the quality of the performance of the display during time and with different stress loads, such as light load, temperature, humidity, voltage, and comprises display effects such as image sticking (area and line image sticking), mura, yogore. etc. which are known to the skilled person in the field of LC displays. As a standard parameter for categorizing the reliability usually the voltage holding ration (VHR) value is used, which is a measure for maintaining a constant electrical voltage in a test display. The higher the VHR value, the better the reliability of the medium The reduced reliability of an LC medium with negative dielectric anisotropy in an FFS display can be explained by an interaction of the LC molecules with the polyimide of the alignment layer, as a result of which ions are extracted from the polyimide alignment layer, and wherein LC molecules with negative dielectric anisotropy do more effectively extract such ions.

This results in new requirements for LC media to be used in FFS displays. In particular, the LC medium has to show a high reliability and a high VHR value after UV exposure. Further requirements are a high specific resistance, a large working-temperature range, short response times even at low temperatures, a low threshold voltage, a multiplicity of grey shades, high contrast and a broad viewing angle, and reduced image sticking.

Thus, in displays known from prior art often the undesired effect of so-called "image sticking" or "image burn" is observed, wherein the image produced in the LC display by temporary addressing of individual pixels still remains visible even after the electric field in these pixels has been switched off, or after other pixels have been addressed.

This "image sticking" can occur on the one hand if LC media having a low VHR are used. The UV component of daylight or the backlighting can cause undesired decomposition reactions of the LC molecules therein and thus initiate the production of ionic or free-radical impurities. These may accumulate, in particular, at the electrodes or the alignment layers, where they may reduce the effective applied voltage.

Another problem observed in prior art is that LC media for use in displays, including but not limited to FFS displays, do often exhibit high viscosities and, as a consequence, high switching times. In order to reduce the viscosity and switching time of the LC medium, it has been suggested in prior art to add LC compounds with an alkenyl group. However, it was observed that LC media containing alkenyl compounds often show a decrease of the reliability and stability, and a decrease of the VHR especially after exposure to UV radiation.

It is therefore an object of the present invention to provide improved LC media for use in FFS displays, in particular those of the UB-FFS mode, which do not exhibit the disadvantages described above or only do so to a small extent and have improved properties. A further object of the invention is to provide FFS displays with good transmission, high reliability, a VHR value especially after UV exposure, a high specific resistance, a large working-temperature range, short response times even at low temperatures, a low threshold voltage, a multiplicity of grey shades, high contrast and a broad viewing angle, and reduced image sticking.

Upon further study of the specification and appended claims, other objects, aspects and advantages of the invention will become apparent.

These objects are achieved in accordance with the present invention by providing an FFS display and LC media used therein as described and claimed hereinafter. In particular, the inventors of the present invention have found that the above objects can be achieved by using an LC medium comprising a di- or multireactive polymerizable compound as described hereinafter, and preferably comprising one or more alkenyl compounds, in a FFS display. It has also been found that when using such di- or multireactive compounds in an LC medium for use in an FFS display, surprisingly the reliability and the VHR value after UV exposure are higher, compared to an LC medium without a polymerizable compound.

Also, the use of an LC medium comprising a di- or multireactive polymerizable compound as described hereinafter allows to exploit the known advantages of alkenyl-containing LC media, like reduced viscosity and faster switching time, and at the same time leads to improved reliability and high VHR value especially after UV exposure.

SUMMARY OF THE INVENTION

The invention relates to a liquid crystal (LC) display of the Fringe Field Switching (FFS) mode, comprising two substrates, two electrodes provided on one of the substrates (and no electrodes provided on the other substrate), a layer of a liquid crystal (LC) medium that is located between the substrates, has negative dielectric anisotropy and comprises LC molecules and one or more polymerizable compounds having two or more polymerizable groups, the display further comprising an alignment layer provided on at least one of the substrates that is in contact with the LC medium and induces planar alignment of the LC molecules of the LC medium.

Preferably, the alignment layer comprises, very preferably consists of, a polyimide.

Preferably, one of the electrodes provided on the substrate has a comb-shaped structure and the other electrode preferably is unstructured.

Preferably, the polymerizable compounds have a liquid crystalline skeleton and are selected from reactive mesogens.

Preferably, the polymerizable compounds comprise at least three polymerizable groups, preferably selected from acrylate and methacrylate groups.

Preferably, the polymerizable groups of the polymerizable compounds are selected from acrylate and methacrylate groups.

The invention furthermore relates to an LC display as described above and below, wherein the polymerizable compounds are polymerized in the LC display.

The invention furthermore relates to a process for manufacturing an LC display of the FFS mode as described above and below, comprising the steps of filling an LC medium, which comprises one or more polymerizable compounds as described above and below, between the substrates of the display, and polymerizing the polymerizable compounds.

Definitions of Terms

The display as disclosed and claimed in this invention is hereinafter also referred to as display of the "Ultra Brightness FFS (UB-FFS)" mode.

The term "mesogenic group" as used herein is known to the person skilled in the art and described in the literature, and means a group which, due to the anisotropy of its attracting and repelling interactions, essentially contributes to causing a liquid crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behavior only after mixing with other compounds and/or after polymerization. Typical mesogenic groups are, for example, rigid rod- or disc-shaped units. An overview of the terms and definitions used in connection with mesogenic or LC compounds is given in Pure Appl. Chem. 73(5), 888 (2001) and C. Tschierske, G. Pelzl, S. Diele, Angew. Chem. 2004, 116, 6340-6368.

The term "spacer group", hereinafter also referred to as "Sp", is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. As used herein, the terms "spacer group" or "spacer" mean a flexible group, for example an alkylene group, which connects the mesogenic group and the polymerizable group(s) in a polymerizable mesogenic compound.

As used herein, the terms "reactive mesogen" and "RM" mean a compound containing one mesogenic group and one or more functional groups which are suitable for polymerization, the latter also being referred to as "polymerizable group" or "P".

The term "polymerizable compound" as used hereinafter, unless stated otherwise, means a polymerizable monomeric compound.

The term "polymerizable" as used hereinafter, unless stated otherwise, means polymerizable under the conditions used for the polymerization of compounds containing a group P or $P^{1-3}$, like the compounds of formula I or the polymerizable compounds or RMs as described above and below.

As used herein, the terms "low-molecular-weight compound" and "unpolymerizable compound" mean compounds, which are usually monomeric, that do not contain a functional group that is suitable for polymerization under the usual conditions known to the person skilled in the art, in particular under the conditions used for the polymerization of the compounds containing a group P or $P^{1-3}$, like the polymerizable compounds or RMs as described above and below.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

Above and below "organic group" denotes a carbon or hydrocarbon group.

Above and below,

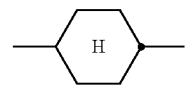

denotes a trans-1,4-cyclohexylene ring, and

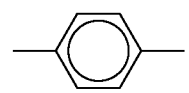

denotes a 1,4-phenylene ring.

"Carbon group" denotes a mono- or polyvalent organic group containing at least one carbon atom, where this either contains no further atoms (such as, for example, —C≡C—) or optionally contains one or more further atoms, such as, for example, N, O, S, B, P, Si, Se, As, Te or Ge (for example carbonyl, etc.). The term "hydrocarbon group" denotes a carbon group which additionally contains one or more H atoms and optionally one or more heteroatoms, such as, for example, N, O, S, B, P, Si, Se, As, Te or Ge.

"Halogen" denotes F, Cl, Br or I.

—CO—, —C(=O)— and —C(O)— denote a carbonyl group, i.e.

"Conjugated radical" or "conjugated group" denotes a radical or group which contains principally $sp^2$-hybridised (or possibly also sp-hybridized) carbon atoms, which may also be replaced by corresponding heteroatoms. In the simplest case, this means the alternating presence of double and single bonds. "Principally" in this connection means that naturally (non-randomly) occurring defects which result in conjugation interruptions do not devalue the term "conjugated". Furthermore, the term "conjugated" is likewise used in this application text if, for example, arylamine units or certain heterocycles (i.e. conjugation via N, O, P or S atoms) are located in the radical or group.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or fused rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18, C atoms, optionally substituted aryl or aryloxy having 6 to 40, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25, C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ allyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, or —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent $CH_2$ groups may each be replaced by —O—, —S—, —CO—, —CO—O—, —O—CO—, —O—CO—O— and in which one or more H atoms may each be replaced by fluorine, an optionally substituted aryl or aryloxy group having 6 to 40 C atoms, or an optionally substituted heteroaryl or heteroaryloxy group having 2 to 40 C atoms.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, vinyl, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Further preferred carbon and hydrocarbon groups are aryl and heteroaryl groups, which preferably contain from 3 to 20 ring atoms. The aryl and heteroaryl groups can be monocyclic, i.e., containing one ring, or polycyclic, i.e., containing two or more rings. A polycyclic aryl or heteroaryl group may contain fused rings (like for example in a naphthalene group) or covalently bonded rings (like for example in a biphenyl group), or both fused rings and covalently bonded rings. Heteroaryl groups contain one or more heteroatoms preferably selected from O, N, S and Se.

Particular preference is given to mono-, bi- or tricyclic aryl groups having 5 to 25 C atoms and mono-, bi- or tricyclic heteroaryl groups having 3 to 25 ring atoms, which optionally contain fused rings and are optionally substituted. Preference is furthermore given to 5-, 6- or 7-membered aryl and heteroaryl groups, in which, in addition, one or more CH groups may each be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, and 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquin-oline, acridine, phenothiazine, phenoxazine, benzopyridazine, benzopyrimi-dine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazo-thiophene, or combinations of these groups.

The aryl and heteroaryl groups mentioned above and below may also be substituted by alkyl, alkoxy, thioalkyl, fluorine, fluoroalkyl or further aryl or heteroaryl groups.

Further preferred carbon and hydrocarbon groups are non-aromatic carbocyclic or heterocyclic groups, which preferably contain from 3 to 20 ring atoms. The carbocyclic and heterocyclic groups may contain saturated rings, i.e., rings that are composed exclusively of single bonds, and/or partially unsaturated rings, i.e., rings which are composed of single bonds and multiple bonds like, e.g., double bonds. Heterocyclic groups contain one or more hetero atoms preferably selected from Si, O, N, S and Se.

The non-aromatic carbocyclic and heterocyclic groups can be monocyclic, i.e., containing only one ring, or polycyclic, i.e., containing two or more rings. A polycyclic carbocyclic or heterocyclic group may contain fused rings (like for example in decahydronaphthalene or bicyclo[2.2.1]octane) or covalently bonded rings (like for example in 1,1'-bicyclohexane), or both fused rings and covalently bonded rings.

Particular preference is given to non-aromatic carbocyclic and heterocyclic groups that contain only saturated rings. Preference is furthermore given to non-aromatic carbocyclic and heterocyclic groups that are mono-, bi- or tricyclic, have 5 to 25 ring atoms, optionally contain fused rings, and are optionally substituted. Preference is furthermore given to 5-, 6-, 7- or 8-membered carbocyclic groups, in which, in addition, one or more C atoms may be replaced by Si and/or one or more CH groups may each be replaced by N and/or one or more non-adjacent $CH_2$ groups may each be replaced by —O— or —S—.

Preferred carbocyclic and heterocyclic groups are, for example, 5-membered groups, such as cyclopentane, tetrahydrofuran, tetrahydrothiofuran, and pyr-rolidine, 6-membered groups, such as cyclohexane, silinane, cyclohexene, tetrahydropyran, tetrahydrothiopyran, 1,3-dioxane, 1,3-dithiane, and piperidine, 7-membered groups, such as cycloheptane, and fused groups, such as tetrahydronaphthalene, decahydronaphthalene, indane, bicyclo-[1.1.1]pentane-1,3-diyl, bicyclo[2.2.2]octane-1,4-diyl, spiro[3.3]heptane-2,6-diyl, octahydro-4,7-methanoindane-2,5-diyl, 2H-chromene (2H-1-benzopyrane), 4H-chromene (4H-1-benzopyran), and coumarin (2H-chromen-2-one).

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Further preferred substituents, also referred to as "L" above and below, are, for example, F, Cl, Br, I, —ON, —$NO_2$, —NCO, —NCS, —OCN, —SON, —C(=O)N($R^x$)$_2$, —C(=O)$Y^1$, —C(=O)$R^x$, and —N($R^x$)$_2$, in which $R^x$ has the meaning indicated above, and $Y^1$ denotes halogen, optionally substituted silyl or aryl having 6 to 40, preferably 6 to 20, C atoms, and straight-chain or branched alkyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, in which $R^0$ denotes H or alkyl having 1 to 12 C atoms.

Particularly preferred substituents L are, for example, F, Cl, ON, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, and $OC_2F_5$, furthermore phenyl.

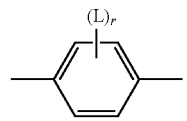

is preferably

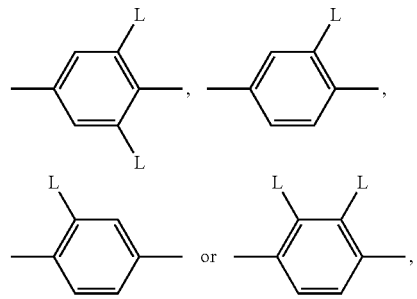

in which L has one of the meanings indicated above.

Spacer groups like Sp, $Sp^1$, $Sp^2$ and $Sp^3$ are preferably selected of the formula Sp'-X', wherein Sp' is linked to the polymerizable group (so that e.g. the radical P-Sp-, $P^1$-$Sp^1$-, $P^2$-$Sp^2$- or $P^3$-$Sp^3$- is of the formula P-Sp'-X' or $P^{1/2/3}$-$Sp^1$-$X^1$—, respectively), wherein Sp' and X' have the following meanings:

Sp' denotes straight-chain or branched alkylene having 1 to 20, preferably 1 to 15, C atoms, which is optionally mono- or polysubstituted by F, Cl, Br, I, CN or P, and in which, in addition, one or more non-adjacent $CH_2$ groups may each be replaced, independently of one another, by —O—, —S—, —NH—, —N($R^0$)—, —Si($R^{00}R^{000}$)—, —CO—, —CO—O—, —O—CO—, —O—CO—O—, —S—CO—, —CO—S—, —N($R^{00}$)—CO—O—, —O—CO—N($R^{00}$)—, —N($R^{00}$)—CO—N($R^{00}$)—, —CH=CH— or —C≡C— in such a way that O and/or S atoms are not linked directly to one another, X' denotes —O—, —S—, —CO—, —CO—O—, —O—CO—, —O—CO—O—, —CO—N($R^{00}$)—, —N($R^{00}$)—CO—, —N($R^{00}$)—CO—N($R^{00}$)—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^0$—, —$CY^2$=$CY^3$—, —C≡C—, —CH=CH—CO—O—, —O—CO—CH=CH— or a single bond, wherein X' denotes a single bond if it is adjacent to an ester group (O—CO or CO—O) in formula I, $R^{00}$ and $R^{000}$ each, independently of one another, denote H or alkyl having 1 to 12 C atoms, $Y^2$ and $Y^3$ each, independently of one another, denote H, F, Cl or CN, and P is as defined above and below.

X' is preferably —O—, —S—, —CO—, —COO—, —OCO—, —O—COO—, —CO—NR$^0$—, —NR$^0$—CO—, —NR$^0$—CO—NR$^0$— or a single bond, very preferably —O— or a single bond.

Preferred groups Sp, Sp$^1$, Sp$^2$, Sp$^3$ and Sp'-X' include, without limitation, *—(CH$_2$)$_{p1}$—, *—(CH$_2$)$_{p2}$—O—(CH$_2$)$_{p3}$—, *—(CH$_2$)$_{p2}$—S—(CH$_2$)$_{p3}$, *—(CH$_2$)$_{p2}$—NH (CH$_2$)$_{p3}$—, *—(CH$_2$)$_{p1}$—O—, *—(CH$_2$)$_{p1}$—CO—, *—(CH$_2$)$_{p1}$—CO—O—, *—(CH$_2$)$_{p1}$—O—CO— and

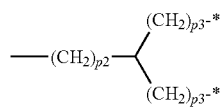

wherein the asterisk (*) denotes the link to the respective polymerizable group(s), p1 is an integer from 1 to 12, preferably from 1 to 6, and p2 and p3 are independently of each other an integer from 1 to 6, preferably 1, 2 or 3.

In a preferred embodiment the spacer groups Sp, Sp$^1$, Sp$^2$ and Sp$^3$ denote Sp'-X' in which Sp' is selected from straight-chain alkylene as defined above.

In another preferred embodiment the polymerizable compounds contain least one group P-Sp-, P$^2$-Sp$^2$- or P$^3$-Sp$^3$-, wherein Sp, Sp$^1$, Sp$^2$ or Sp$^3$, respectively, denote Sp'-X' in which Sp' is branched alkylene that is substituted by a group P as defined above or below.

The polymerizable group P, P$^1$, P$^2$ or P$^3$ is a group which is suitable for a polymerization reaction, such as, for example, free-radical or ionic chain polymerization, polyaddition or polycondensation, or for a polymer-analogous reaction, for example addition or condensation onto a main polymer chain. Particular preference is given to groups for chain polymerization, in particular those containing a C=C double bond or —C≡C— triple bond, and groups which are suitable for polymerization with ring opening, such as, for example, oxetane or epoxide groups.

Preferred polymerizable groups are selected from the group consisting of CH$_2$=CW$^1$—CO—O—, CH$_2$=CW$^1$—CO—,

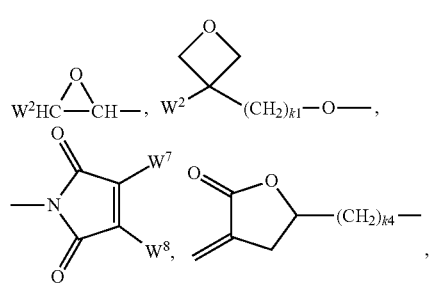

CH$_2$=CW$^2$—(O)$_{k3}$—, CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—COO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, which is optionally substituted by one or more non-polymerizable radicals L as defined above, $k_1$, $k_2$ and $k_3$ each, independently of one another, denote 0 or 1, $k_3$ preferably denotes 1, and $k_4$ denotes an integer from 1 to 10.

Very preferred polymerizable groups are selected from the group consisting of CH$_2$=CW$^1$—CO—O—, CH$_2$=CW$^1$—CO—,

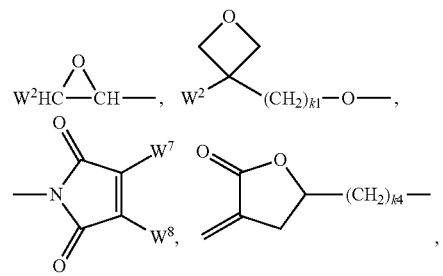

CH$_2$=CW$^2$—O—, CH$_2$=CW$^2$—, CW$^1$=CH—CO—(O)$_{k3}$—, CW$^1$=CH—CO—NH—, CH$_2$=CW$^1$—CO—NH—, (CH$_2$=CH)$_2$CH—OCO—, (CH$_2$=CH)$_2$CH—O—, (CH$_2$=CH—CH$_2$)$_2$N—, (CH$_2$=CH—CH$_2$)$_2$N—CO—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Further preferred polymerizable groups are selected from the group consisting of CH$_2$=CW$^1$—CO—O—, in particular CH$_2$=CH—CO—O—, CH$_2$=C(CH$_3$)—CO—O— and CH$_2$=CF—CO—O—, furthermore CH$_2$=CH—O—, (CH$_2$=CH)$_2$CH—O—CO—, (CH$_2$=CH)$_2$CH—O—,

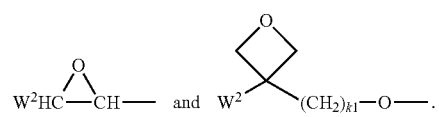

Further preferred polymerizable groups are selected from the group consisting of vinyl, vinyloxy, acrylate, methacrylate, fluoroacrylate, chloro-acrylate, oxetane and epoxide groups, very preferably from acrylate and methacrylate groups.

The polymerizable compounds are polymerized or cross-linked (if one compound contains two or more polymerizable groups) by in-situ polymerization in the LC medium between the substrates of the LC display. In contrast to polymer stabilized display modes like PS-VA, PS-IPS, usually no voltage is applied during polymerization of the polymerizable compounds, in order to sustain the off state alignment of the LC molecules. In order to prevent the build-up of static charge, preferably it is ensured that a zero voltage (0V) is applied to the electrodes.

Upon polymerization the polymerizable compounds form a crosslinked polymer, which induces a certain pretilt in the LC medium. Without wishing to be bound to a specific theory, it is believed that at least a part of the crosslinked polymer, which is formed by the polymerizable compounds, will phase-separate or precipitate from the LC medium and form a polymer layer on the alignment layer that is provided on the substrates and electrodes. Microscopic measurement data (like SEM and AFM) have confirmed that at least a part of the formed polymer accumulates at the LC-polyimide interface.

The inventors of the present invention have also found that the use of an LC medium according to the present invention, comprising one or more polymerizable compounds or reactive mesogens, leads to better reliability and higher VHR values of the LC medium in the display. Surprisingly it has been found that a polymer stabilized FFS display according to the present invention, comprising an LC medium with one or more reactive mesogens, shows even higher VHR values after UV exposure, compared to an FFS display comprising an LC medium without a reactive mesogen. This is completely unexpected, as the skilled person would rather have expected that the addition of reactive mesogens with reactive groups like acrylates or methacrylates would reduce the VHR value of the LC medium after UV exposure. Without wishing to be bound to a specific theory it is believed that the reactive mesogens after polymerization in the display lead to the separation of a blocking layer formed by the polymerized reactive mesogens between the polyimide alignment layer and the LC medium. The blocking layer prevents extraction of ions from the polyimide layer upon UV exposure and increases the VHR value.

The alignment layer preferably comprises, very preferably consists of, a polyimide. The polyimide is selected such that it induces planar alignment of the LC molecules in the layer of the LC medium, and/or the polyimide is treated, for example by rubbing, or by photoalignment, to provide the desired planar alignment. "Planar alignment" means alignment of the LC molecules with their molecular long axes substantially parallel to the layer. Suitable polyimide alignment layer materials are for example the commercially available AL-3046 or AL-16301 from JSR, and SE-2414, SE 6514, SE 6414 or SE-5811 from Nissan.

Suitable and preferred polymerization methods are, for example, thermal or photopolymerization, preferably photopolymerization, in particular UV induced photopolymerization, which can be achieved by exposure of the polymerizable compounds to UV radiation. One or more initiators can optionally also be added here. Suitable conditions for the polymerization and suitable types and amounts of initiators are known to the person skilled in the art and are described in the literature. Suitable for free-radical polymerization are, for example, the commercially available photoinitiators Irgacure651®, Irgacure184®, Irgacure907®, Irgacure369® or Darocure1173® (Ciba AG). If an initiator is employed, its proportion is preferably 0.001 to 5% by weight, particularly preferably 0.001 to 1% by weight.

The polymerizable compounds can also be polymerized without the presence of an initiator, which is accompanied by considerable advantages, such, for example, lower material costs and in particular less contamination of the LC medium by possible residual amounts of the initiator or degradation products thereof. The polymerization can thus also be carried out without the addition of an initiator. In a preferred embodiment, the LC medium thus comprises no polymerization initiator.

The LC medium may also comprise one or more stabilizers or inhibitors in order to prevent undesired spontaneous polymerization of the RMs, for example during storage or transport. Suitable types and amounts of stabilizers are known to the person skilled in the art and are described in the literature. Especially preferred stabilizers are shown in Table C below.

Particularly suitable are, for example, the commercially available stabilizers from the Irganox® series (Ciba AG), such as, for example, Irganox® 1076. If stabilizers are employed, their proportion, based on the total amount of RMs in the LC medium, is preferably 10-500,000 ppm, particularly preferably 50-50,000 ppm.

The LC medium may also comprise one or more chiral dopants, for example to induce a twisted molecular structure. Suitable types and amounts of chiral dopants are known to the person skilled in the art and are described in the literature. Particularly suitable are, for example, the commercially available chiral dopants R/S-811, R/S-1011, R/S-2011, R/S-3011, R/S-4011, or R/S-5011 (Merck KGaA). If chiral dopants are employed, their proportion in the LC medium is preferably 0.001 to 15% by weight, particularly preferably 0.1 to 5% by weight. Especially preferred chiral dopants are shown in Table B below.

In a further preferred embodiment the LC medium does not contain any chiral compounds.

Preferably, the LC medium according to the present invention does essentially consist of one or more polymerizable compounds and an LC host mixture as described above and below. However, the LC medium or LC host mixture may additionally comprise one or more further components or additives, preferably selected from the list including but not limited to co-monomers, chiral dopants, polymerization initiators, inhibitors, stabilizers, surfactants, wetting agents, lubricating agents, dispersing agents, hydrophobing agents, adhesive agents, flow improvers, defoaming agents, deaerators, diluents, reactive diluents, auxiliaries, colorants, dyes, pigments and nanoparticles.

Preference is furthermore given to LC media which have a nematic liquid crystal phase, and preferably have no chiral liquid crystal phase.

Preference is furthermore given to achiral polymerizable compounds and LC media which contain only compounds selected from the group consisting of achiral compounds.

The LC media comprise one or more polymerizable compounds containing two or more polymerizable groups (di- or multireactive). Preferred are compounds which comprise two or three polymerizable groups, very preferably three polymerizable groups (trireactive).

Preference is furthermore given to displays and LC media which contain exclusively polymerizable compounds containing two or three polymerizable groups.

It is also possible that the LC medium comprises two or more different polymerizable compounds.

The proportion of the polymerizable compounds in the LC media according to the invention is preferably from >0 to <5%, particularly preferably from >0 to <1%, very particularly preferably from 0.01 to 0.5%.

The polymerizable compounds do preferably have a liquid crystalline skeleton, like reactive mesogens. Preferably the polymerizable compounds are selected from formula I*

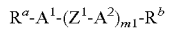 I* in which the individual radicals have the following meanings:
$R^a$ and $R^b$ each, independently of one another, denote P, P-Sp-, H, halogen, $SF_5$, $NO_2$, a carbyl group or a hydrocarbyl group,
P on each occurrence, identically or differently, denotes a polymerizable group, preferably selected from acrylate and methacrylate groups,
Sp on each occurrence, identically or differently, denotes a spacer group or a single bond,
$A^1$ and $A^2$ each, independently of one another, denote an aromatic, heteroaromatic, alicyclic or heterocyclic group, preferably having 4 to 25 ring atoms, which may also contain fused rings, and which is optionally mono- or polysubstituted by L,
$Z^1$ on each occurrence, identically or differently, denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, $CR^0R^{00}$ or a single bond,
L denotes P, P-Sp-, H, OH, CH$_2$OH, halogen, $SF_5$, $NO_2$, a carbyl group or hydrocarbyl group,
$R^0$ and $R^{00}$ each, independently of one another, denote H or alkyl having 1 to 12 C atoms,
m1 denotes 0, 1, 2, 3 or 4,
n1 denotes 1, 2, 3 or 4,
wherein at least one of the radicals $R^a$, $R^b$ and L denotes or contains a group P or P-Sp-,
Particularly preferred compounds of the formula I* are those in which
$A^1$ and $A^2$ each, independently of one another, denote 1,4-phenylene, 1,3-phenylene, 1,2-phenylene, naphthalene-1,4-diyl, naphthalene2,6-diyl, phenanthrene-2,7-diyl, anthracene-2,7-diyl, fluorene-2,7-diyl, in which, in addition, one or more CH groups in these groups may each be replaced by N, cyclohexane-1,4-diyl, in which, in addition, one or more non-adjacent CH$_2$ groups may each be replaced by O or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl, octahydro-4,7-methanoindane-2,5-diyl, 9,10-dihydro-phenanthrene-2,7-diyl, 2H-chromen-2-one-3,6-diyl, 2H-chromen-2-one-3,8-diyl, or 2H-chromen-2-one-3,7-diyl, where all these groups may be unsubstituted or mono- or polysubstituted by L,
L denotes P, P-Sp-, OH, CH$_2$OH, F, Cl, Br, I, —ON, —NO$_2$, —NCO, —NCS, —OCN, —SON, —C(=O)N($R^x$)$_2$, —C(=O)Y$^1$, —C(=O)$R^x$, —N($R^x$)$_2$, optionally substituted silyl, optionally substituted aryl having 6 to 20 C atoms, straight-chain or branched alkyl or alkoxy having 1 to 25 C atoms, or straight-chain or branched alkenyl, alkinyl, alkylcarbonyl, alkoxycarbonyl, alkylcarbonyloxy or alkoxycarbonyloxy having 2 to 25 C atoms, wherein in all of these groups, in addition, one or more H atoms may each be replaced by F, Cl or P-Sp-,
$Y^1$ denotes halogen,
$R^x$ denotes P, P-Sp-, H, halogen, straight-chain, branched or cyclic alkyl having 1 to 25 C atoms, in which, in addition, one or more non-adjacent CH$_2$ groups may each be replaced by —O—, —S—, —CO—, —CO—O—, —O—CO—, or —O—CO—O— in such a way that O and/or S atoms are not linked directly to one another, and in which, in addition, one or more H atoms may each be replaced by F, Cl or P-Sp-, an optionally substituted aryl or aryloxy group having 6 to 40 C atoms, or an optionally substituted heteroaryl or heteroaryloxy group having 2 to 40 C atoms,
where at least one of the radicals $R^a$, $R^b$ and L denotes P or P-Sp-.

Particular preference is given to compounds of the formula I* in which
m1 is 1 or 2,
one or both of $R^a$ and $R^b$ denote P or P-Sp-,
both $R^a$ and $R^b$ denote P or P-Sp-,
at least three, preferably exactly three of the radicals $R^a$, $R^b$ and L denote or contain a group P or P-Sp-,
at least one of $A^1$ and $A^2$ is substituted by a group L denoting P or P-Sp-,
P is selected from acrylate and methacrylate groups,
Sp is selected from *—(CH$_2$)$_{p1}$—, *—(CH$_2$)$_{p2}$—O—(CH$_2$)$_{p3}$—, *—(CH$_2$)$_{p2}$—S—(CH$_2$)$_{p3}$—, *—(CH$_2$)$_{p2}$—NH—(CH$_2$)$_{p3}$—, *—(CH$_2$)$_{p1}$—O—, *—(CH$_2$)$_{p1}$—CO—, *—(CH$_2$)$_{p1}$—CO—O—, *—(CH$_2$)$_{p1}$—O—CO— and

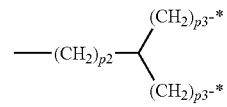

wherein the asterisk (*) denotes the link to the respective polymerizable group(s), p1 is an integer from 1 to 12, preferably from 1 to 6, and p2 and p3 are independently of each other an integer from 1 to 6, preferably 1, 2 or 3,
$A^1$ and $A^2$ are selected from the group consisting of 1,4-phenylene, 1,3-phenylene-, 1,2-phenylene, naphthalene-2,6-diyl, phenanthrene-2,7-diyl, 9,10-dihydrophenanthrene-2,7-diyl, 2H-chromen-2-one-3,6-diyl, 2H-chromen-2-one-3,8-diyl, and 2H-chromen-2-one-3,7-diyl, where, in addition, one or two CH groups in these rings are each optionally replaced by N, and where these rings are optionally mono- or polysubstituted by L, as described above and below,
$A^1$ and $A^2$ are selected from the group consisting of 1,4-phenylene, 1,3-phenylene, 1,2-phenylene, naphthalene-2,6-diyl, 2H-chromen-2-one-3,6-diyl, 2H-chromen-2-one-3,8-diyl, and 2H-chromen-2-one-3,7-diyl,
$A^1$ and $A^2$ are selected from the group consisting of 1,4-phenylene, 1,3-phenylene, 1,2-phenylene, and naphthalene-2,6-diyl,
-$A^1$-($Z^1$-$A^2$)$_{m1}$- denotes biphenyl-4,4'-diyl, terphenyl-4,4"-diyl, naphthalene-2,6-diyl, 6-(phenyl-4'yl)-napthalene-2-yl, 3-(phenyl-4'yl)-chromen-2-one-6-yl, 3-(phenyl-4'yl)-chromen-2-one-7-yl, or 3-(phenyl-4'yl)-chromen-2-one-8-yl,
$Z^1$ is selected from the group consisting of —O—, —CO—O—, —OCO—, —OCH$_2$—, —CH$_2$O—, —CF$_2$O—, —OCF$_2$—, —CH$_2$CH$_2$—, —CH=CH—, —CF=CF—, —CH=CF—, —CF=CH—, —C≡C—, and a single bond, $Z^1$ is a single bond, at least one of $A^1$ and $A^2$ is substituted by a group L that is an unpolymerizable group, preferably selected from F, Cl, —CN and straight-chain or branched alkyl having 1 to 25, particularly preferably 1 to 10, C atoms, in which, in addition, one or more non-adjacent $CH_2$ groups may each be replaced, independently of one another, by —C(R$^{OO}$)=C(R$^{OOO}$)—, —C≡C—, —N(R$^{OO}$)—, —O—, —S—, —CO—, —CO—O—, —O—CO—, or —O—CO—O— in such a way that O and/or S atoms are not linked directly to one another, and in which, in addition, one or more H atoms may each be replaced by F, Cl, Br, I or CN.

Particularly preferred compounds of the formula I* are selected from the following sub-formulae:

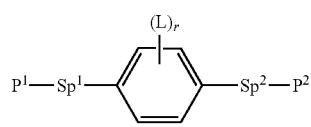

M1

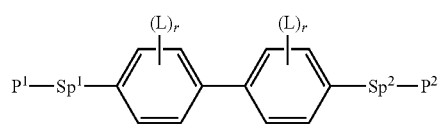

M2

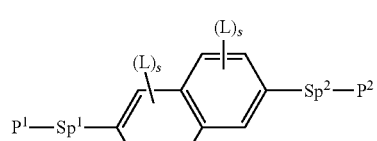

M3

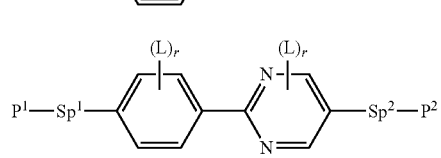

M4

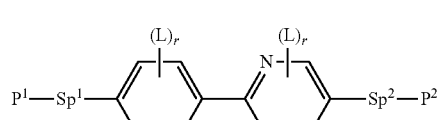

M5

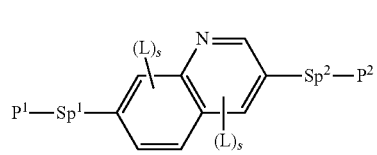

M6

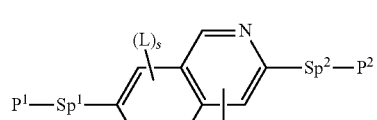

M7

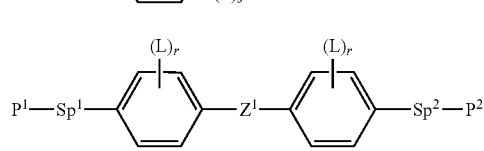

M8

-continued

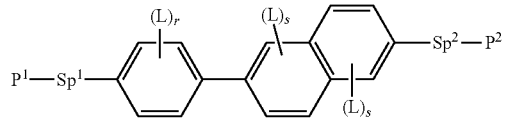

M9

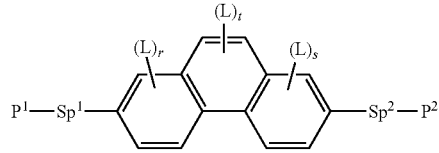

M10

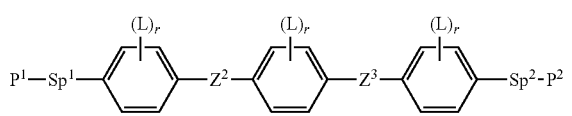

M11

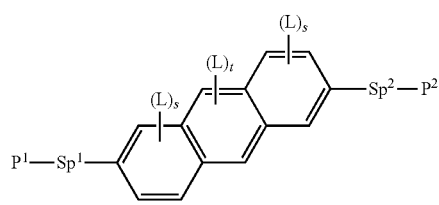

M12

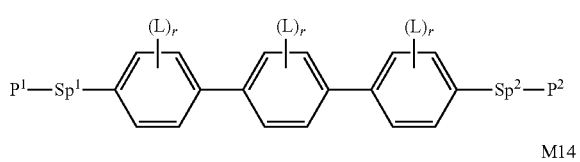

M13

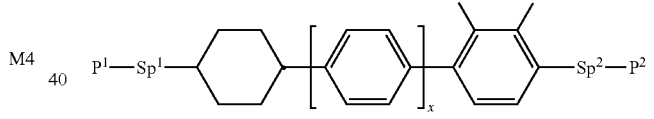

M14

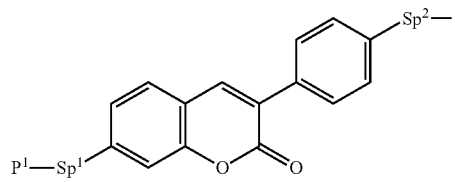

M15

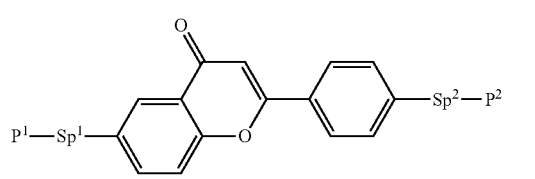

M16

M17

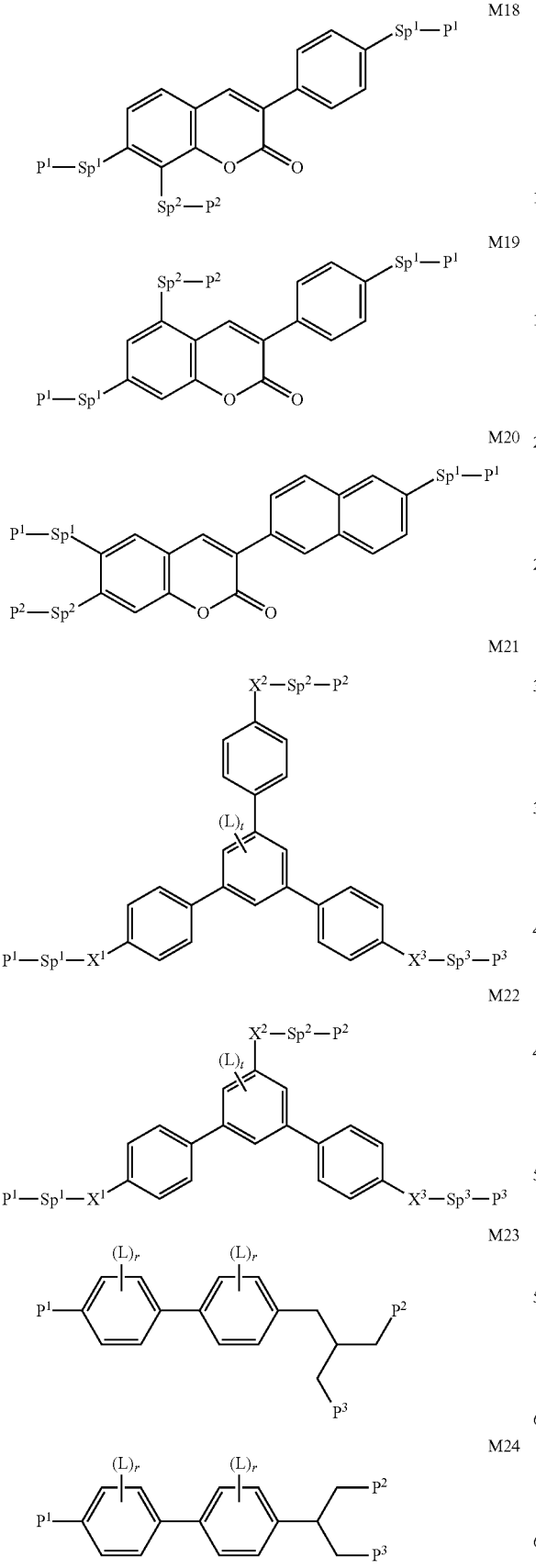
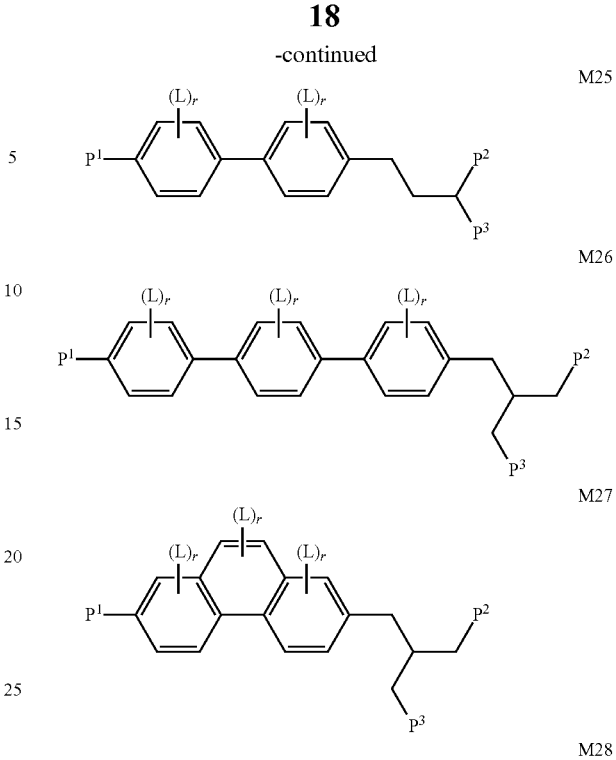

in which the individual radicals have the following meanings:

P$^1$, P$^2$ and P$^3$ each, independently of one another, denote an acrylate or methacrylate group, Sp$^1$, Sp$^2$ and Sp$^3$ each, independently of one another, denote a single bond or a spacer group having one of the meanings indicated above and below for Sp$^1$, and particularly preferably denote —(CH$_2$)$_{p1}$—, —(CH$_2$)$_{p1}$—O—, —(CH$_2$)$_{p1}$—CO—O—, —(CH$_2$)$_{p1}$—O—CO— or —(CH$_2$)$_{p1}$—O—CO—O—, in which p1 is an integer from 1 to 12, where, in addition, one or more of the radicals P$^1$-Sp$^1$-, P$^1$-Sp$^2$- and P$^3$-Sp$^3$- may denote R$^{aa}$, with the proviso that at least one of the radicals P$^1$-Sp$^1$-, P$^2$-Sp$^2$ and P$^3$-Sp$^3$- present is different from R$^{aa}$, R$^{aa}$ denotes H, F, Cl, CN or straight-chain or branched alkyl having 1 to 25 C atoms, in which, in addition, one or more non-adjacent CH₂ groups may each be replaced, independently of one another, by C(R⁰)=C(R⁰⁰)—, —C≡C—, —N(R⁰)—, —O—, —S—, —CO—, —CO—O—, —O—CO—, or —O—CO—O— in such a way that O and/or S atoms are not linked directly to one another, and in which, in addition, one or more H atoms may each be replaced by F, Cl, CN or P¹-Sp'-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), R⁰, R⁰⁰ each, independently of one another and identically or differently on each occurrence, denote H or alkyl having 1 to 12 C atoms, X¹, X² and X³ each, independently of one another, denote —CO—O—, —O—CO— or a single bond, Z¹ denotes —O—, —CO—, —C(R^y R^z)— or —CF₂CF₂—, R^y and R^z each, independently of one another, denote H, F, CH₃ or CF₃, Z² and Z³ each, independently of one another, denote —CO—O—, —O—CO—, —CH₂O—, —OCH₂—, —CF₂O—, —OCF₂— or —(CH₂)ₙ—, where n is 2, 3 or 4, L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, x denotes 0 or 1.

Especially preferred are compounds of formulae M2, M13, M17, M23 and M29.

Further preferred are trireactive compounds M17 to M30, in particular M17, M18, M19, M23, M24, M25, M29 and M30.

In the compounds of formulae M1 to M30 the group

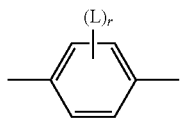

is preferably

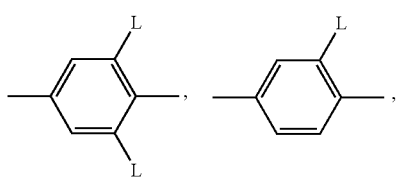

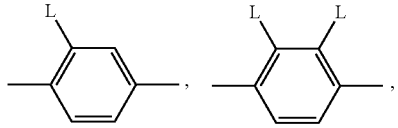

-continued

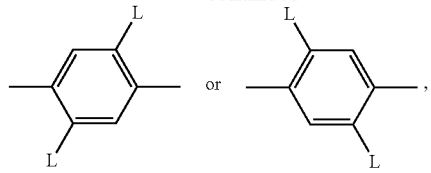

wherein L on each occurrence, identically or differently, has one of the meanings given above or below, and is preferably F, Cl, CN, NO₂, CH₃, C₂H₅, C(CH₃)₃, CH(CH₃)₂, CH₂CH(CH₃)C₂H₅, OCH₃, OC₂H₅, COCH₃, COC₂H₅, COOCH₃, COOC₂H₅, CF₃, OCF₃, OCHF₂, OC₂F₅ or P-Sp-, very preferably F, Cl, CN, CH₃, C₂H₅, OCH₃, COCH₃, OCF₃ or P-Sp-, more preferably F, Cl, CH₃, OCH₃, COCH₃ or OCF₃, especially F or CH₃.

Further preferred polymerizable compounds are chiral compounds selected from formula II*:

$$(R^*-(A^1-Z^1)_{m1})_k-Q \qquad \text{II*}$$

in which A¹, Z¹ and m1 have on each occurrence, identically or differently, one of the meanings indicated in formula I*, R* on each occurrence, identically or differently, has one of the meanings indicated for R^a in formula I*, Q denotes a k-valent chiral group, which is optionally mono- or polysubstituted by L, k is 1, 2, 3, 4, 5 or 6, where the compounds contain at least one radical R* or L which denotes or contains a group P-Sp- as defined above.

Particularly preferred compounds of the formula II* contain a monovalent group Q of the formula III*

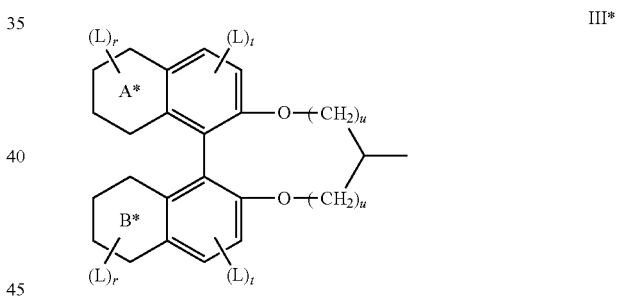

in which L and r have on each occurrence, identically or differently, the meanings indicated above, A* and B* each, independently of one another, denote fused benzene, cyclohexane or cyclohexene, t on each occurrence, identically or differently, denotes 0, 1 or 2, and u on each occurrence, identically or differently, denotes 0, 1 or 2.

Particular preference is given to groups of the formula III* in which u denotes 1 or 2.

Further preferred compounds of the formula II* contain a monovalent group Q or one or more groups R* of the formula IV*

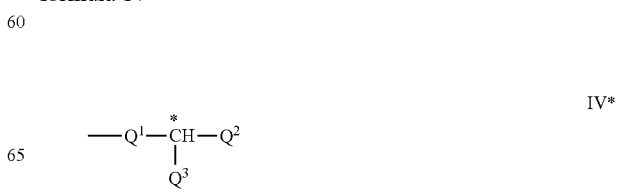

in which

Q¹ denotes alkylene or alkyleneoxy having 1 to 9 C atoms or a single bond,

Q² denotes optionally fluorinated alkyl or alkoxy having 1 to 10 C atoms, in which, in addition, one or two non-adjacent CH$_2$ groups may each be replaced by —O—, —S—, —CH=CH—, —CO—, —COO—, —COO—, —O—COO—, —S—CO—, —CO—S— or —C≡C— in such a way that O and/or S atoms are not linked directly to one another, Q³ denotes F, Cl, CN or alkyl or alkoxy as defined for Q², but different from Q².

Preferred groups of the formula IV* are, for example, 2-butyl (=1-methyl-propyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxa-pentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoro-methyloctyloxy.

Further preferred compounds of the formula II* contain a divalent group Q of the formula V*

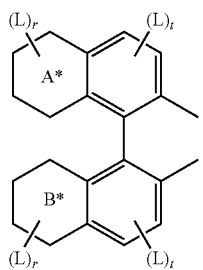

V* in which L, r, t, A* and B* have the meanings indicated above.

Further preferred compounds of the formula II* contain a divalent group Q selected from the following formulae:

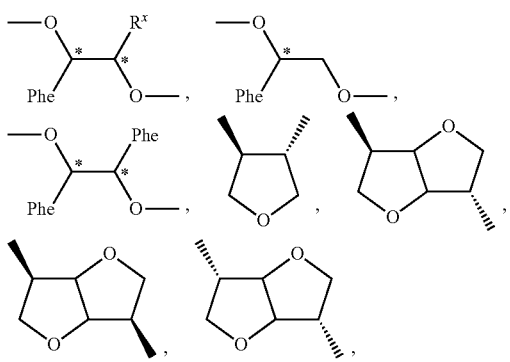

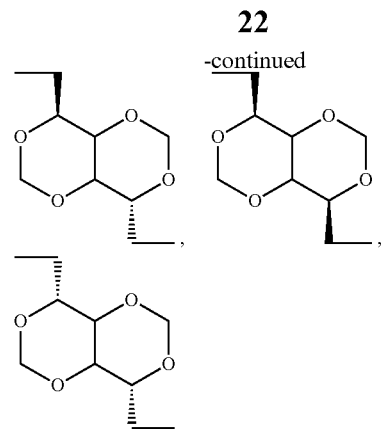

in which Phe denotes phenyl, which is optionally mono- or polysubstituted by L, and R$^x$ denotes F or optionally fluorinated alkyl having 1 to 4 C atoms.

Particularly preferred compounds of the formula II* are selected from the following sub-formulae:

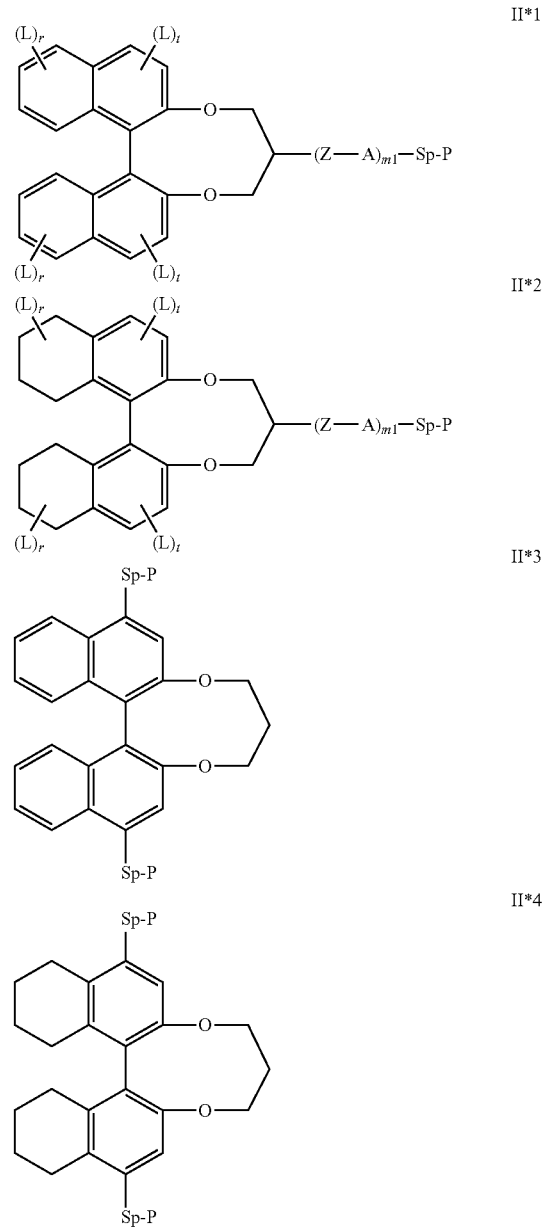

II*1

II*2

II*3

II*4

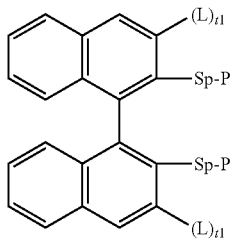
II*5

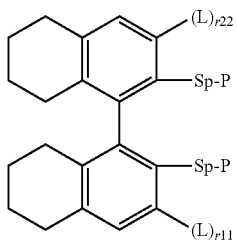
II*6

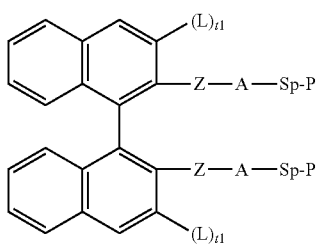
II*7

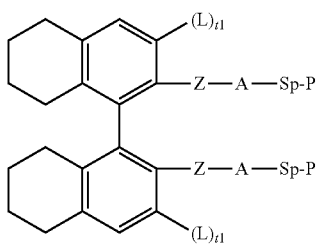
II*8

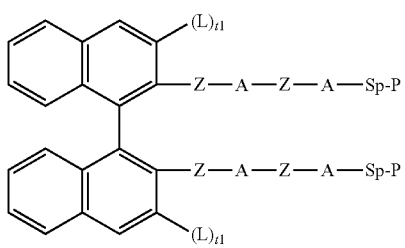
II*9

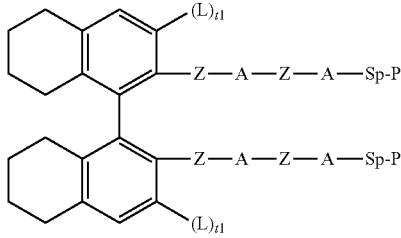
II*10

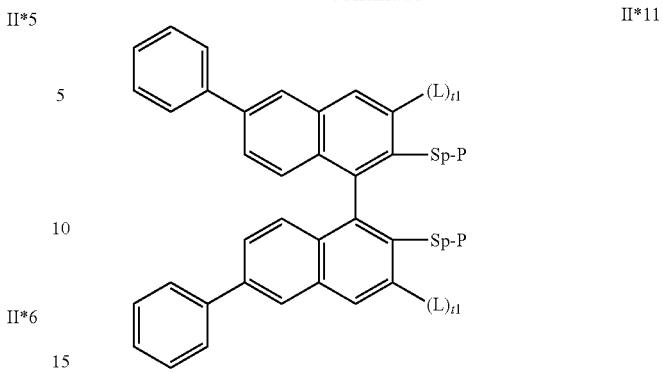
II*11 in which L, P, Sp, m1, r and t have the meanings indicated above, Z and A have on each occurrence, identically or differently, one of the meanings indicated for $Z^1$ and $A^1$ respectively, t1 on each occurrence, identically or differently, denotes 0 or 1, and r11 and r22 are each independently 0 or 1.

The chiral compounds of formula II* can be employed either in optically active form, i.e., as pure enantiomers, or as any desired mixture of the two enantiomers, or as the racemate thereof. The use of the racemates is preferred. The use of the racemates has some advantages over the use of pure enantiomers, such as, for example, significantly more straightforward synthesis and lower material costs.

Besides the polymerizable compounds described above, the LC media for use in the LC displays according to the invention comprise an LC mixture ("host mixture") comprising one or more, preferably two or more LC molecules which are selected from low-molecular-weight (i.e. monomeric or polymerized) compounds. These LC molecules are selected such that they stable or unreactive to a polymerization reaction under the conditions used for polymerization of the polymerizable compounds.

In addition to the polymerizable compounds the LC medium according to the present invention comprises one or more mesogenic or liquid crystalline compounds comprising an alkenyl group, ("alkenyl compound"), where this alkenyl group is preferably stable to a polymerization reaction under the conditions used for the polymerization of the polymerizable compounds of formula I or of the other polymerizable compounds contained in the LC medium.

The LC medium preferably comprises
  a polymerizable component A) comprising one or more polymerizable compounds, and
  a liquid crystalline component B), also referred to below as "LC host mixture", comprising one or more mesogenic or liquid crystalline compounds comprising an alkenyl group.

The LC host mixture is preferably a nematic LC mixture, and preferably does not have a chiral LC phase.

In a preferred embodiment the LC medium comprises one or more mesogenic or liquid crystalline compound comprising an alkenyl group, wherein the alkenyl group is preferably stable to a polymerization reaction under the conditions used for the polymerization of the polymerizable compounds. These compounds are hereinafter also referred to as "alkenyl compounds".

The alkenyl groups in the alkenyl compounds are preferably selected from straight-chain, branched or cyclic alkenyl, in particular having 2 to 25 C atoms, particularly preferably having 2 to 12 C atoms, in which, in addition, one or more non-adjacent CH$_2$ groups are each optionally replaced by —O—, —S—, —CO—, —CO—O—, —O—CO—, or —O—CO—O— in such a way that O and/or S atoms are not linked directly to one another, and in which, in addition, one or more H atoms may each be replaced by F and/or Cl.

Preferred alkenyl groups are straight-chain alkenyl having 2 to 7 C atoms and cyclohexenyl, in particular ethenyl (vinyl), propenyl, butenyl, pentenyl, hexenyl, heptenyl, 1,4-cyclohexen-1-yl and 1,4-cyclohexen-3-yl.

The concentration of compounds containing an alkenyl group in the LC host mixture (i.e. without any polymerizable compounds) is preferably from 5% to 100%, very preferably from 20% to 60% by weight based on the total weight of the LC host mixture.

Especially preferred are LC mixtures containing 1 to 5, preferably 1, 2 or 3 compounds having an alkenyl group.

The mesogenic and LC compounds containing an alkenyl group are preferably selected from the following formulae:

  AN

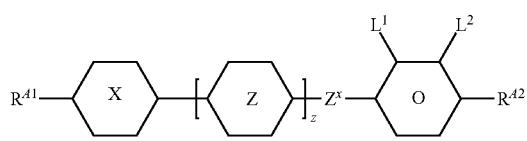  AY in which the individual radicals, on each occurrence identically or differently, each, independently of one another, have the following meaning:

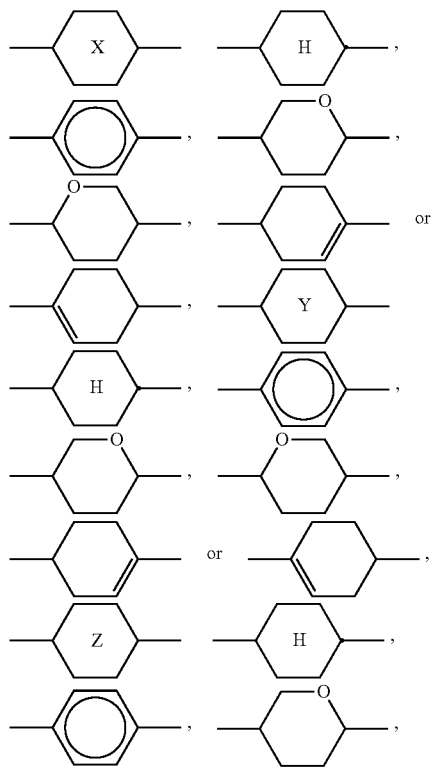

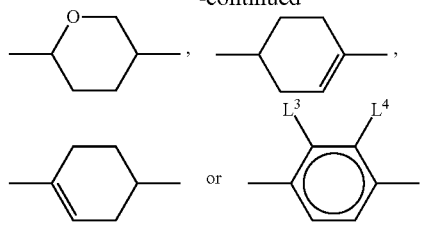

R$^{A1}$ alkenyl having 2 to 9 C atoms or, if at least one of the rings X, Y and Z denotes cyclohexenyl, also one of the meanings of R$^{A2}$, R$^{A2}$ alkyl having 1 to 12 C atoms, in which, in addition, one or two non-adjacent CH$_2$ groups may each be replaced by —O—, —CH=CH—, —CO—, —OCO— or —COO— in such a way that O atoms are not linked directly to one another, Z$^x$ —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O—, or a single bond, preferably a single bond, L$^{1-4}$ each, independently of one another, H, F, Cl, OCF$_3$, CF$_3$, CH$_3$, CH$_2$F or CHF$_2$H, preferably H, F or Cl, x 1 or 2, z 0 or 1.

R$^{A2}$ is preferably straight-chain alkyl or alkoxy having 1 to 8 C atoms or straight-chain alkenyl having 2 to 7 C atoms.

The LC medium preferably comprises no compounds containing a terminal vinyloxy group (—O—CH=CH$_2$), in particular no compounds of the formula AN or AY in which R$^{A1}$ or R$^{A2}$ denotes or contains a terminal vinyloxy group (—O—CH=CH$_2$).

Preferably, L$^1$ and L$^2$ denote F, or one of L$^1$ and L$^2$ denotes F and the other denotes Cl, and L$^3$ and L$^4$ denote F, or one of L$^3$ and L$^4$ denotes F and the other denotes Cl.

The compounds of the formula AN are preferably selected from the following sub-formulae:

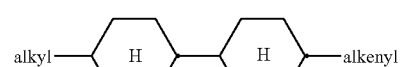  AN1

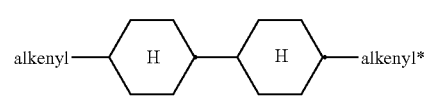  AN2

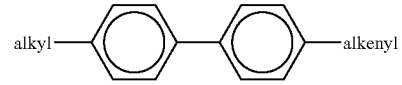  AN3

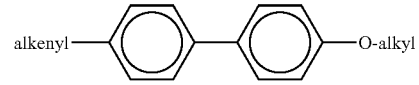  AN4

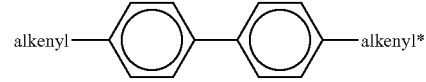  AN5

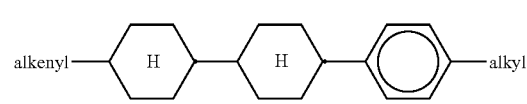  AN6

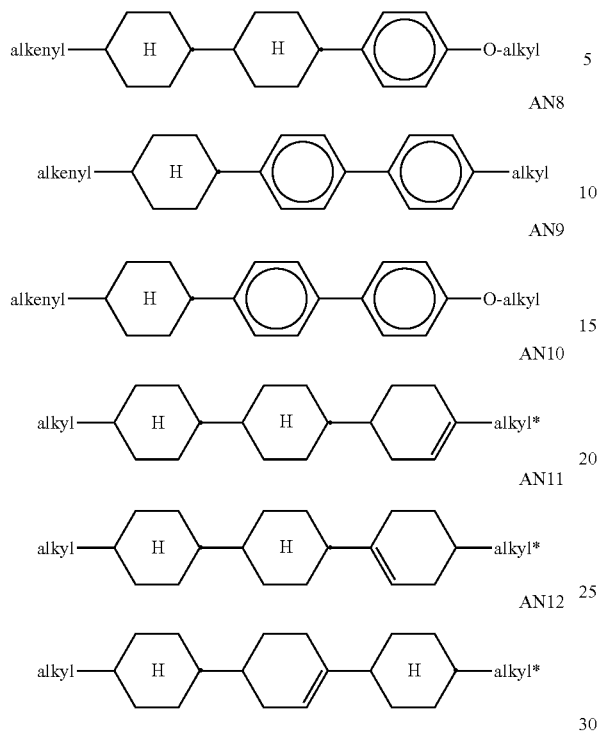

in which alkyl and alkyl* each, independently of one another, denote a straight-chain alkyl radical having 1-6 C atoms, and alkenyl and alkenyl* each, independently of one another, denote a straight-chain alkenyl radical having 2-7 C atoms. Alkenyl and alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

The compounds of the formula AY are preferably selected from the following sub-formulae:

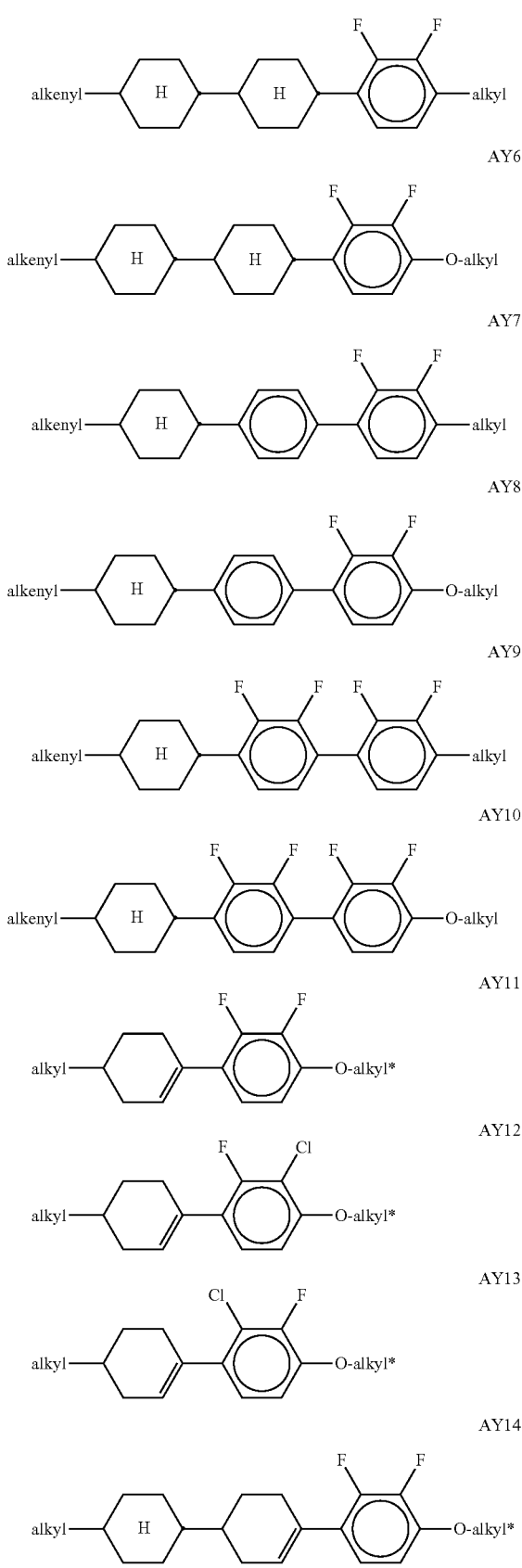

AY15
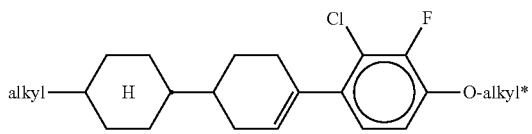

AY16
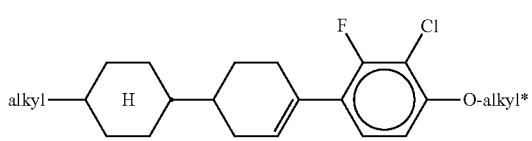

AY17
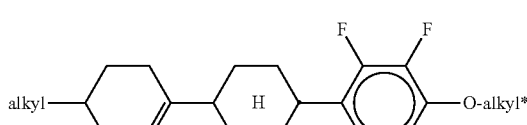

AY18
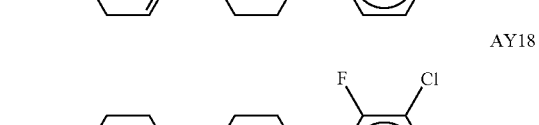

AY19
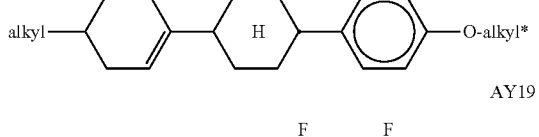

AY20
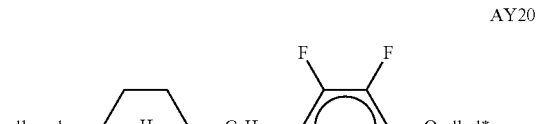

AY21
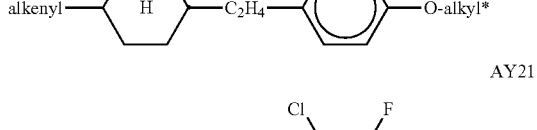

AY22
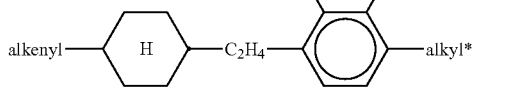

AY23
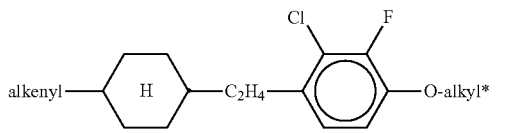

AY24
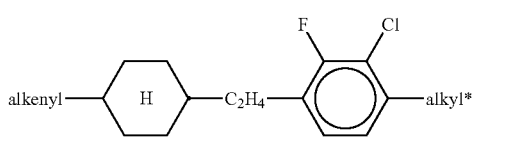

AY25
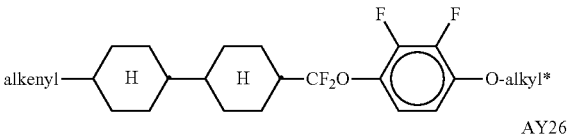

AY26
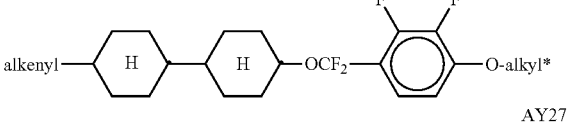

AY27
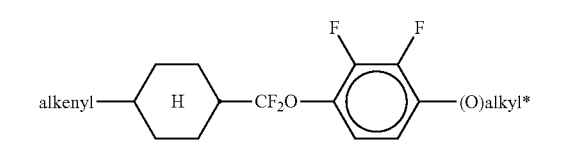

AY28
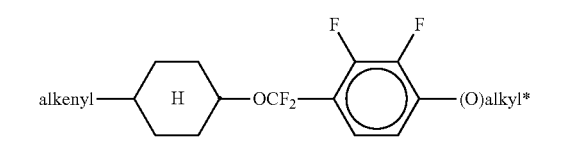

AY29
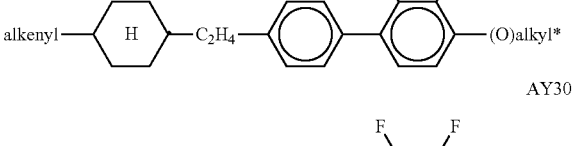

AY30
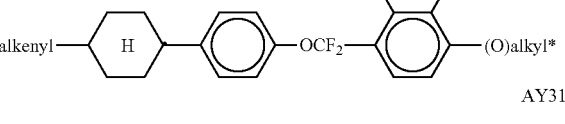

AY31
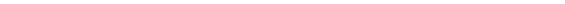

in which (O) denotes an oxygen atom or a single bond, alkyl and alkyl* each, independently of one another, denote a straight-chain alkyl radical having 1-6 C atoms, and alkenyl and alkenyl* each, independently of one another, denote a straight-chain alkenyl radical having 2-7 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very preferred compounds of the formula AN are selected from the following sub-formulae:

AN1a
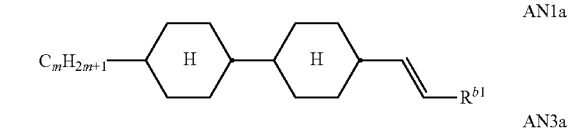

AN3a
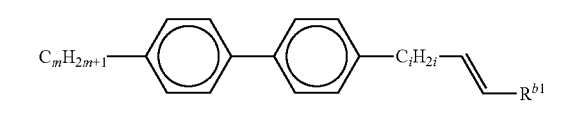

-continued

AN6a

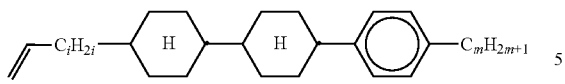

in which m denotes 1, 2, 3, 4, 5 or 6, i denotes 0, 1, 2 or 3, and $R^{b1}$ denotes H, $CH_3$ or $C_2H_5$.

Very particularly preferred compounds of the formula AN are selected from the following sub-formulae:

AN1a1

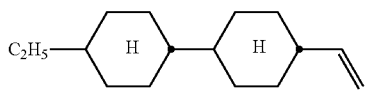

AN1a2

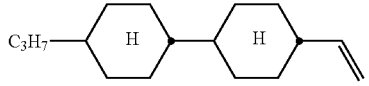

AN1a3

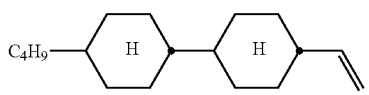

AN1a4

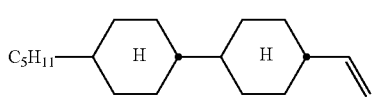

AN1a5

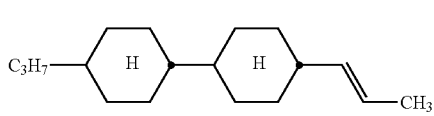

Most preferred are compounds of formula AN1a2 and AN1a5.

Very particularly preferred compounds of the formula AY are selected from the following sub-formulae:

AY5a

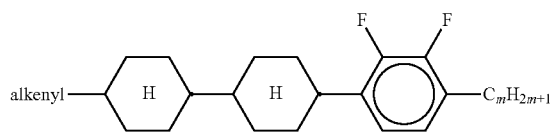

AY6a

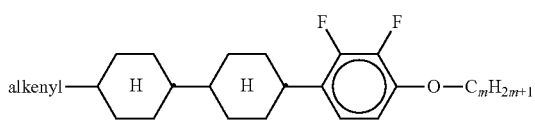

AY9a

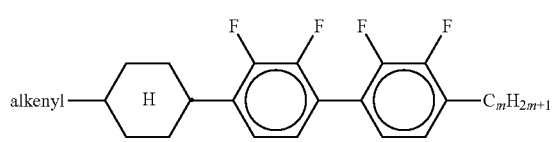

AY10a

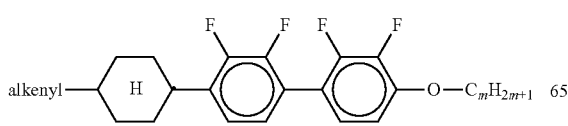

-continued

AY11a

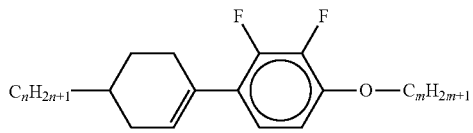

AY14a

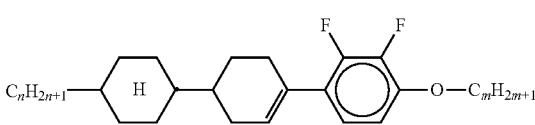

in which m and n each, independently of one another, denote 1, 2, 3, 4, 5 or 6, and alkenyl denotes $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

In a first preferred embodiment the LC medium contains an LC host mixture based on compounds with negative dielectric anisotropy. Such LC media are especially suitable for use in PS-VA and PS-UB-FFS displays. Particularly preferred embodiments of such an LC medium are those of sections a)-z) below:

a) LC medium which comprises one or more compounds of the formulae CY and/or PY:

CY

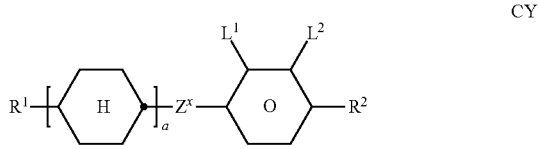

PY

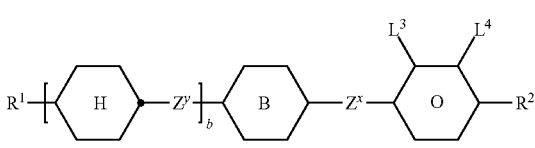

wherein
a denotes 1 or 2,
b denotes 0 or 1,

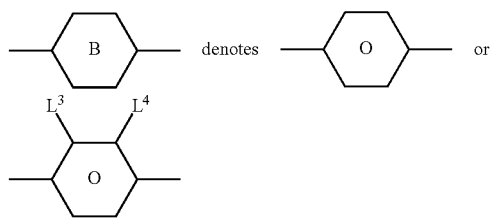

$R^1$ and $R^2$ each, independently of one another, denote alkyl having 1 to 12 C atoms, where, in addition, one or two non-adjacent $CH_2$ groups may each be replaced by —O—, —CH=CH—, —CO—, —OCO— or —OCO— in such a way that O atoms are not linked directly to one another, preferably alkyl or alkoxy having 1 to 6 C atoms, $Z^x$ and $Z^y$ each, independently of one another, denote —$CH_2CH_2$—, —CH=CH—, —$CF_2O$—, —$OCF_2$—, —CH$_2$O—, —OCH$_2$—, —CO—O—, —O—CO—, —C$_2$F$_4$—, —CF=CF—, —CH=CH—CH$_2$O— or a single bond, preferably a single bond, L$^{1-4}$ each, independently of one another, denote F, Cl, OCF$_3$, CF$_3$, CH$_3$, CH$_2$F, CHF$_2$.

Preferably, both L$^1$ and L$^2$ denote F or one of L$^1$ and L$^2$ denotes F and the other denotes Cl, or both L$^3$ and L$^4$ denote F or one of L$^3$ and L$^4$ denotes F and the other denotes Cl.

The compounds of the formula CY are preferably selected from the group consisting of the following sub-formulae:

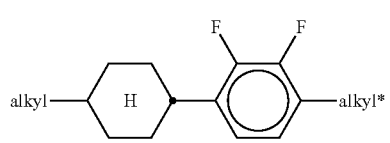
CY1

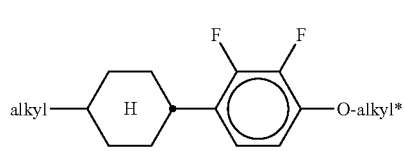
CY2

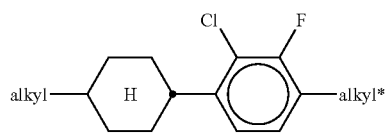
CY3

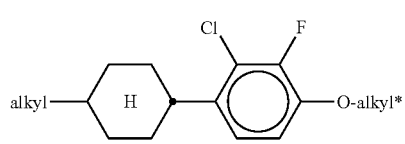
CY4

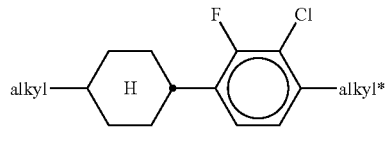
CY5

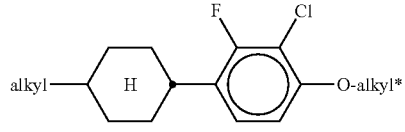
CY6

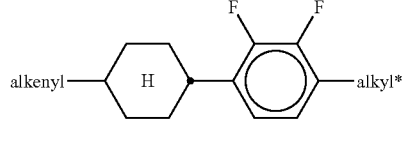
CY7

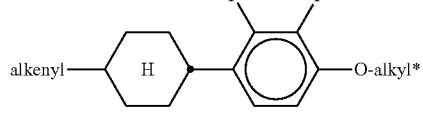
CY8

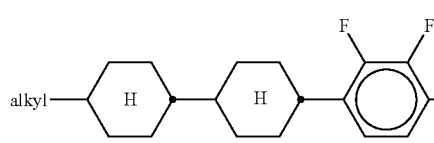
CY9

-continued

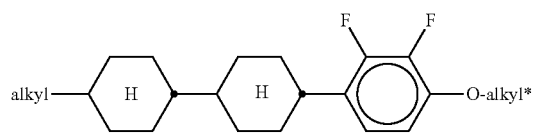
CY10

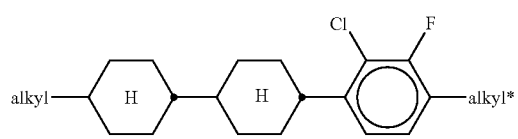
CY11

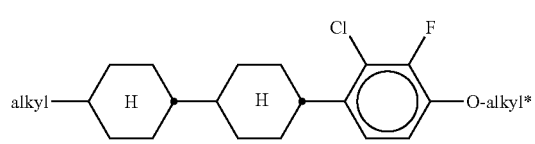
CY12

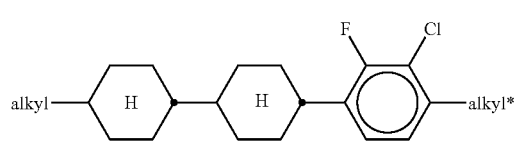
CY13

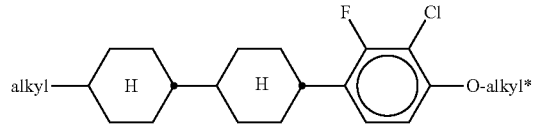
CY14

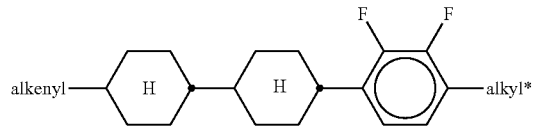
CY15

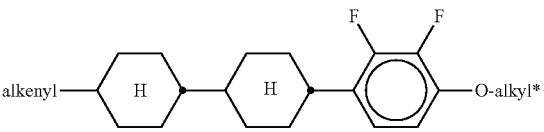
CY16

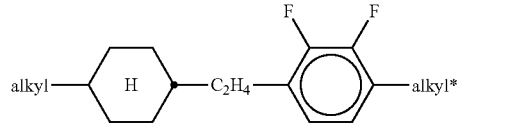
CY17

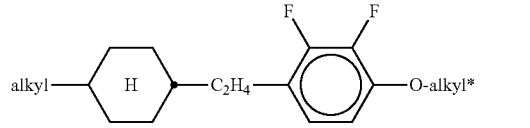
CY18

CY19

CY20
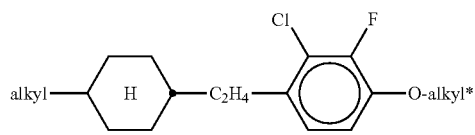

CY21
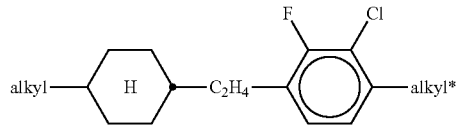

CY22
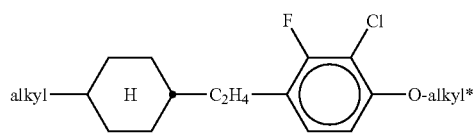

CY23
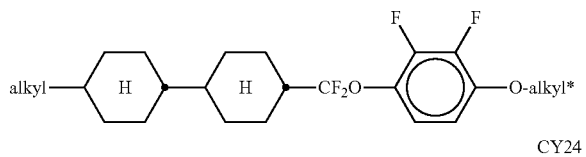

CY24
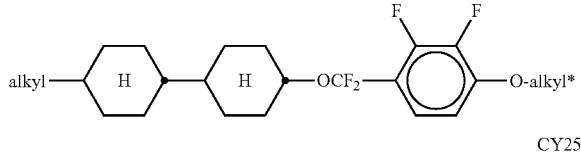

CY25
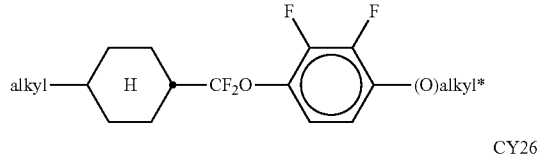

CY26
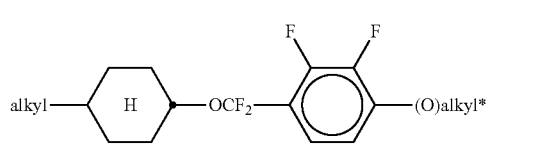

CY27
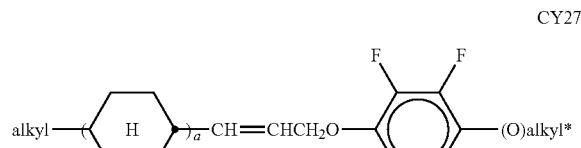

CY28
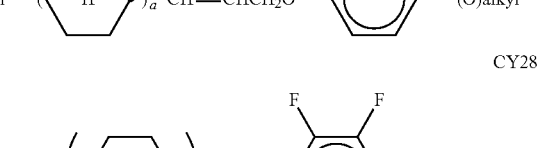

CY29
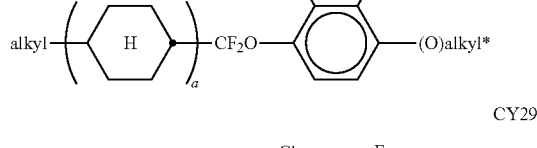

CY30

CY31

CY32

CY33 in which a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes CH₂=CH—, CH₂=CHCH₂CH₂—, CH₃—CH=CH—, CH₃—CH₂—CH=CH—, CH₃—(CH₂)₂—CH=CH—, CH₃—(CH₂)₃—CH=CH— or CH₃—CH=CH—(CH₂)₂—.

The compounds of the formula PY are preferably selected from the group consisting of the following sub-formulae:

PY1
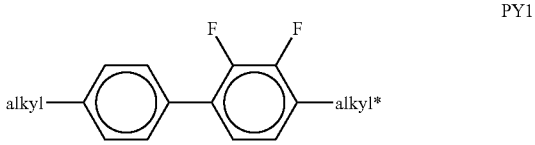

PY2
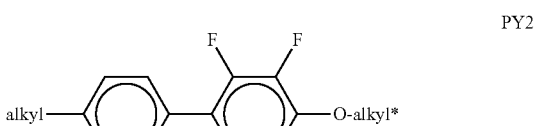

PY3
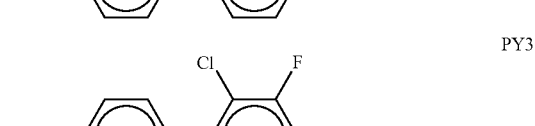

PY4
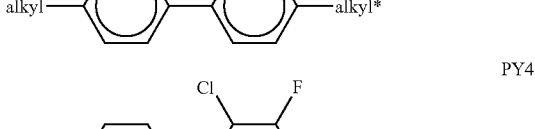

PY5 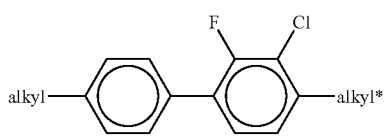

PY6 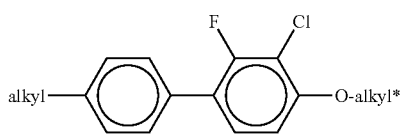

PY7 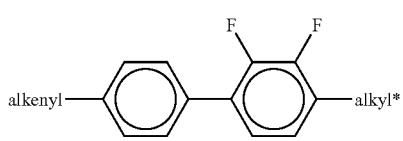

PY8 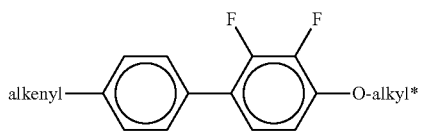

PY9 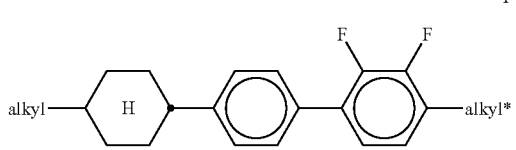

PY10 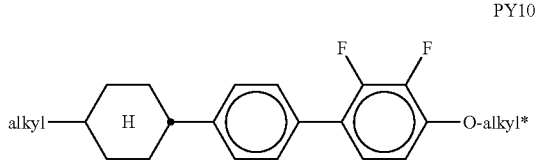

PY11 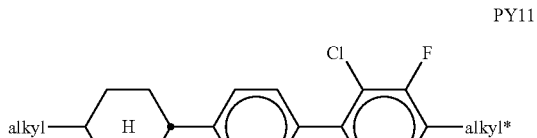

PY12 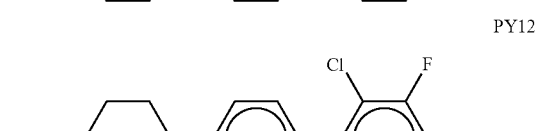

PY13 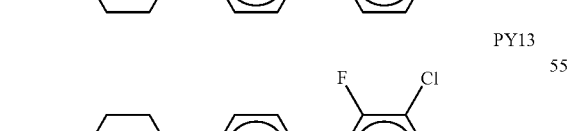

PY14 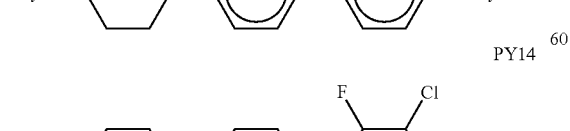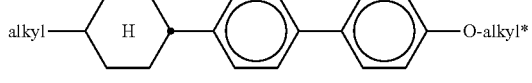

PY15 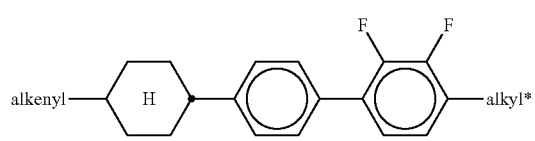

PY16 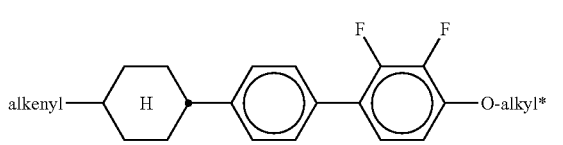

PY17 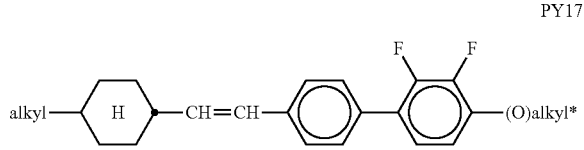

PY18 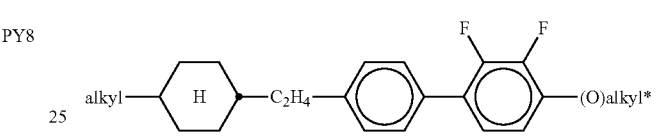

PY19 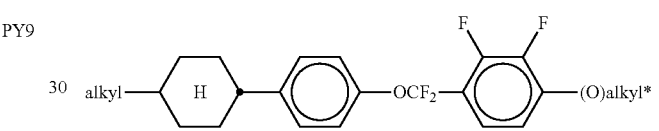

PY20 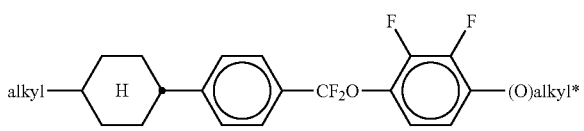

in which alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

b) LC medium which additionally comprises one or more compounds of the following formula:

ZK

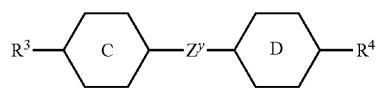

in which the individual radicals have the following meanings:

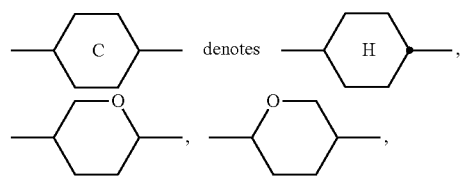

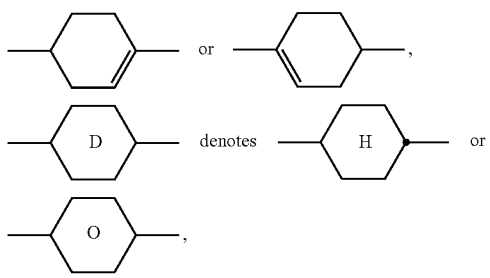

R³ and R⁴ each, independently of one another, denote alkyl having 1 to 12 C atoms, in which, in addition, one or two non-adjacent CH₂ groups may each be replaced by —O—, —CH=CH—, —CO—, —O—CO— or —CO—O— in such a way that O atoms are not linked directly to one another, $Z^y$ denotes —CH₂CH₂—, —CH=CH—, —CF₂O—, —OCF₂—, —CH₂O—, —OCH₂—, —CO—O—, —O—CO—, —C₂F₄—, —CF=CF—, —CH=CH—CH₂O— or a single bond, preferably a single bond.

The compounds of the formula ZK are preferably selected from the group consisting of the following sub-formulae:

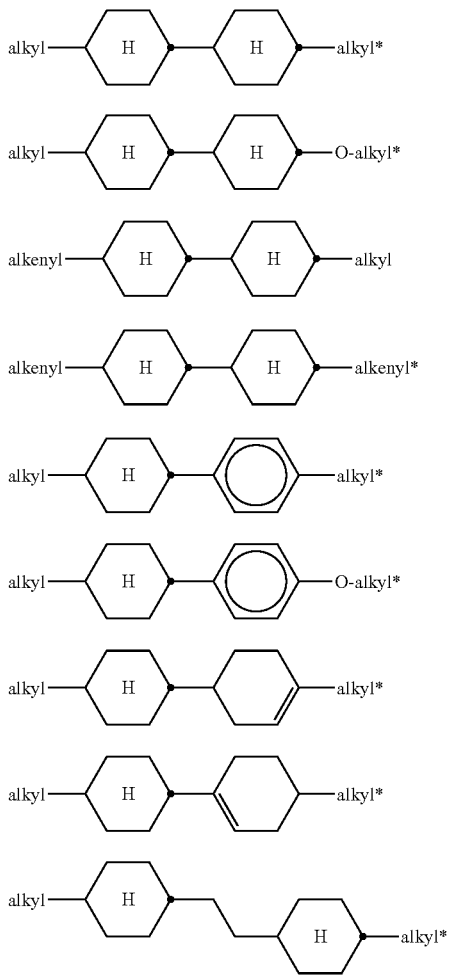

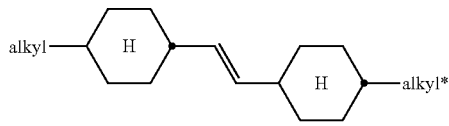

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl preferably denotes CH₂=CH—, CH₂=CHCH₂CH₂—, CH₃—CH=CH—, CH₃—CH₂—CH=CH—, CH₃—(CH₂)₂—CH=CH—, CH₃—(CH₂)₃—CH=CH— or CH₃—CH=CH—(CH₂)₂—.

Especially preferred are compounds of formula ZK1.

Particularly preferred compounds of formula ZK are selected from the following sub-formulae:

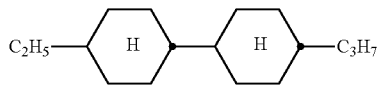

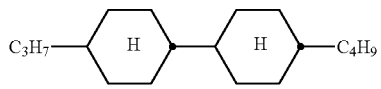

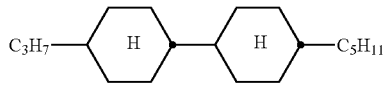

wherein the propyl, butyl and pentyl groups are straight-chain groups.

Most preferred are compounds of formula ZK1a.

c) LC medium which additionally comprises one or more compounds of the following formula:

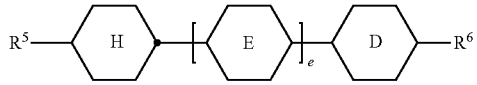

in which the individual radicals on each occurrence, identically or differently, have the following meanings:

R⁵ and R⁶ each, independently of one another, denote alkyl having 1 to 12 C atoms, where, in addition, one or two non-adjacent CH₂ groups may each be replaced by —O—, —CH=CH—, —CO—, —OCO— or —COO— in such a way that O atoms are not linked directly to one another, preferably alkyl or alkoxy having 1 to 6 C atoms,

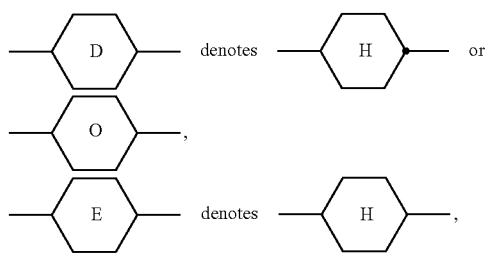

-continued

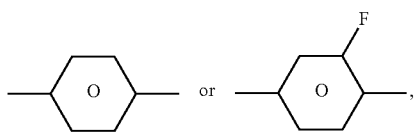

and e denotes 1 or 2.

The compounds of the formula DK are preferably selected from the group consisting of the following sub-formulae:

DK1

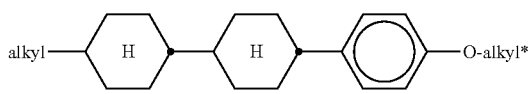
DK2

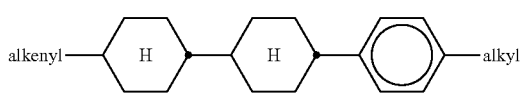
DK3

DK4

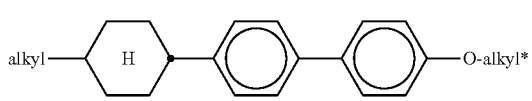
DK5

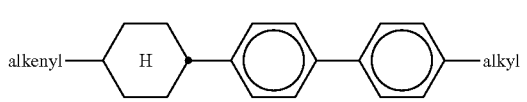
DK6

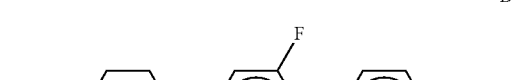
DK7

DK8

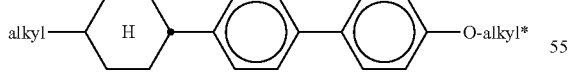
DK9

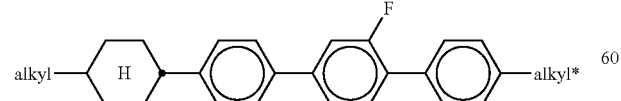
DK10

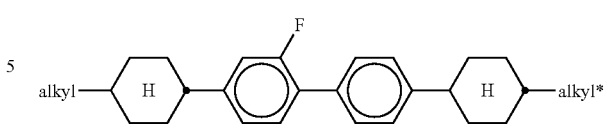
DK11

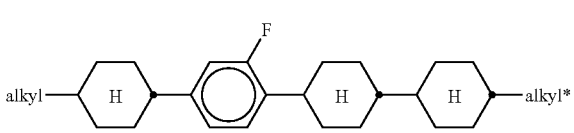
DK12 in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

d) LC medium which additionally comprises one or more compounds of the following formula:

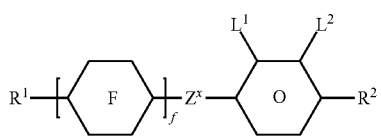
LY in which the individual radicals have the following meanings:

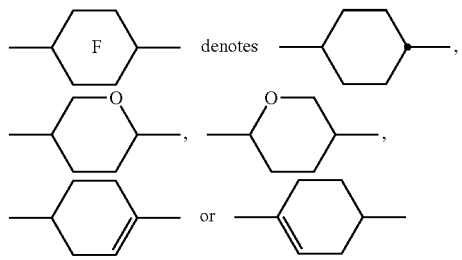

with at least one ring F being different from cyclohexylene,
f denotes 1 or 2,
$R^1$ and $R^2$ each, independently of one another, denote alkyl having 1 to 12 C atoms, where, in addition, one or two non-adjacent $CH_2$ groups may each be replaced by $-O-$, $-CH=CH-$, $-CO-$, $-OCO-$ or $-COO-$ in such a way that O atoms are not linked directly to one another,
$Z^x$ denotes $-CH_2CH_2-$, $-CH=CH-$, $-CF_2O-$, $-OCF_2-$, $-CH_2O-$, $-OCH_2-$, $-CO-O-$, $-O-CO-$, $-C_2F_4-$, $-CF=CF-$, $-CH=CH-CH_2O-$ or a single bond, preferably a single bond,
$L^1$ and $L^2$ each, independently of one another, denote F, Cl, $OCF_3$, $CF_3$, $CH_3$, $CH_2F$, $CHF_2$.
Preferably, both radicals $L^1$ and $L^2$ denote F or one of the radicals $L^1$ and $L^2$ denotes F and the other denotes Cl.
The compounds of the formula LY are preferably selected from the group consisting of the following sub-formulae:

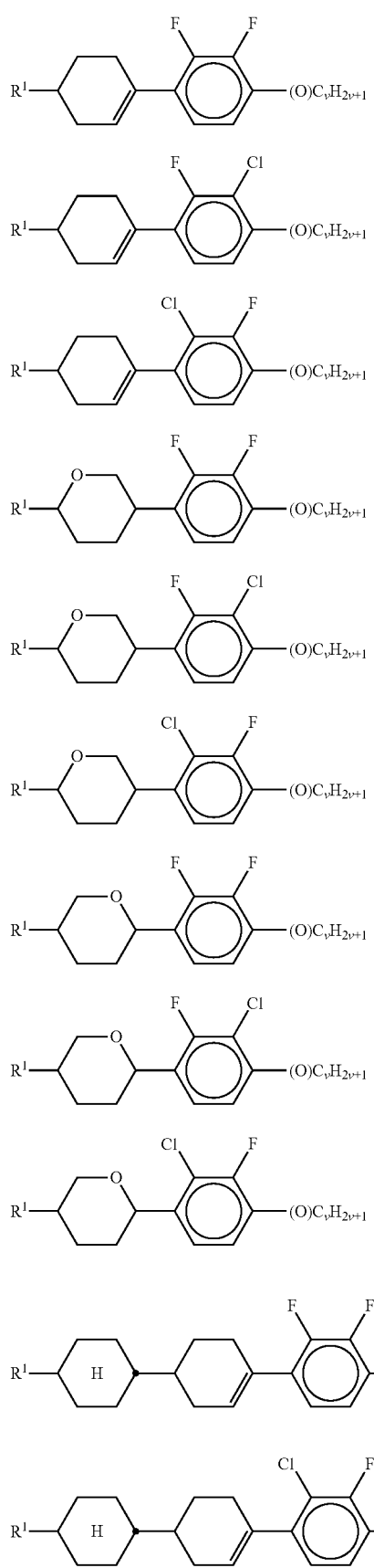
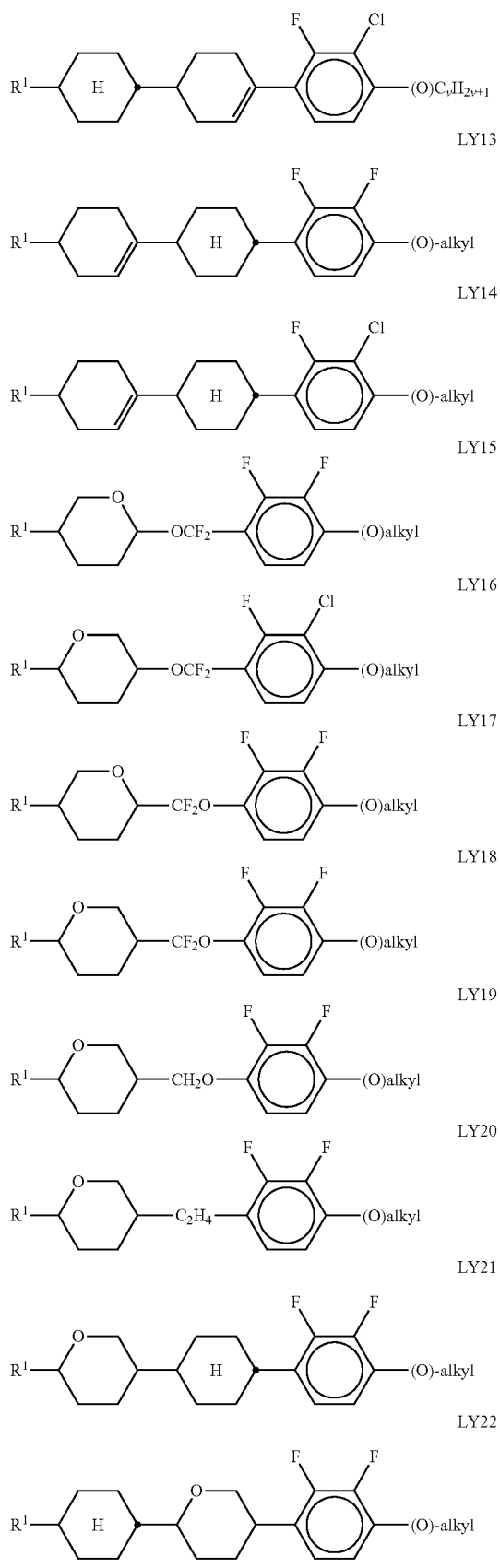

LY23

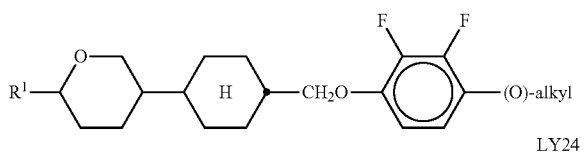

LY24

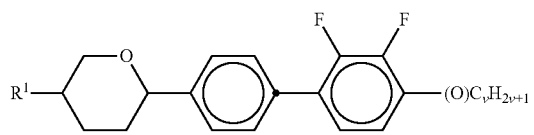

in which R¹ has the meaning indicated above, alkyl denotes a straight-chain alkyl radical having 1-6 C atoms, (O) denotes an oxygen atom or a single bond, and v denotes an integer from 1 to 6. R¹ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

e) LC medium which additionally comprises one or more compounds selected from the group consisting of the following formulae:

G1

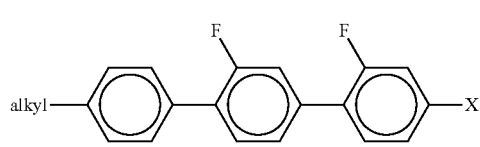

G2

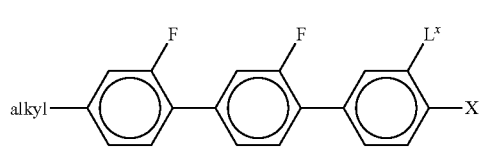

G3

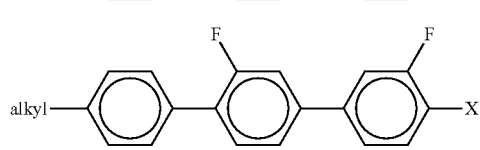

G4

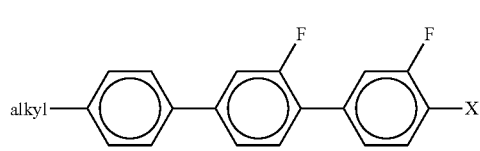

in which alkyl denotes $C_{1-6}$-alkyl, $L^x$ denotes H or F, and X denotes F, Cl, $OCF_3$, $OCHF_2$ or $OCH=CF_2$. Particular preference is given to compounds of the formula G1 in which X denotes F.

f) LC medium which additionally comprises one or more compounds selected from the group consisting of the following formulae:

Y1

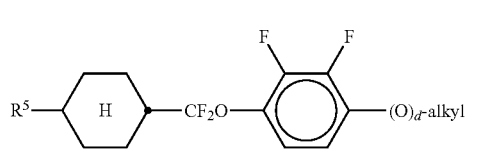

Y2

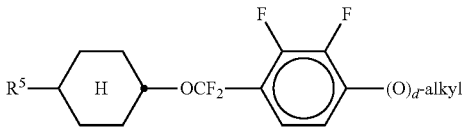

Y3

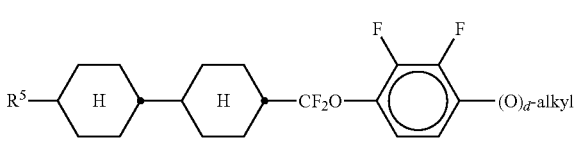

Y4

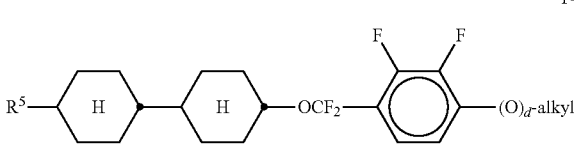

Y5

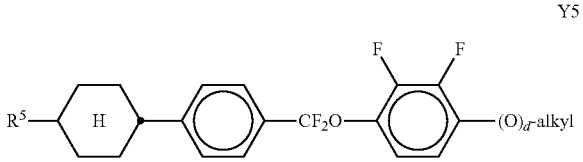

Y6

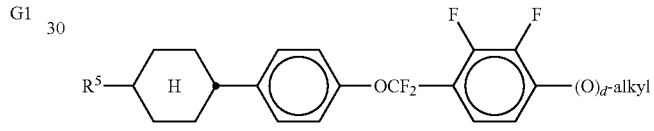

Y7

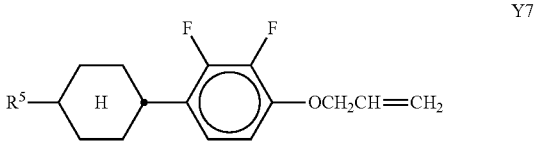

Y8

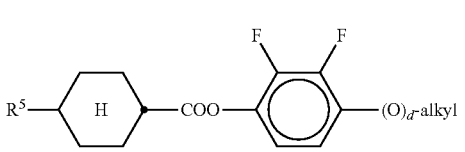

Y9

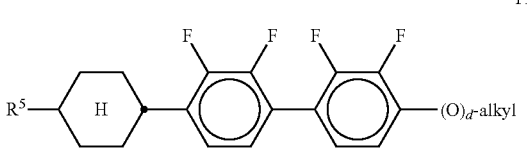

Y10

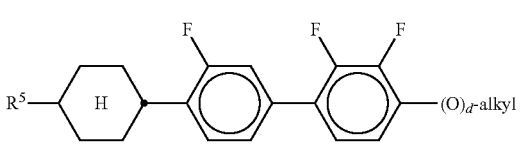

Y11

The compounds of the formula B2 are particularly preferred.

The compounds of the formulae B1 to B3 are preferably selected from the group consisting of the following sub-formulae:

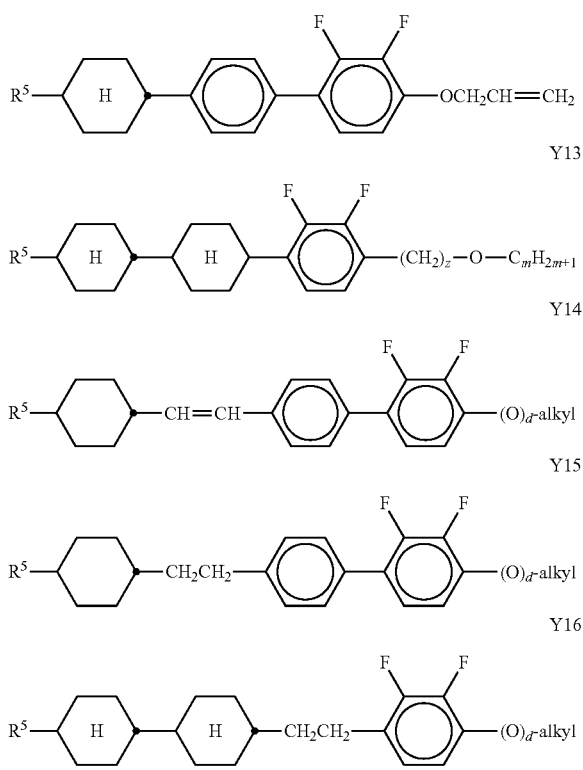

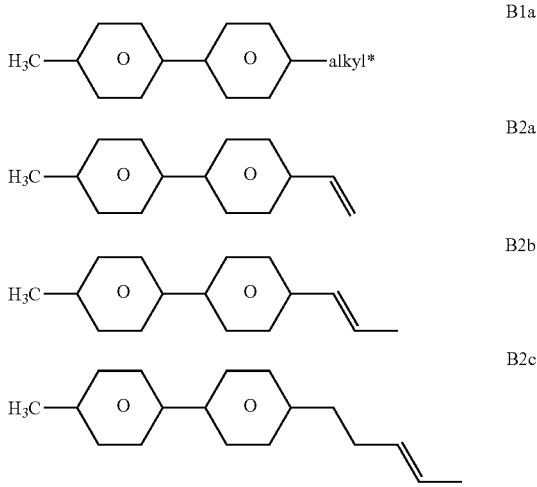

in which alkyl* denotes an alkyl radical having 1-6 C atoms. The medium according to the invention particularly preferably comprises one or more compounds of the formulae B1a and/or B2c.

h) LC medium which additionally comprises one or more terphenyl compounds of the following formula:

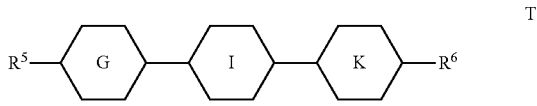

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of 5% by weight.

g) LC medium which additionally comprises one or more biphenyl compounds selected from the group consisting of the following formulae:

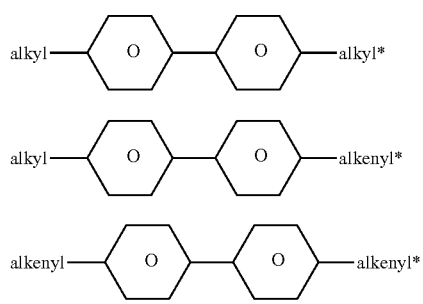

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The proportion of the biphenyls of the formulae B1 to B3 in the LC mixture is preferably at least 3% by weight, in particular 5% by weight.

in which $R^5$ and $R^6$ each, independently of one another, have one of the meanings indicated above, and

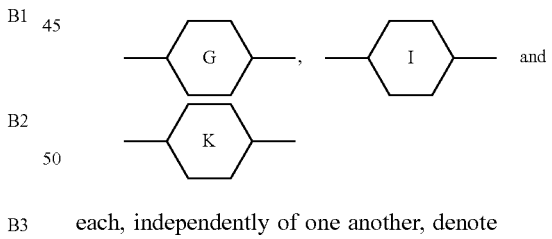

each, independently of one another, denote

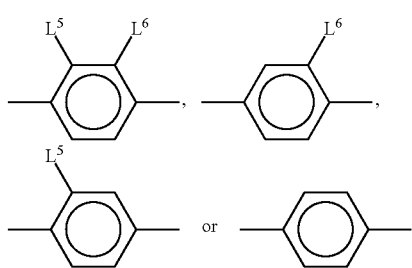

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the group consisting of the following sub-formulae:
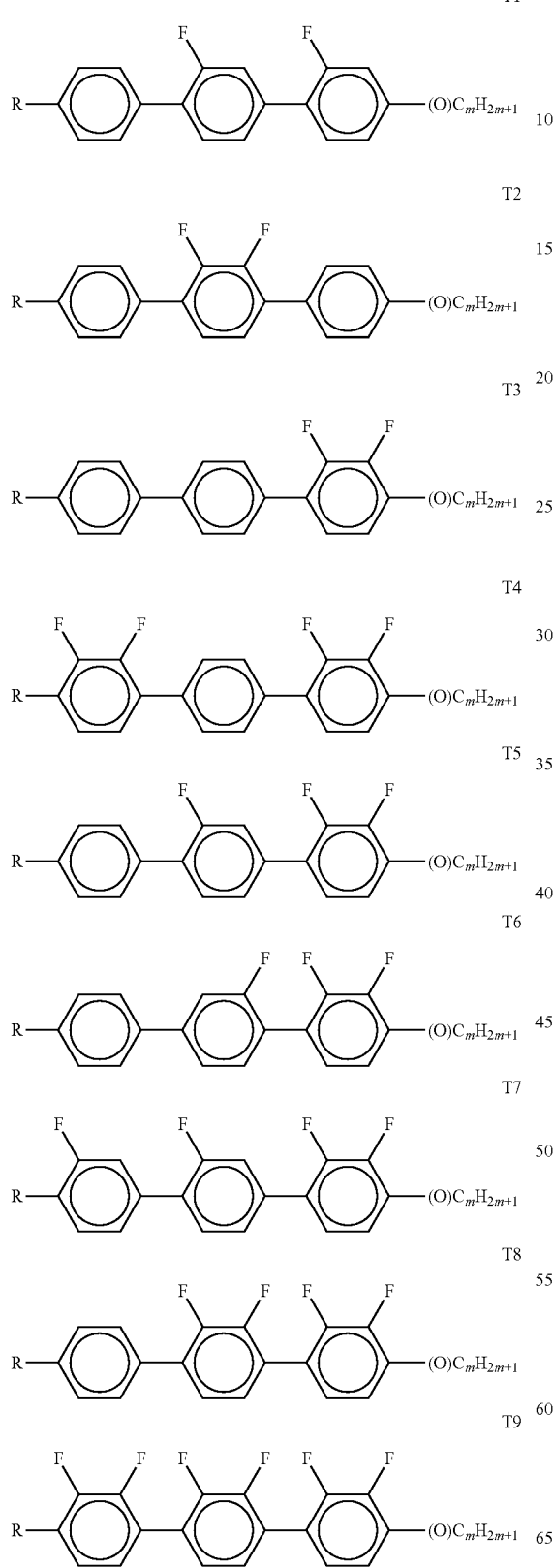
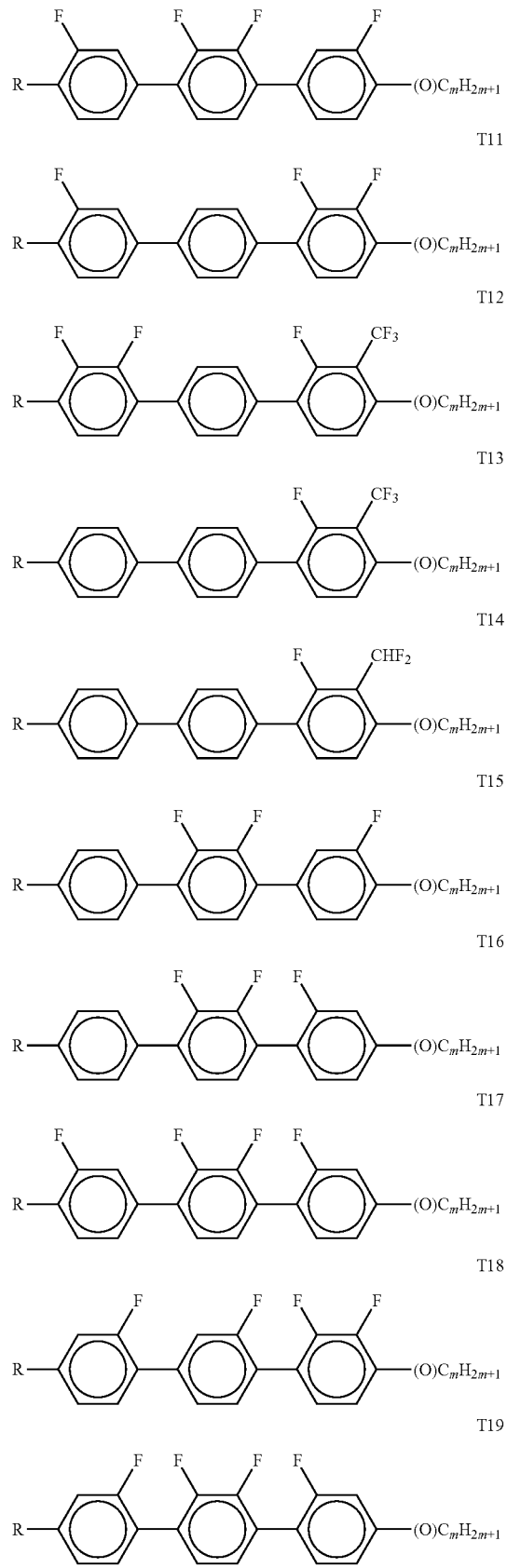

-continued

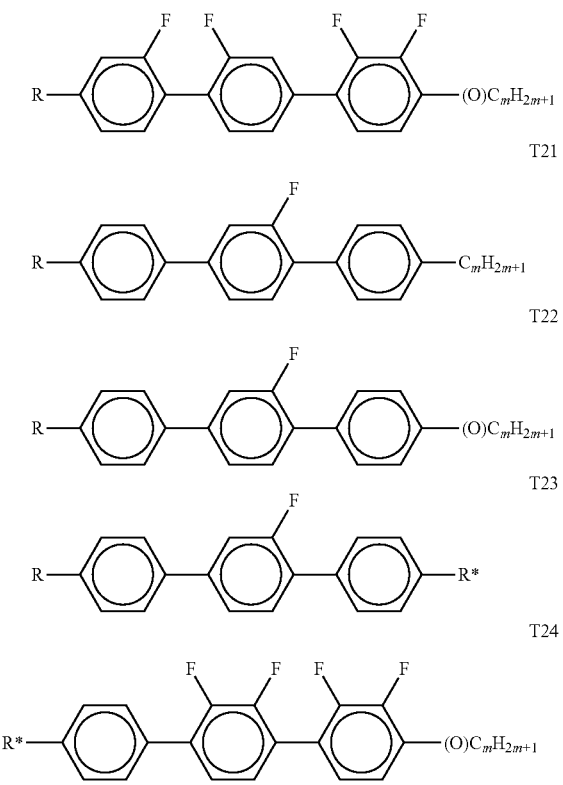

in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be 0.1. Preferred mixtures comprise 2-20% by weight of one or more terphenyl compounds of the formula T, preferably selected from the group of compounds T1 to T22.

i) LC medium which additionally comprises one or more compounds selected from the group consisting of the following formulae:

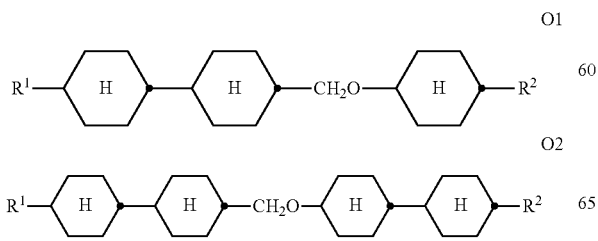

-continued

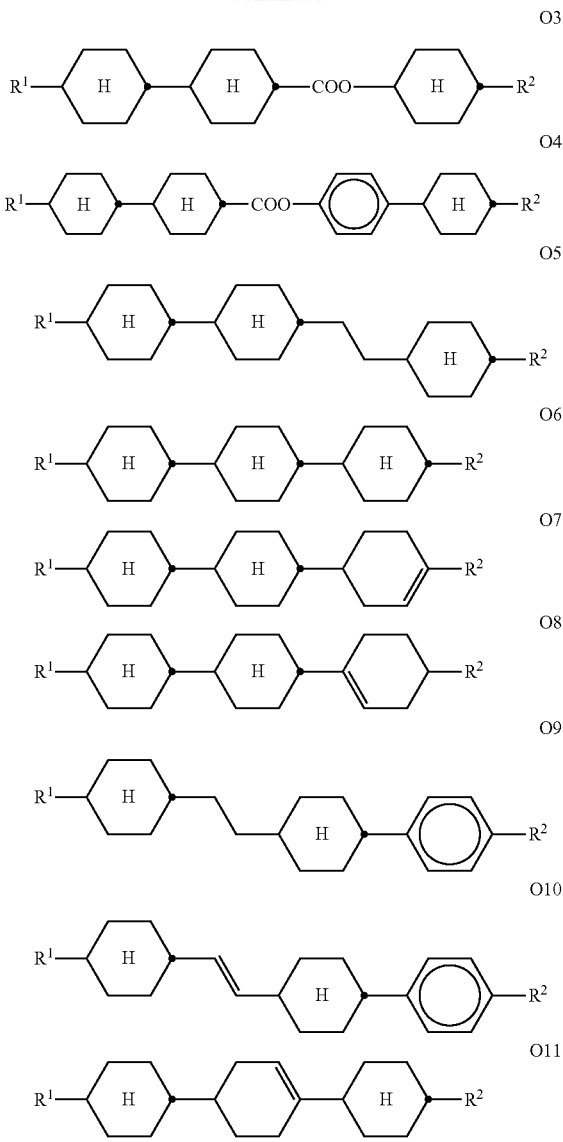

in which $R^1$ and $R^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

k) LC medium which additionally comprises one or more compounds of the following formula:

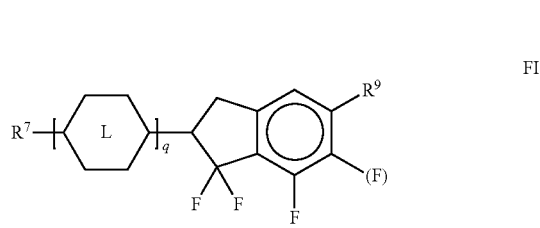

in which

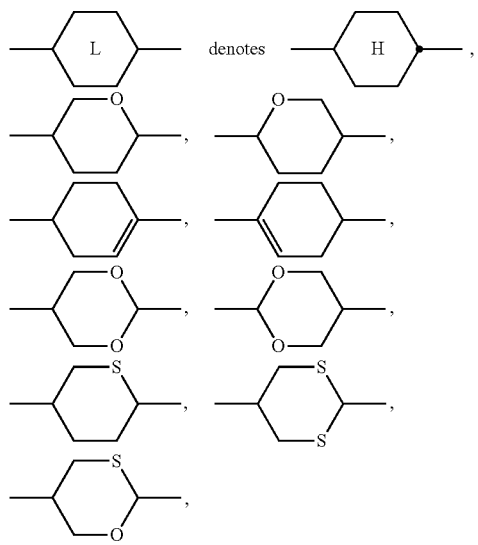

R⁹ denotes H, CH₃, C₂H₅ or n-C₃H₇, (F) denotes an optional fluorine substituent, and q denotes 1, 2 or 3, and R⁷ has one of the meanings indicated for R¹, preferably in amounts of >3% by weight, in particular 5% by weight and very particularly preferably 5-30% by weight.

Particularly preferred compounds of the formula FI are selected from the group consisting of the following sub-formulae:

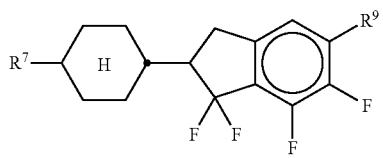

FI1

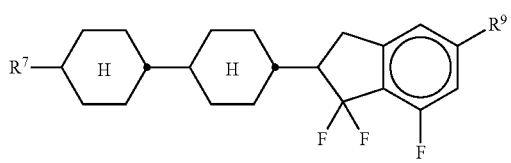

FI2, FI3

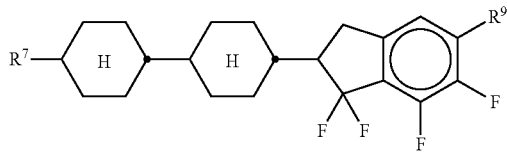

FI4, FI5

FI6

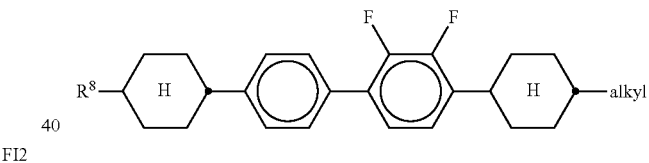

FI7

FI8 in which R⁷ preferably denotes straight-chain alkyl, and R⁹ denotes CH₃, C₂H₅ or n-C₃H₇. Particular preference is given to the compounds of the formulae FI1, FI2 and FI3.

l) LC medium which additionally comprises one or more compounds selected from the group consisting of the following formulae:

VK1

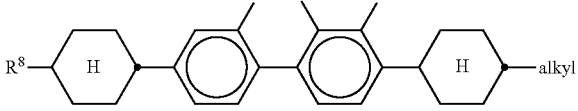

VK2

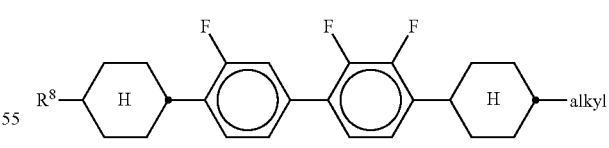

VK3

VK4

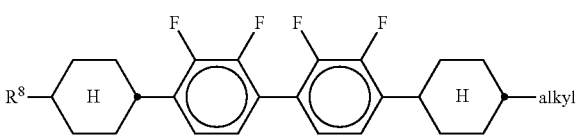

in which R⁸ has the meaning indicated for R¹, and alkyl denotes a straight-chain alkyl radical having 1-6 C atoms.

m) LC medium which additionally comprises one or more compounds which contain a tetrahydronaphthyl or naphthyl unit, such as, for example, the compounds selected from the group consisting of the following formulae:

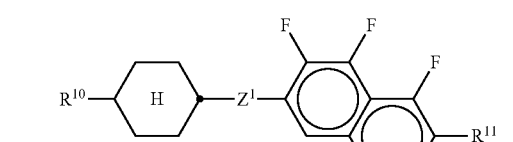 N1

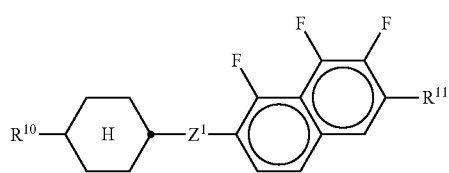 N2

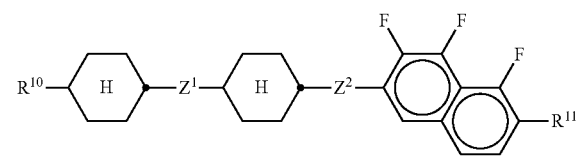 N3

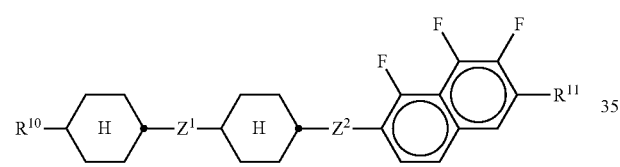 N4

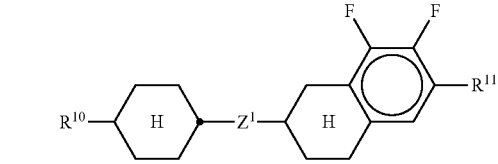 N5

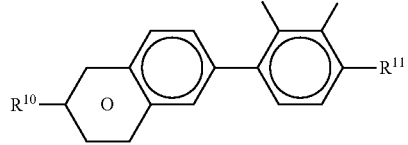 N6

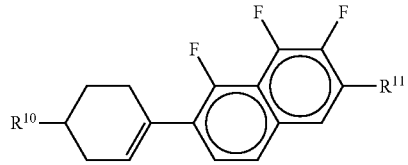 N7

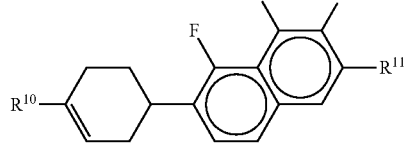 N8

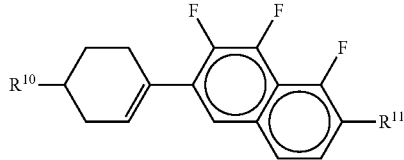 N9

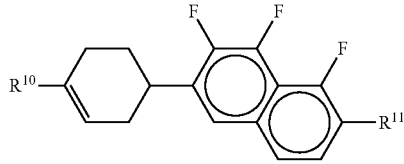 N10 in which $R^{10}$ and $R^{11}$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, and $R^{10}$ and $R^{11}$ preferably denote straight-chain alkyl or alkoxy having 1 to 6 C atoms or straight-chain alkenyl having 2 to 6 C atoms, and $Z^1$ and $Z^2$ each, independently of one another, denote —C$_2$H$_4$—, —CH=CH—, —(CH$_2$)$_4$—, —(CH$_2$)$_3$O—, —O(CH$_2$)$_3$—, —CH=CH—CH$_2$CH$_2$—, —CH$_2$CH$_2$CH=CH—, —CH$_2$O—, —OCH$_2$—, —CO—O—, —O—CO—, —C$_2$F$_4$—, —CF=CF—, —CF=CH—, —CH=CF—, —CH$_2$— or a single bond.

n) LC medium which additionally comprises one or more difluorodibenzo-chromans and/or chromans of the following formulae:

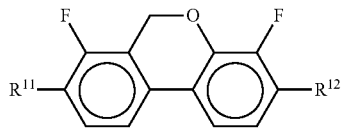 BC

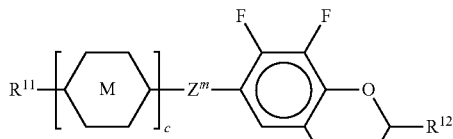 CR

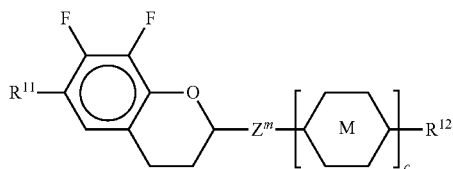 RC in which $R^{11}$ and $R^{12}$ each, independently of one another, have one of the meanings indicated above for $R^{11}$, ring M is trans-1,4-cyclohexylene or 1,4-phenylene, $Z^m$ —C$_2$H$_4$—, —CH$_2$O—, —OCH$_2$—, —CO—O— or —O—CO—, c is 0, 1 or 2, preferably in amounts of 3 to 20% by weight, in particular in amounts of 3 to 15% by weight.

Particularly preferred compounds of the formulae BC, CR and RC are selected from the group consisting of the following sub-formulae:
BC1
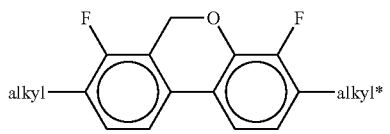
BC2
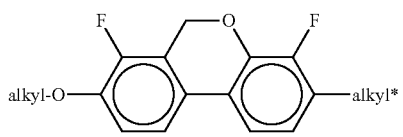
BC3
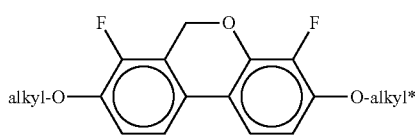
BC4
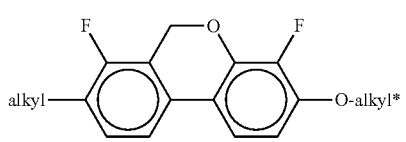
BC5
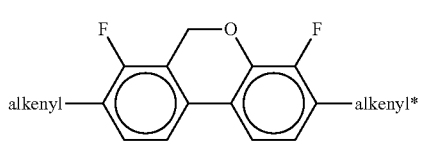
BC6
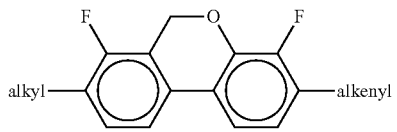
BC7
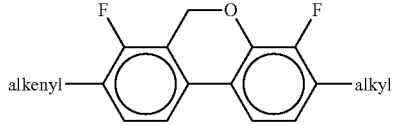
CR1
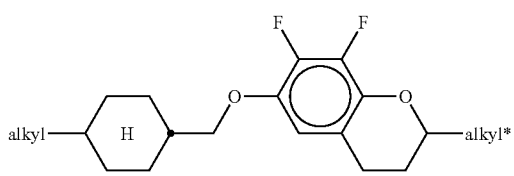
CR2
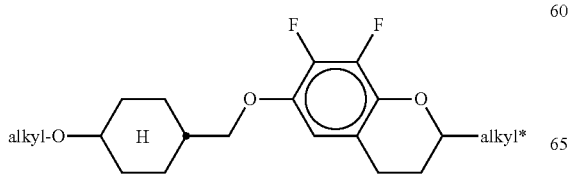
-continued
CR3
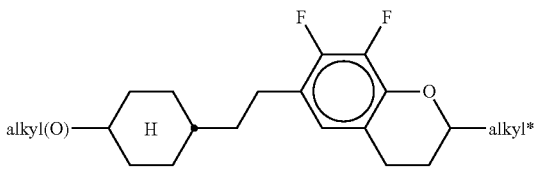
CR4
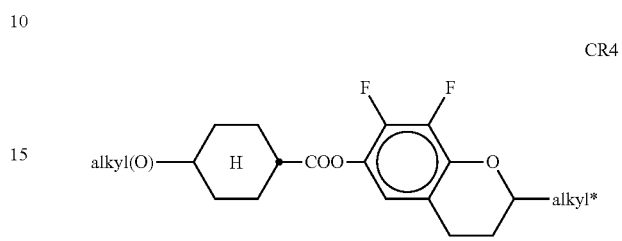
CR5
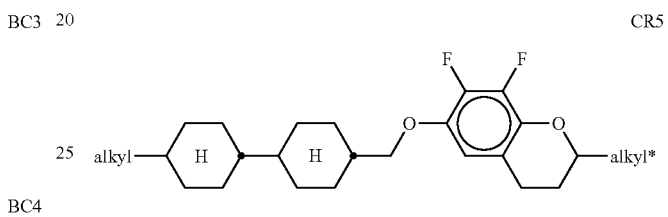
CR6
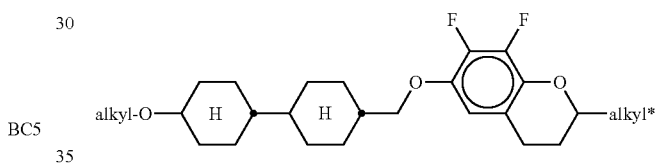
CR7
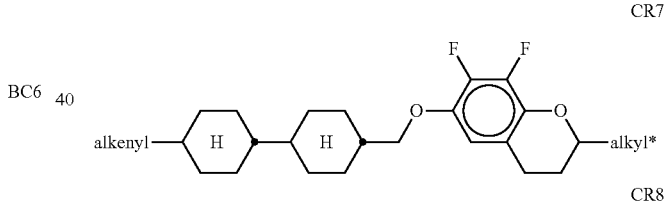
CR8
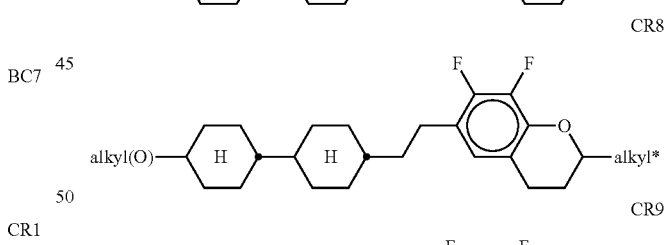
CR9
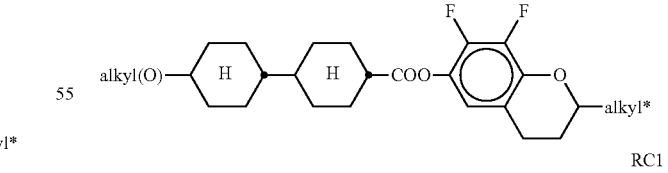
RC1
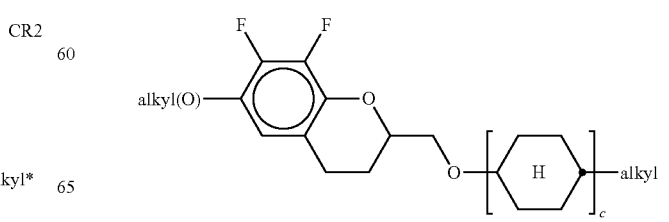

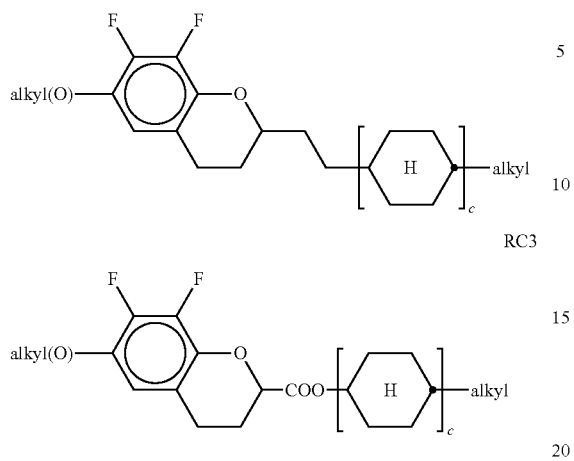

RC2

RC3 in which alkyl and alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very particular preference is given to mixtures comprising one, two or three compounds of the formula BC-2.

o) LC medium which additionally comprises one or more fluorinated phenanthrenes and/or dibenzofurans of the following formulae:

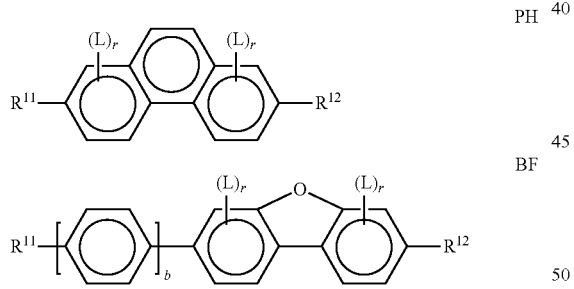

PH

BF in which $R^{11}$ and $R^{12}$ each, independently of one another, have one of the meanings indicated above for $R^1$, b denotes 0 or 1, L denotes F, and r denotes 1, 2 or 3.

Particularly preferred compounds of the formulae PH and BF are selected from the group consisting of the following sub-formulae:

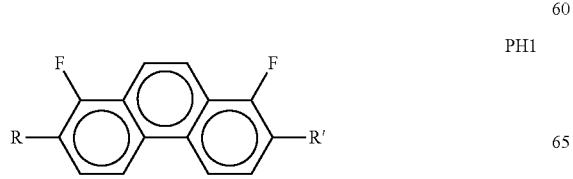

PH1

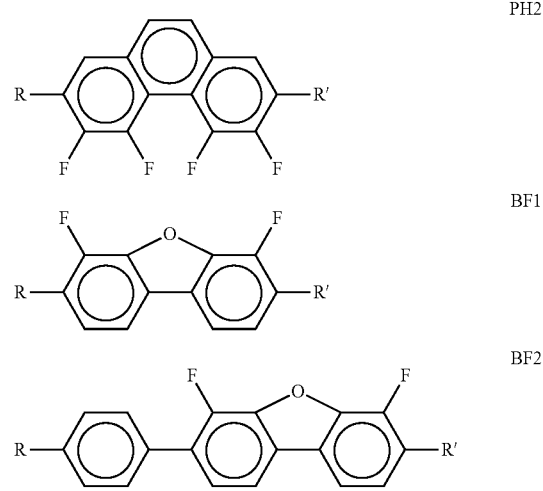

PH2

BF1

BF2 in which R and R' each, independently of one another, denote a straight-chain alkyl or alkoxy radical having 1-7 C atoms.

p) LC medium which additionally comprises one or more monocyclic compounds of the following formula

YA wherein $R^1$ and $R^2$ each, independently of one another, denote alkyl having 1 to 12 C atoms, where, in addition, one or two non-adjacent $CH_2$ groups may each be replaced by $-O-$, $-CH=CH-$, $-CO-$, $-OCO-$ or $-COO-$ in such a way that O atoms are not linked directly to one another, preferably alkyl or alkoxy having 1 to 6 C atoms, $L^1$ and $L^2$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, The compounds of the formula YA are preferably selected from the group consisting of the following sub-formulae:

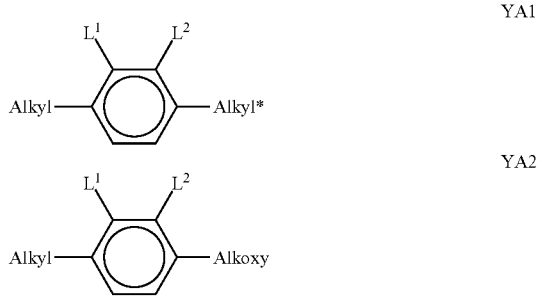

YA1

YA2

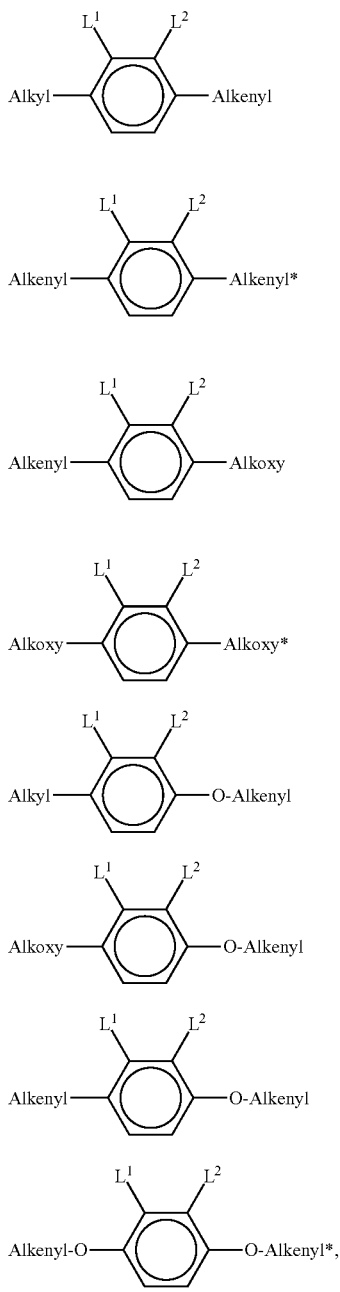

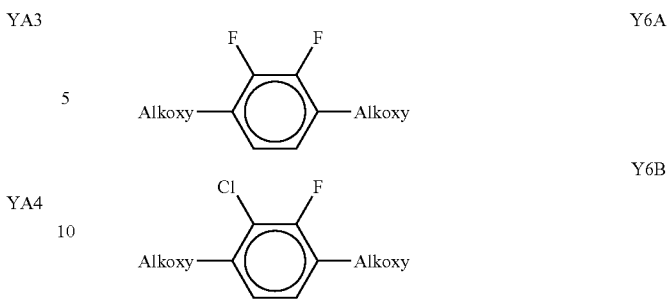

wherein Alkoxy preferably denotes straight-chain alkoxy with 3, 4, or 5 C atoms.

in which, Alkyl and Alkyl* each, independently of one another, denote a straight-chain alkyl radical having 1-6 C atoms, Alkoxy and Alkoxy* each, independently of one another, denote a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2$=CH—, $CH_2$=CHCH$_2$CH$_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

Particularly preferred compounds of the formula Y are selected from the group consisting of the following sub-formulae:

q) LC medium which, apart from the polymerizable compounds according to the invention, in particular of the formula I or sub-formulae thereof and the comonomers, comprises no compounds which contain a terminal vinyloxy group (—O—CH=$CH_2$).

r) LC medium which comprises 1 to 5, preferably 1, 2 or 3, polymerizable compounds, preferably selected from polymerizable compounds according to the invention, in particular of the formula I or sub-formulae thereof.

s) LC medium in which the proportion of polymerizable compounds, in particular of the formula I or sub-formulae thereof, in the mixture as a whole is 0.05 to 5%, preferably 0.1 to 1%.

t) LC medium which comprises 1 to 8, preferably 1 to 5, compounds of the formulae CY1, CY2, PY1 and/or PY2. The proportion of these compounds in the mixture as a whole is preferably 5 to 60%, particularly preferably 10 to 35%. The content of these individual compounds is preferably in each case 2 to 20%.

u) LC medium which comprises 1 to 8, preferably 1 to 5, compounds of the formulae CY9, CY10, PY9 and/or PY10. The proportion of these compounds in the mixture as a whole is preferably 5 to 60%, particularly preferably 10 to 35%. The content of these individual compounds is preferably in each case 2 to 20%.

v) LC medium which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.

w) LC medium in which the proportion of compounds of the formulae CY, PY and ZK in the mixture as a whole is greater than 70%, preferably greater than 80%.

x) LC medium in which the LC host mixture contains one or more compounds containing an alkenyl group, preferably selected from the group consisting of formula CY, PY and LY, wherein one or both of $R^1$ and $R^2$ denote straight-chain alkenyl having 2-6 C atoms, formula ZK and DK, wherein one or both of $R^3$ and $R^4$ or one or both of $R^5$ and $R^6$ denote straight-chain alkenyl having 2-6 C atoms, and formula B2 and B3, very preferably selected from formulae CY15, CY16, CY24, CY32, PY15, PY16, ZK3, ZK4, DK3, DK6, B2 and B3, most preferably selected from formulae ZK3, ZK4, B2 and B3. The concentration of these compounds in the LC host mixture is preferably from 2 to 70%, very preferably from 3 to 55%.

y) LC medium which contains one or more, preferably 1 to 5, compounds selected of formula PY1-PY8, very preferably of formula PY2. The proportion of these compounds in the mixture as a whole is preferably 1 to 30%, particularly preferably 2 to 20%. The content of these individual compounds is preferably in each case 1 to 20%.

z) LC medium which contains one or more, preferably 1, 2 or 3, compounds of formula T2. The content of these compounds in the mixture as a whole is preferably 1 to 20%.

The combination of compounds of the preferred embodiments mentioned above with the polymerized compounds described above causes low threshold voltages, low rotational viscosities and very good low-temperature stabilities in the LC media according to the invention at the same time as constantly high clearing points and high HR values. In particular, the LC media exhibit significantly shortened response times, in particular also the grey-shade response times, compared to displays from the prior art.

The LC medium and the LC host mixture preferably has a nematic phase range of at least 80 K, particularly preferably at least 100 K, and a rotational viscosity of not greater than 250 mPa·s, preferably not greater than 200 mPa·s, very preferably not greater than 150 mPa·s, at 20° C.

The LC medium according to the invention preferably has a negative dielectric anisotropy $\Delta\epsilon$ from −0.5 to −10, very preferably from −2.5 to −7.5, at 20° C. and 1 kHz.

The LC medium according to the invention preferably has a birefringence $\Delta n$ below 0.16, very preferably from 0.06 to 0.14, very particularly preferably from 0.07 to 0.12.

The LC medium according to the invention may also comprise further additives which are known to the person skilled in the art and are described in the literature, such as, for example, polymerization initiators, inhibitors, stabilizers, surface-active substances or chiral dopants. These may be polymerizable or non-polymerizable. Polymerizable additives are accordingly ascribed to the polymerizable component or component A). Non-polymerizable additives are accordingly ascribed to the non-polymerizable component or component B).

In a preferred embodiment the LC medium contains one or more chiral dopants, preferably in a concentration from 0.01 to 1%, very preferably from 0.05 to 0.5%. The chiral dopants are preferably selected from the group consisting of compounds from Table B below, very preferably from the group consisting of R- or S-1011, R- or S-2011, R- or S-3011, R- or S-4011, and R- or S-5011.

In another preferred embodiment the LC medium contains a racemate of one or more chiral dopants, which are preferably selected from the chiral dopants mentioned in the previous paragraph.

Furthermore, it is possible to add to the LC medium for example 0 to 15% by weight of pleochroic dyes, furthermore nanoparticles, conductive salts, preferably ethyldimethyldodecylammonium 4-hexoxybenzoate, tetrabutyl-ammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-z) of the LC medium according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerizable compounds as defined above, and optionally with further liquid crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes.

The structure of the LC displays according to the invention corresponds to the usual geometry for FFS displays, as described in the prior art cited at the outset.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

The following abbreviations are used:
(n, m, z: in each case, independently of one another, 1, 2, 3, 4, 5 or 6)

TABLE A

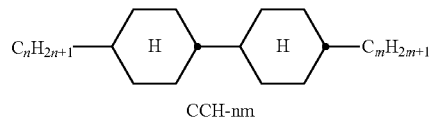

CCH-nm

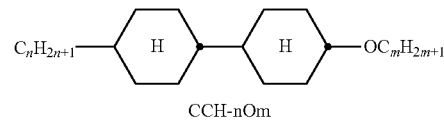

CCH-nOm

TABLE A-continued
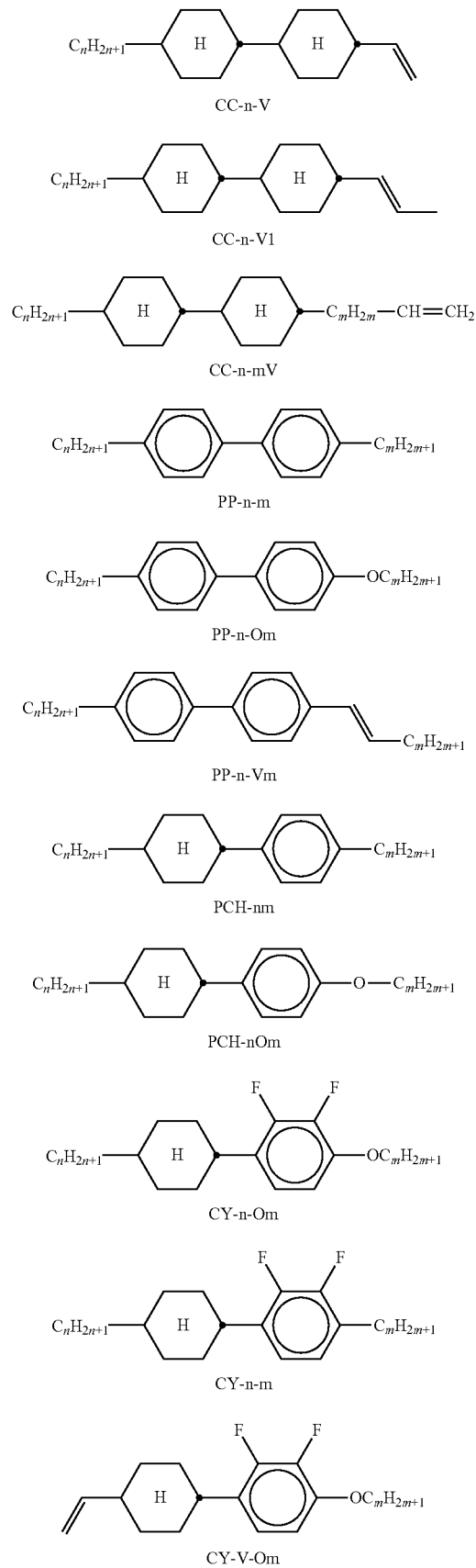

TABLE A-continued
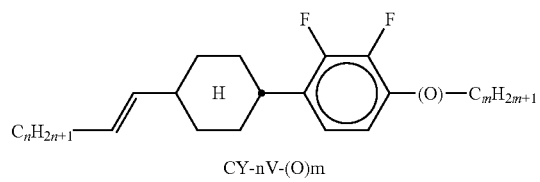
CY-nV-(O)m
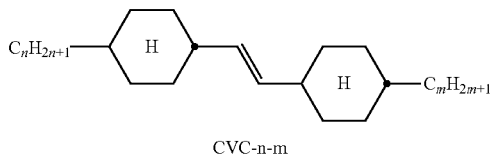
CVC-n-m
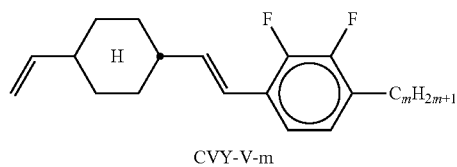
CVY-V-m
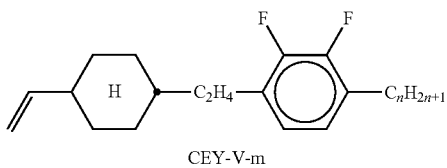
CEY-V-m
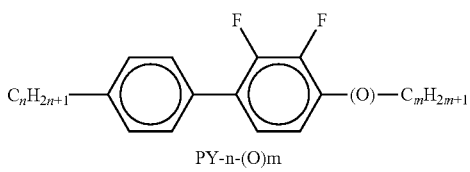
PY-n-(O)m
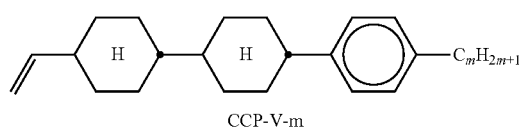
CCP-V-m
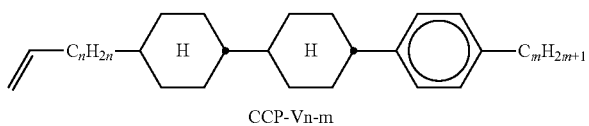
CCP-Vn-m
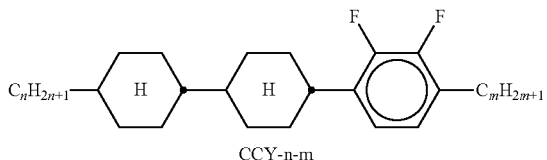
CCY-n-m
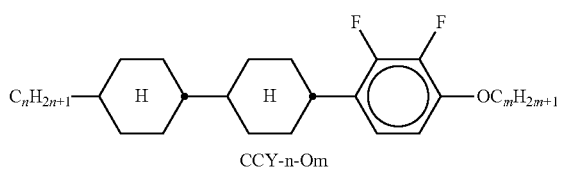
CCY-n-Om TABLE A-continued
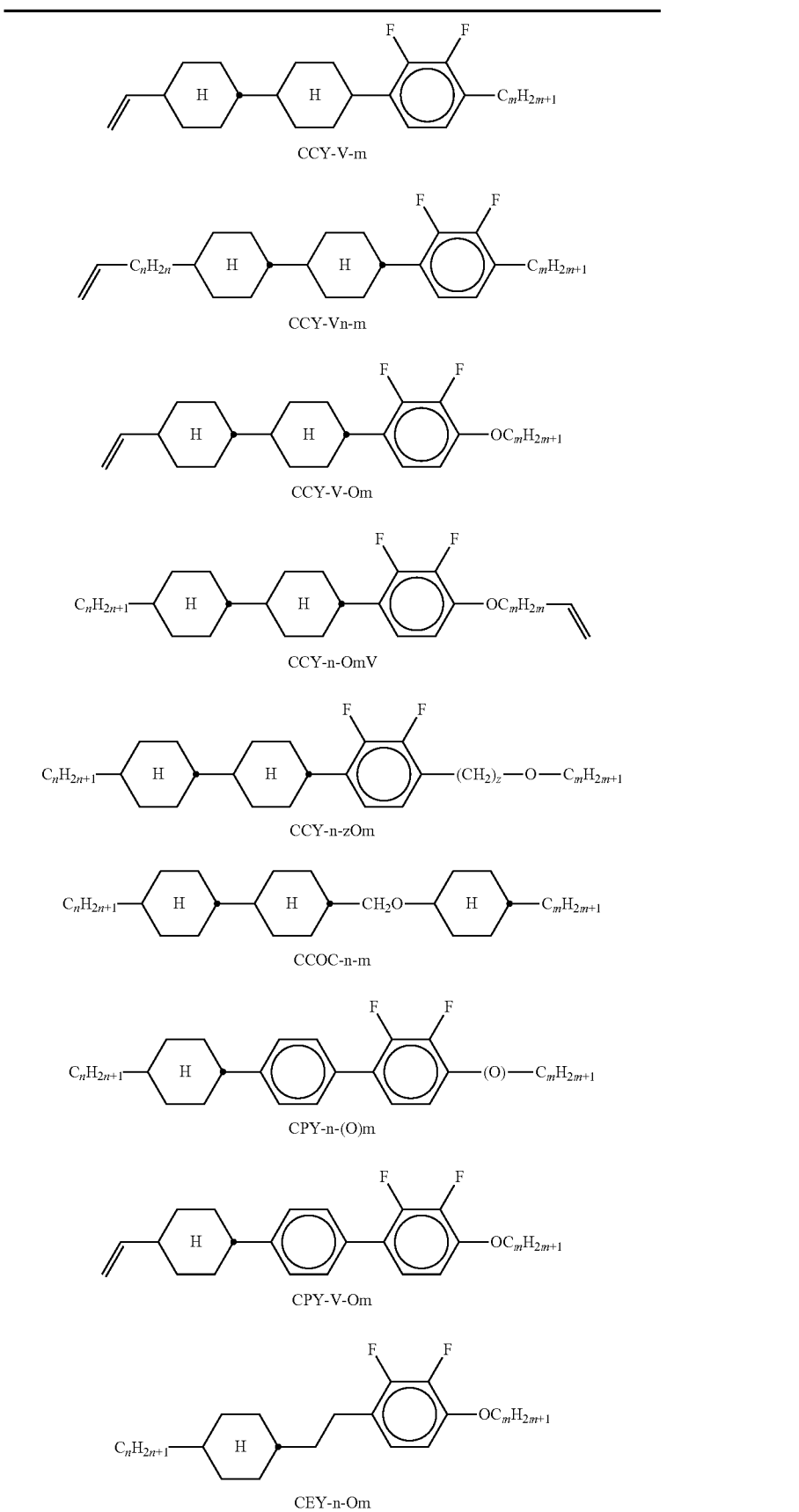

TABLE A-continued
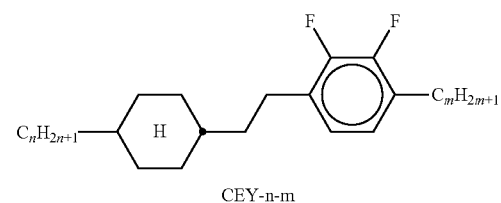
CEY-n-m
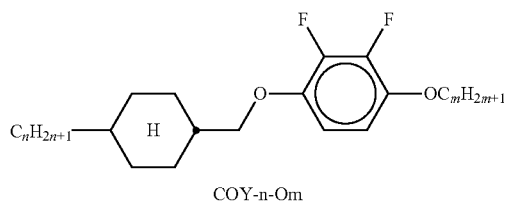
COY-n-Om
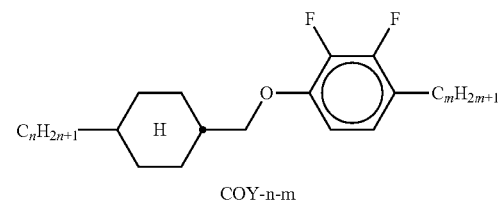
COY-n-m
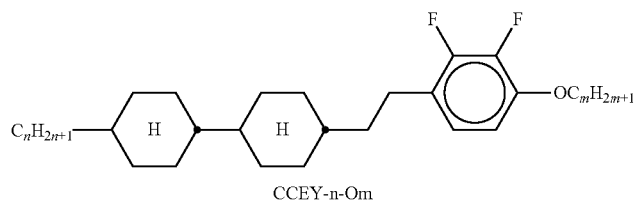
CCEY-n-Om
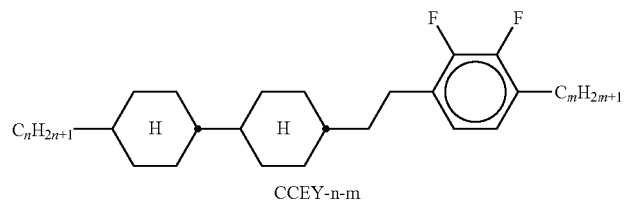
CCEY-n-m
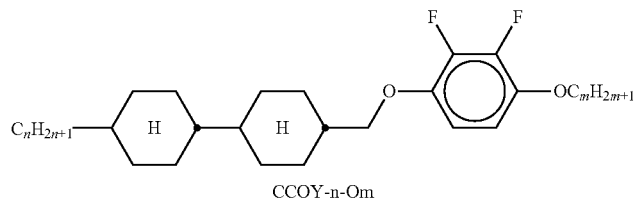
CCOY-n-Om
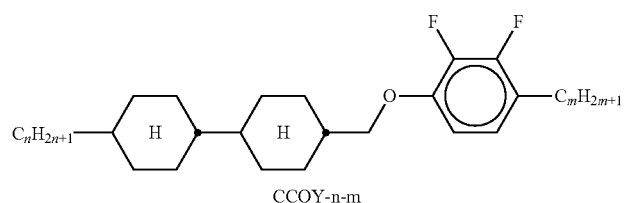
CCOY-n-m TABLE A-continued
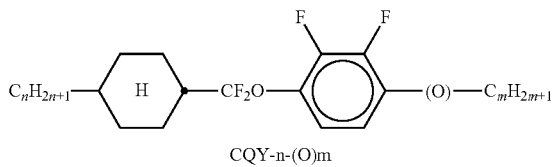
CQY-n-(O)m
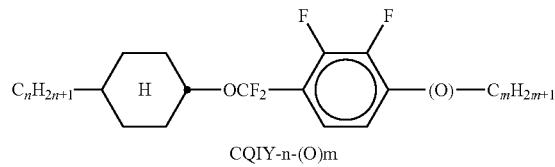
CQIY-n-(O)m
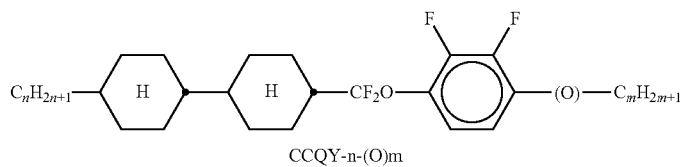
CCQY-n-(O)m
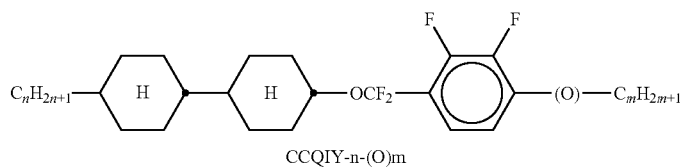
CCQIY-n-(O)m
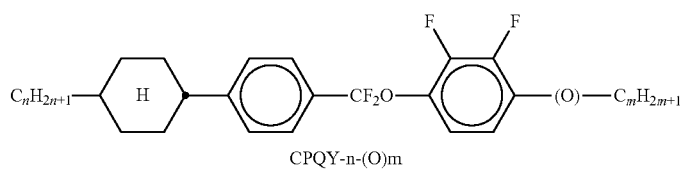
CPQY-n-(O)m
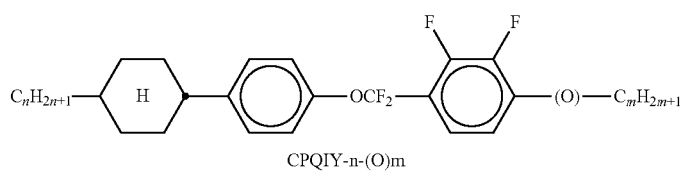
CPQIY-n-(O)m
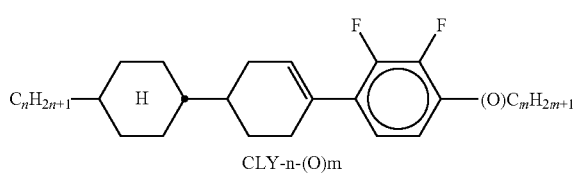
CLY-n-(O)m
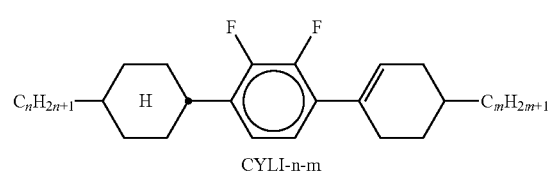
CYLI-n-m
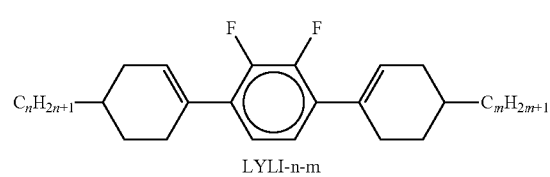
LYLI-n-m TABLE A-continued
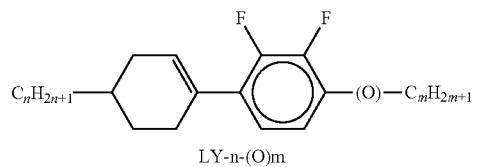
LY-n-(O)m
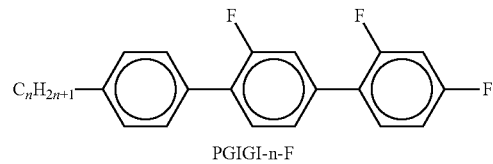
PGIGI-n-F
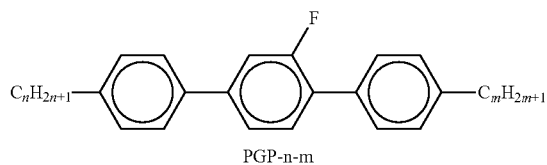
PGP-n-m
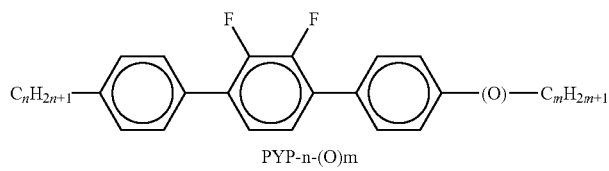
PYP-n-(O)m
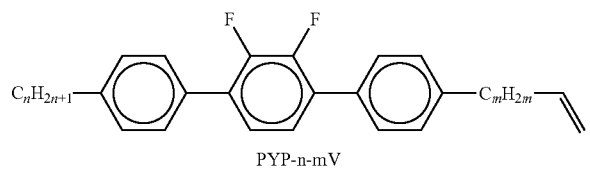
PYP-n-mV
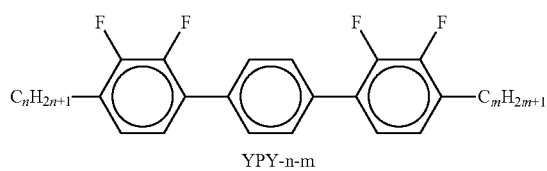
YPY-n-m
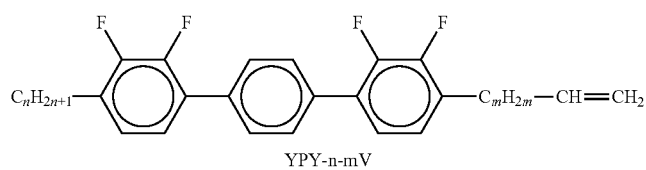
YPY-n-mV
BCH-nm
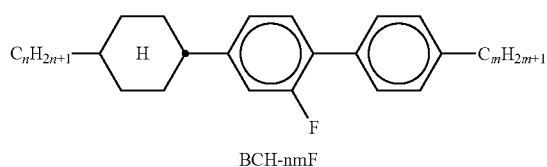
BCH-nmF TABLE A-continued
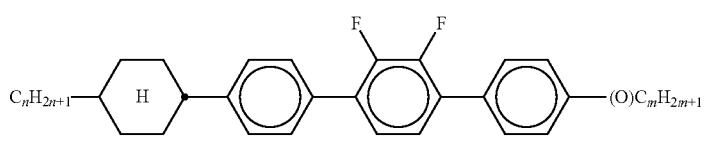
CPYP-n-(O)m
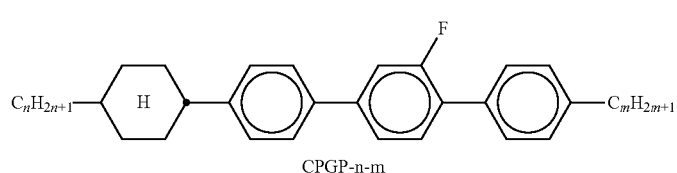
CPGP-n-m
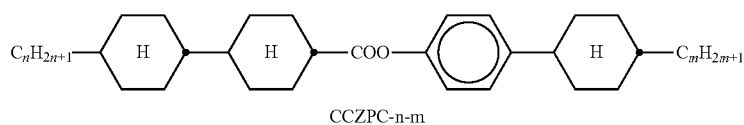
CCZPC-n-m
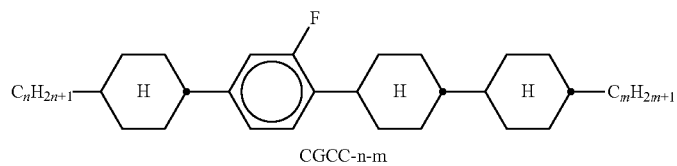
CGCC-n-m
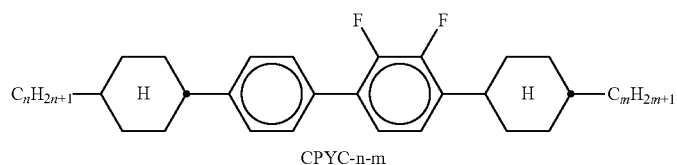
CPYC-n-m
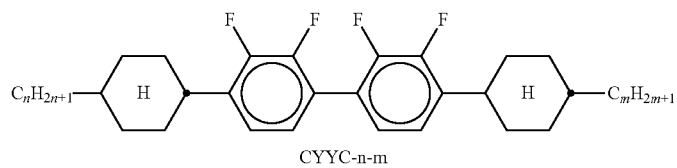
CYYC-n-m
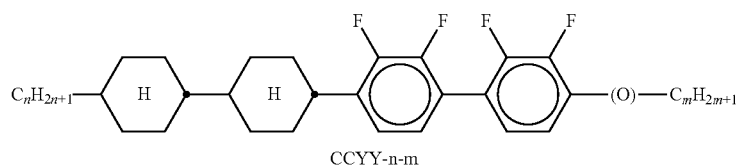
CCYY-n-m
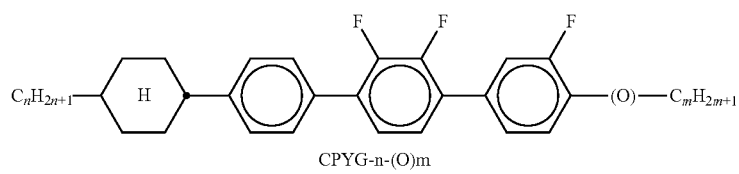
CPYG-n-(O)m
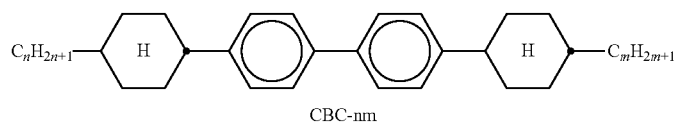
CBC-nm TABLE A-continued
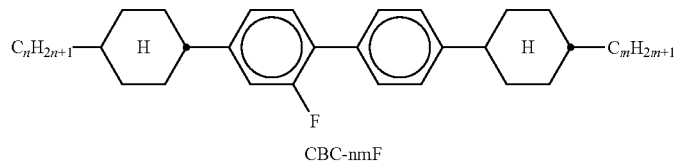
CBC-nmF
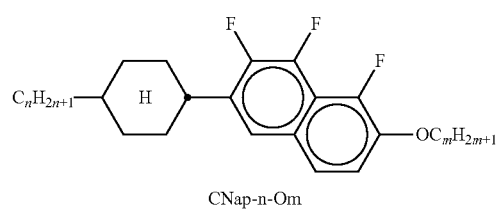
CNap-n-Om
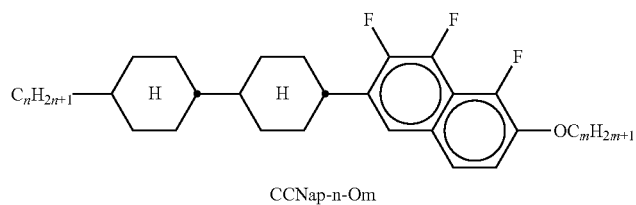
CCNap-n-Om
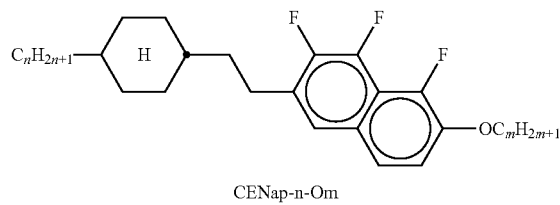
CENap-n-Om
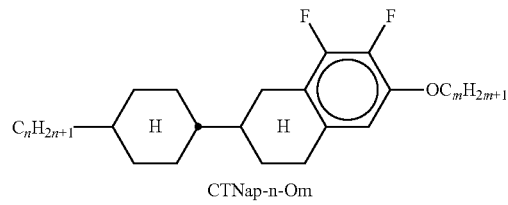
CTNap-n-Om
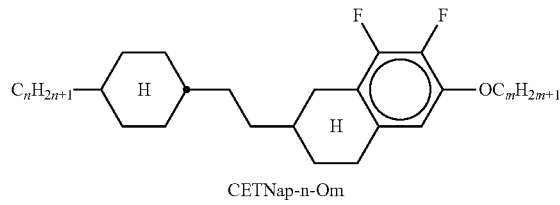
CETNap-n-Om
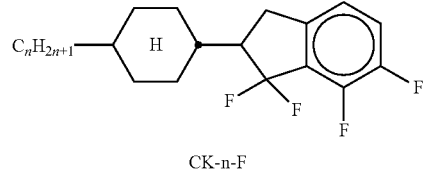
CK-n-F
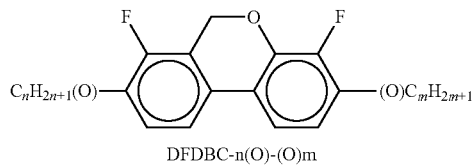
DFDBC-n(O)-(O)m TABLE A-continued
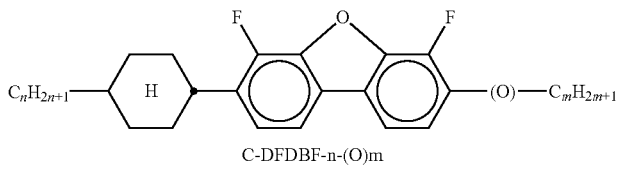
C-DFDBF-n-(O)m
In a preferred embodiment of the present invention, the LC media according to the invention comprise one or more compounds selected from the group consisting of compounds from Table A.
TABLE B
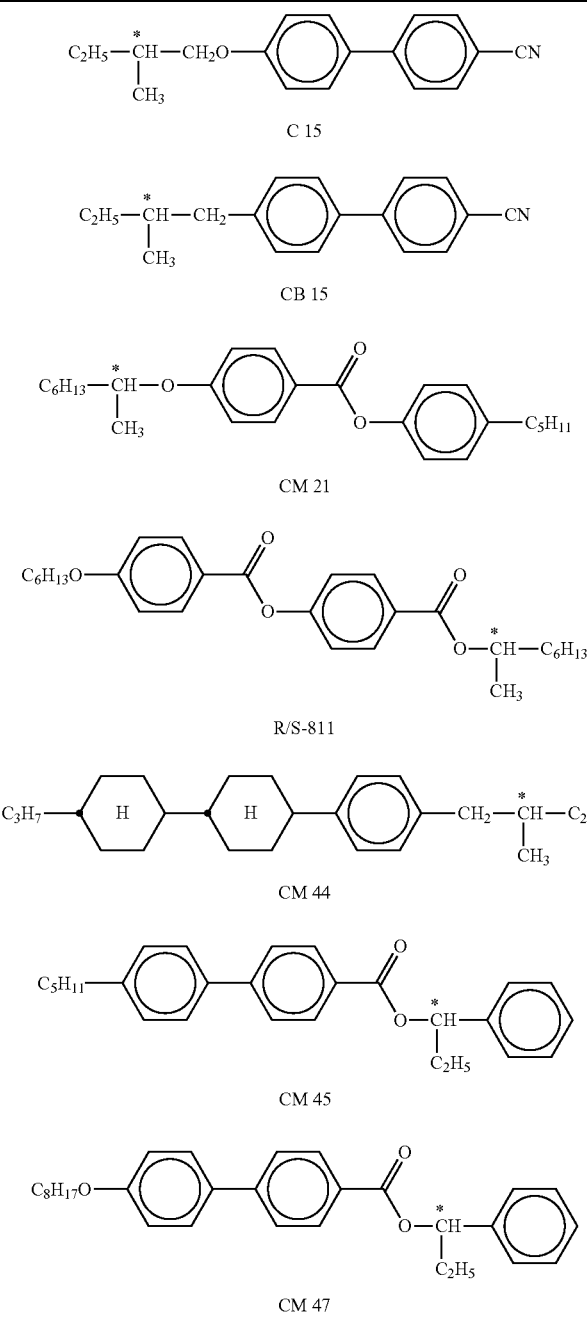

TABLE B-continued

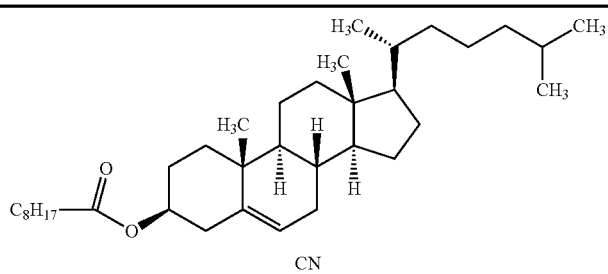

CN

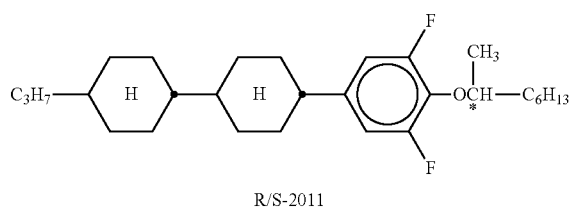

R/S-2011

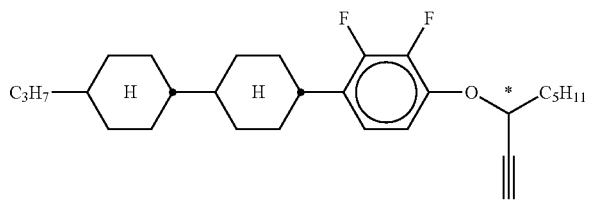

R/S-3011

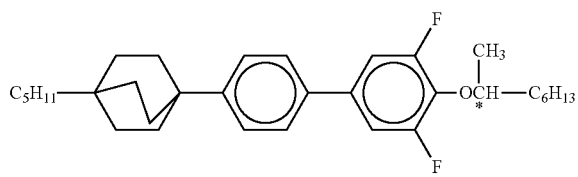

R/S-4011

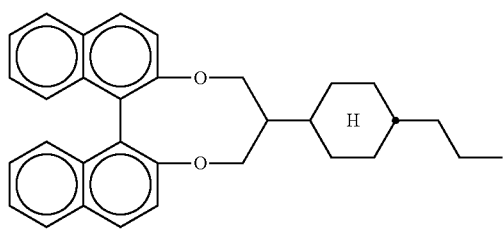

R/S-5011

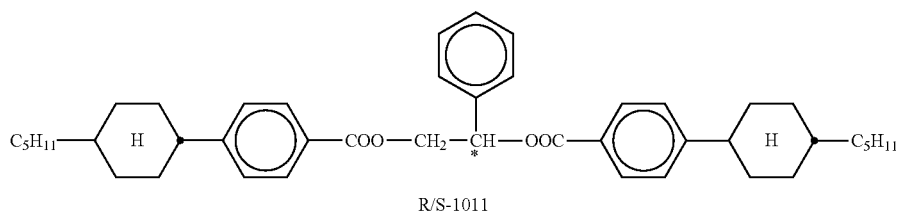

R/S-1011

Table B shows possible chiral dopants which can be added to the LC media according to the invention.

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE C
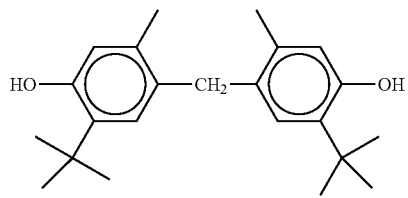
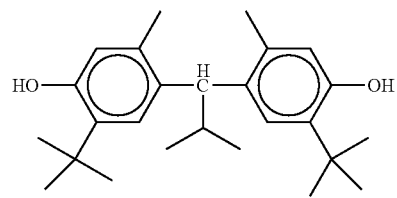
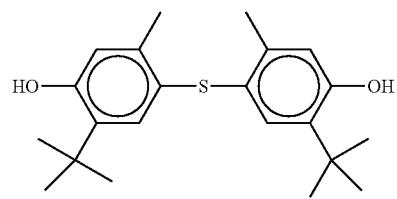
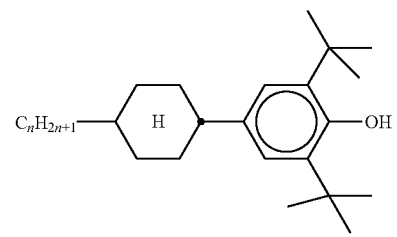
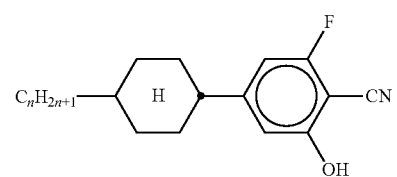
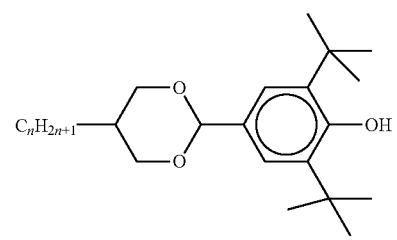
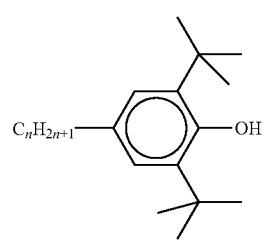

TABLE C-continued
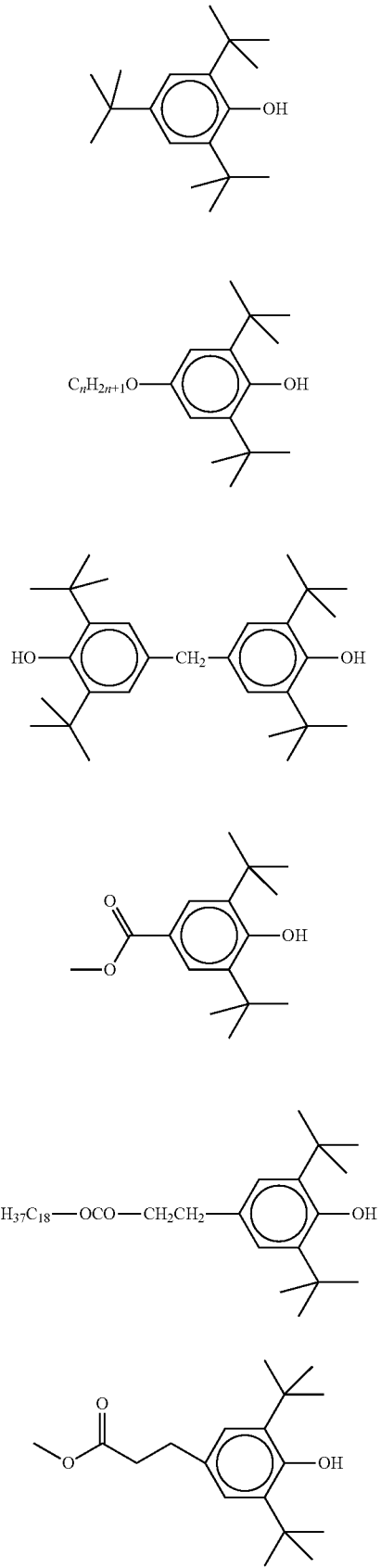

TABLE C-continued
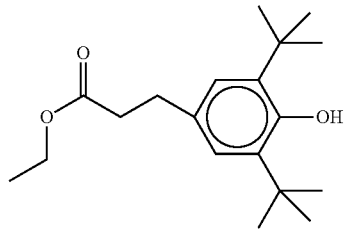
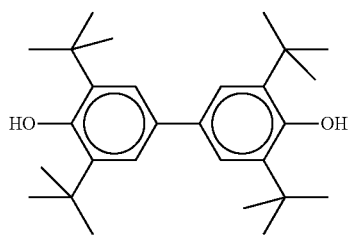
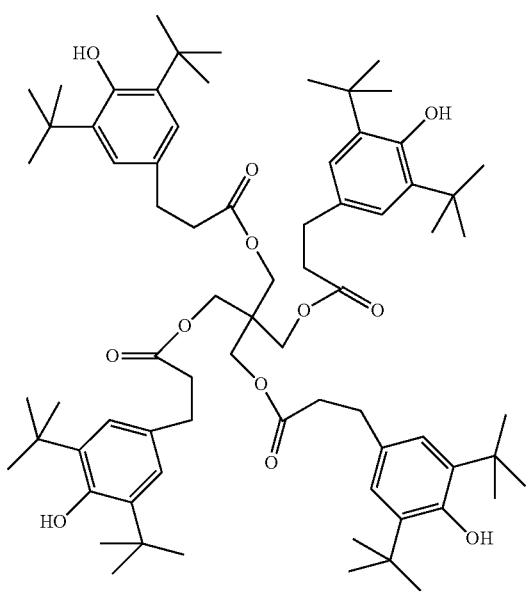 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
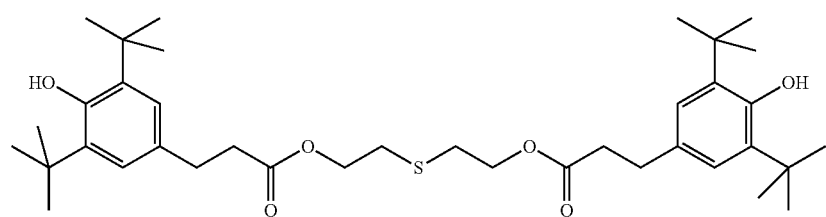 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE C-continued
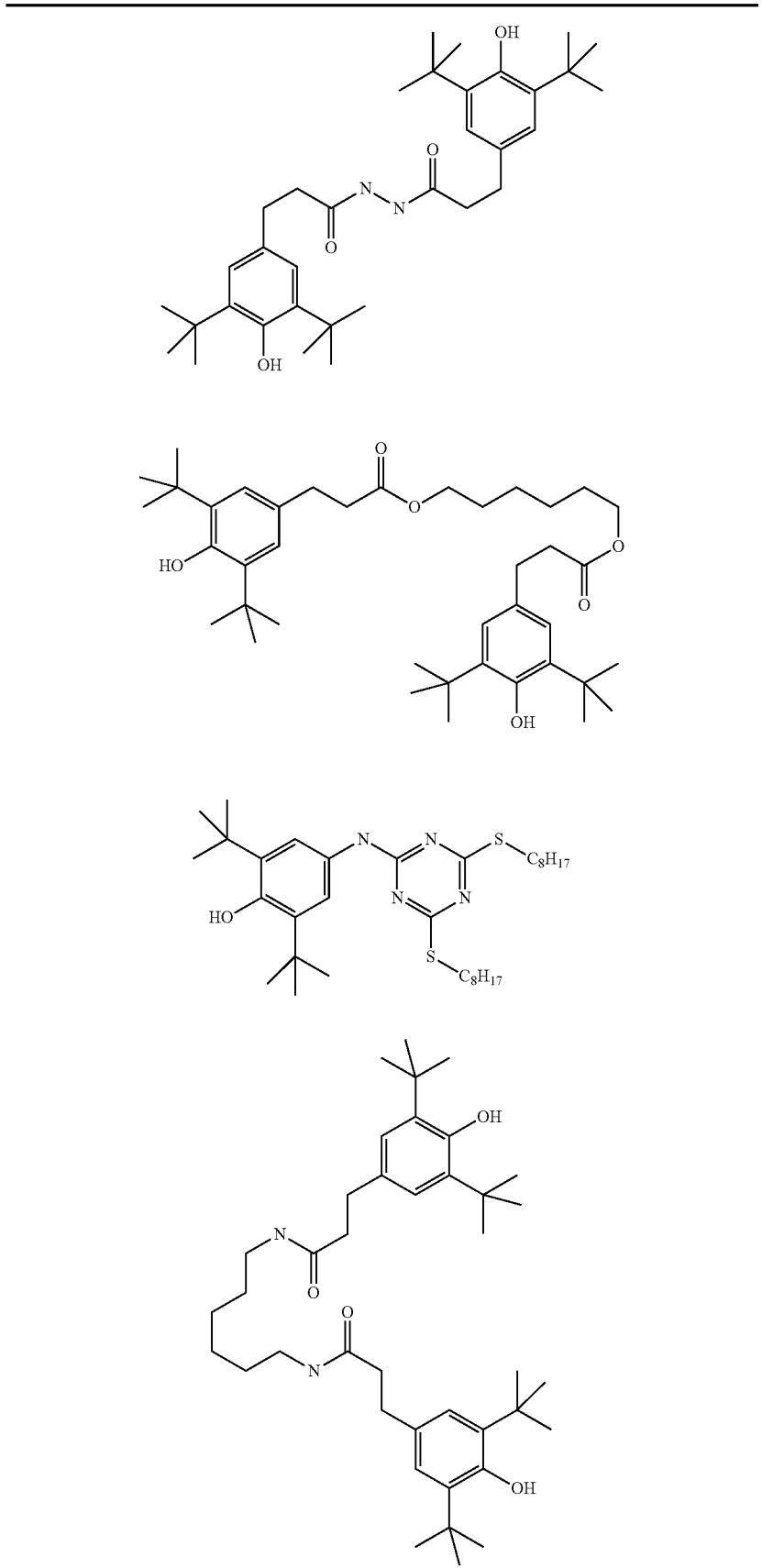

TABLE C-continued
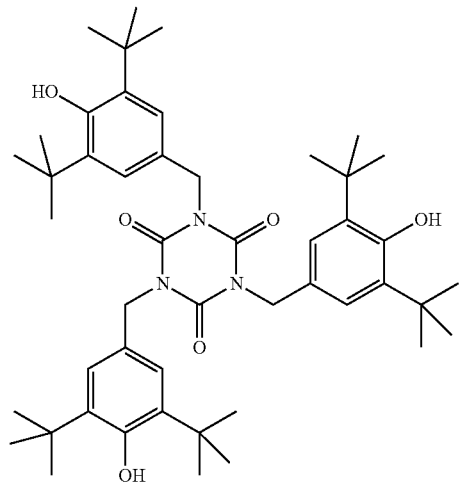 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
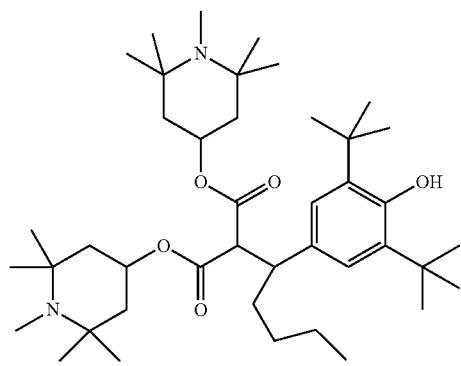 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
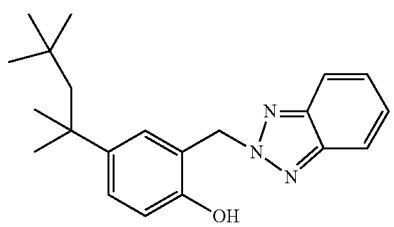 [SMILES: CC(C)(C)CC(C)(C)c1ccc(O)c(Cn2nc3ccccc3n2)c1]
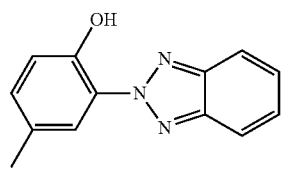 [SMILES: Cc1ccc(O)c(-n2nc3ccccc3n2)c1]
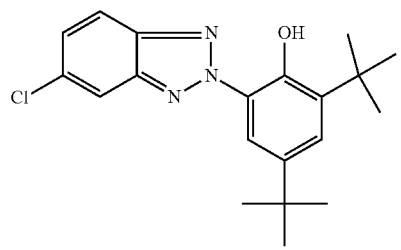 [SMILES: CC(C)(C)c1cc(-n2nc3ccc(Cl)cc3n2)c(O)c(C(C)(C)C)c1]

TABLE C-continued
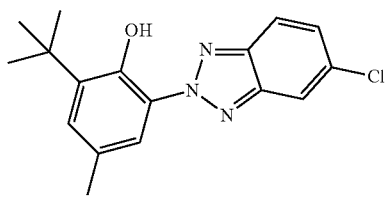 [SMILES: Cc1cc(-n2nc3ccc(Cl)cc3n2)c(O)c(C(C)(C)C)c1]
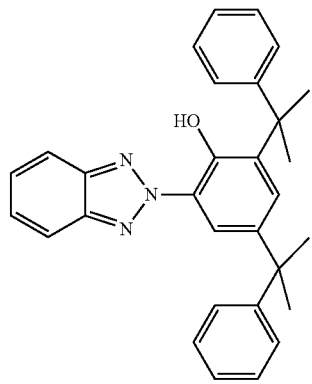 [SMILES: CC(C)(c1ccccc1)c1cc(-n2nc3ccccc3n2)c(O)c(C(C)(C)c2ccccc2)c1]
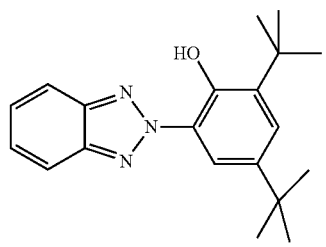 [SMILES: CC(C)(C)c1cc(-n2nc3ccccc3n2)c(O)c(C(C)(C)C)c1]
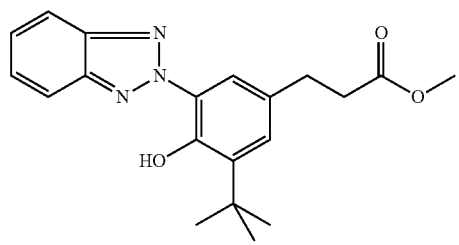 [SMILES: COC(=O)CCc1cc(-n2nc3ccccc3n2)c(O)c(C(C)(C)C)c1]
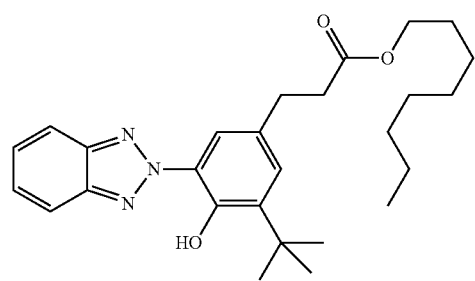 [SMILES: CCCCCCCCOC(=O)CCc1cc(-n2nc3ccccc3n2)c(O)c(C(C)(C)C)c1]

TABLE C-continued

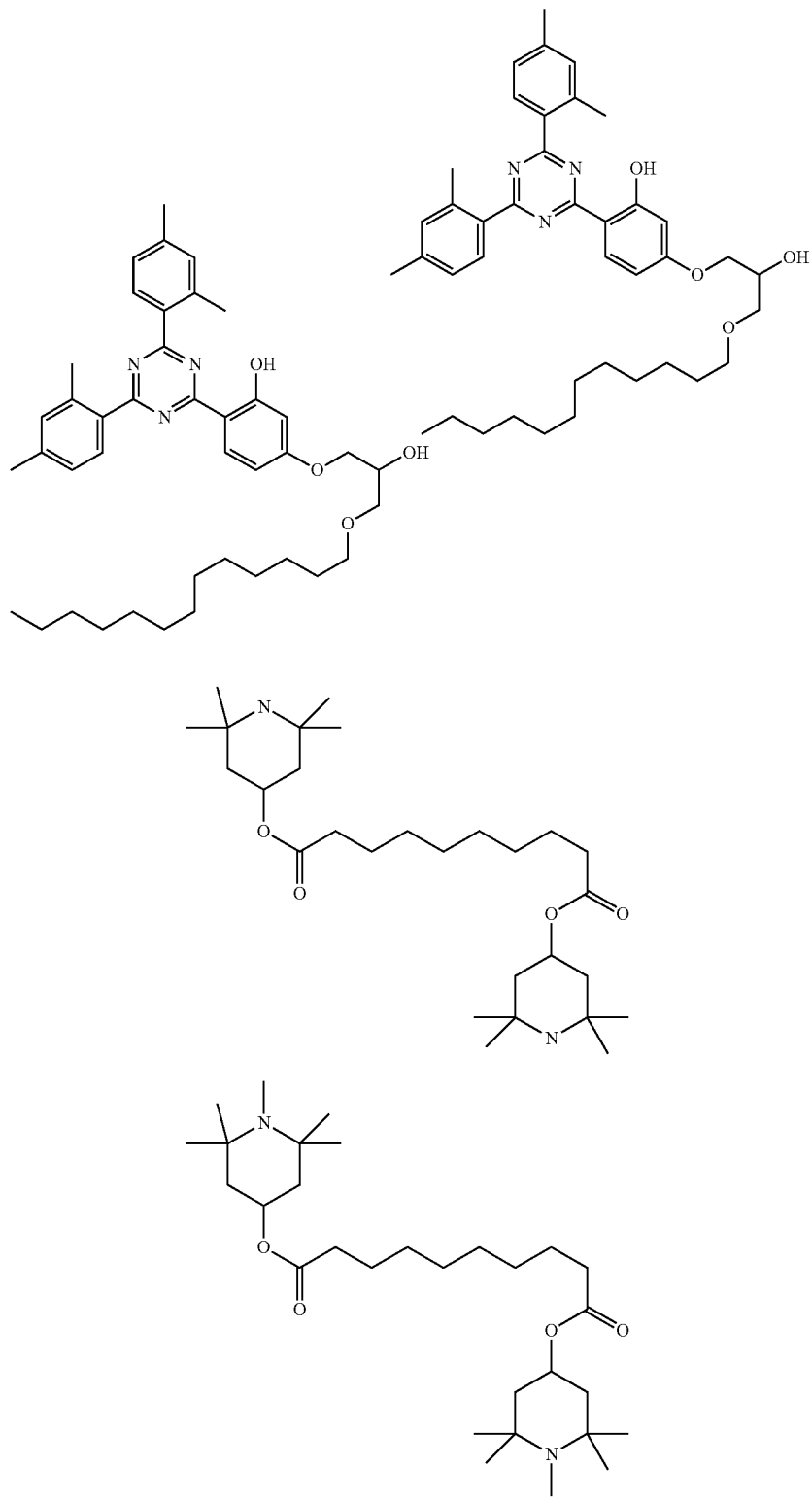

Table C shows possible stabilizers which can be added to the LC media according to the invention.

(n here denotes an integer from 1 to 12, preferably 1, 2, 3, 4, 5, 6, 7 or 8, terminal methyl groups are not shown).

The LC media preferably comprise 0 to 10% by weight, in particular 1 ppm to 5% by weight, particularly preferably 1 ppm to 1% by weight, of stabilizers. The LC media preferably comprise one or more stabilizers selected from the group consisting of compounds from Table C.

TABLE D
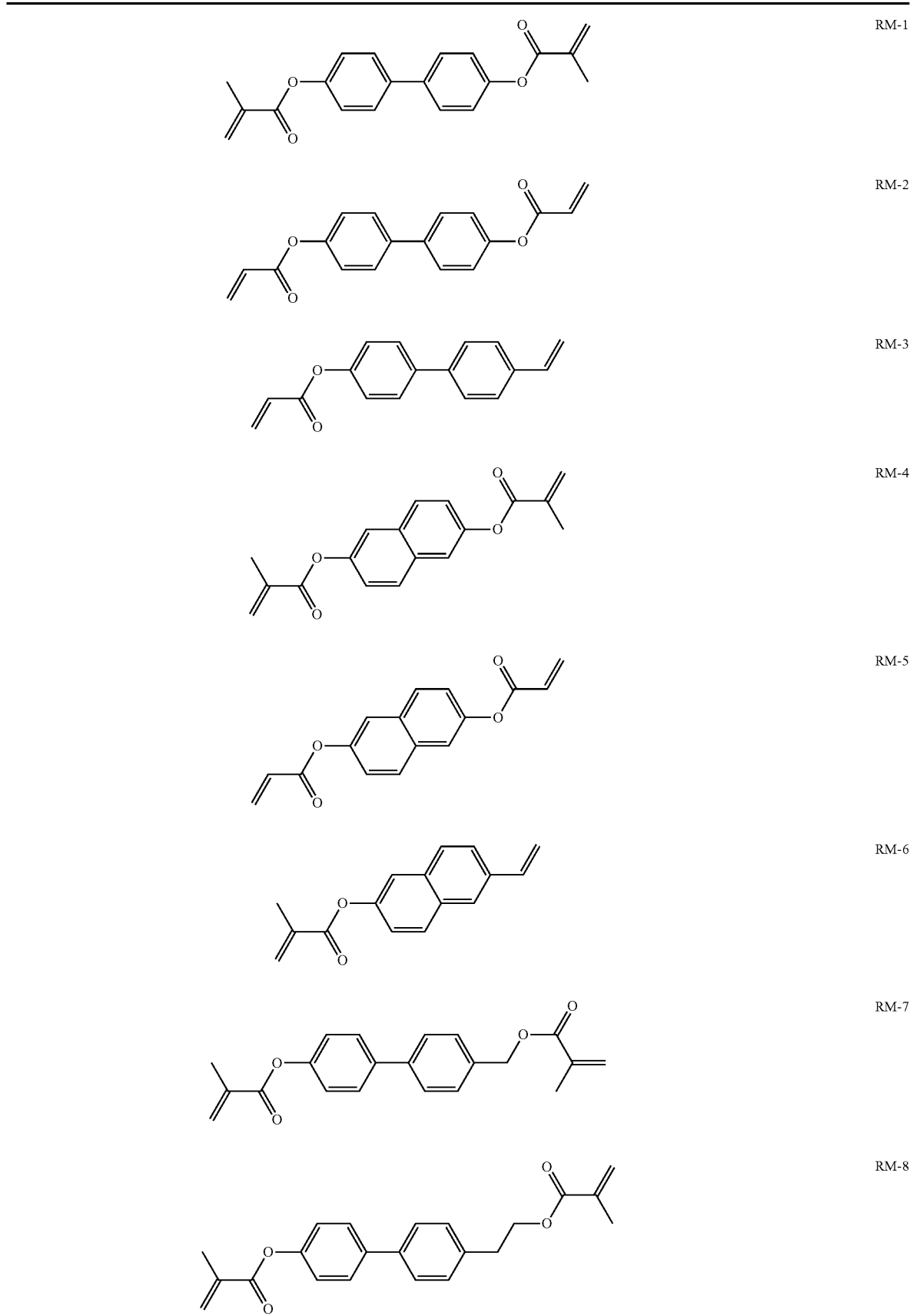

TABLE D-continued
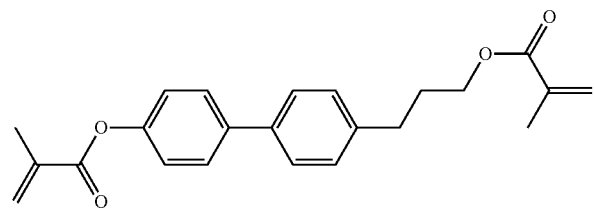 [SMILES: C=C(C)C(=O)OCCCc1ccc(-c2ccc(OC(=O)C(=C)C)cc2)cc1]
RM-9
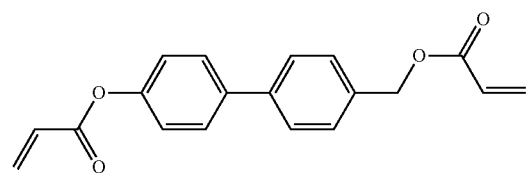
RM-10
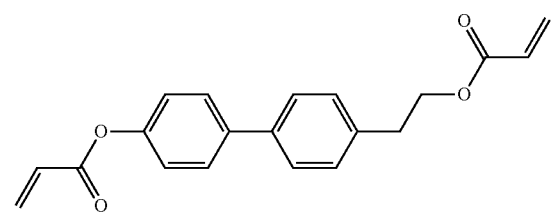 [SMILES: C=CC(=O)OCCc1ccc(-c2ccc(OC(=O)C=C)cc2)cc1]
RM-11
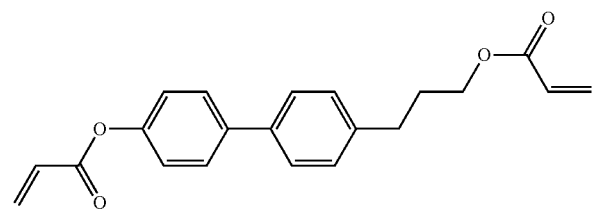 [SMILES: C=CC(=O)OCCCc1ccc(-c2ccc(OC(=O)C=C)cc2)cc1]
RM-12
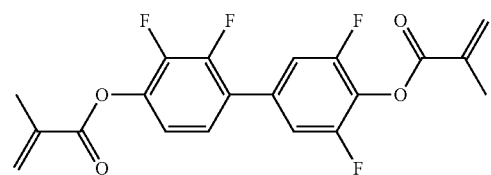 [SMILES: C=C(C)C(=O)Oc1ccc(-c2cc(F)c(OC(=O)C(=C)C)c(F)c2)c(F)c1F]
RM-13
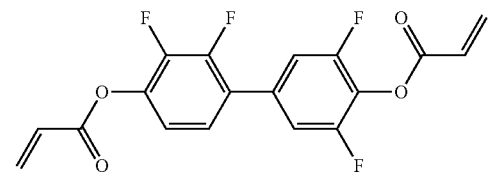 [SMILES: C=CC(=O)Oc1ccc(-c2cc(F)c(OC(=O)C=C)c(F)c2)c(F)c1F]
RM-14
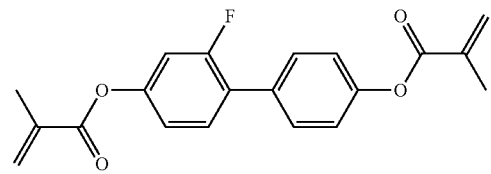
RM-15
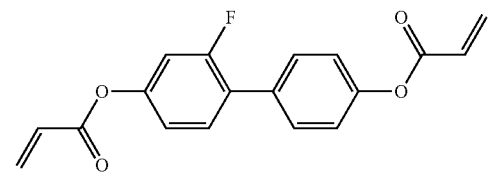
RM-16

TABLE D-continued
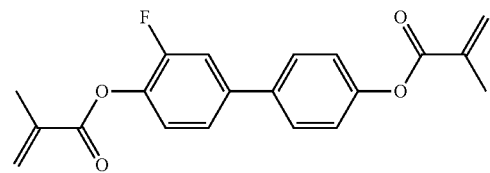 [SMILES: C=C(C)C(=O)Oc1ccc(-c2ccc(OC(=O)C(=C)C)c(F)c2)cc1]
RM-17
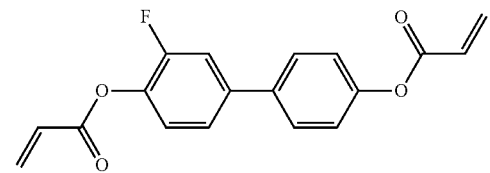 [SMILES: C=CC(=O)Oc1ccc(-c2ccc(OC(=O)C=C)c(F)c2)cc1]
RM-18
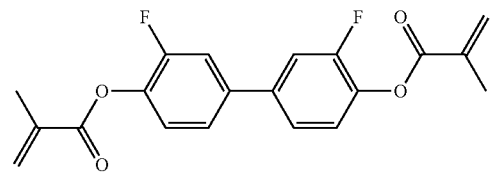 [SMILES: C=C(C)C(=O)Oc1ccc(-c2ccc(OC(=O)C(=C)C)c(F)c2)cc1F]
RM-19
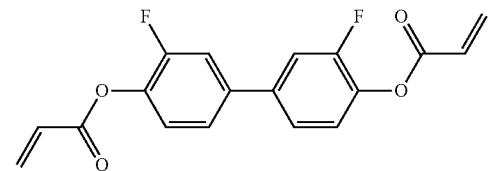
RM-20
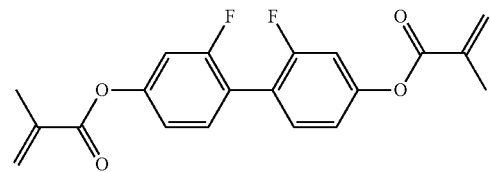
RM-21
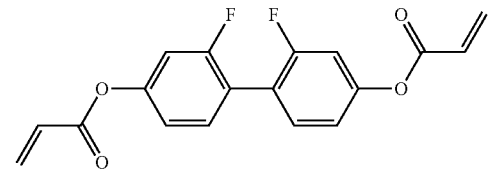 [SMILES: C=CC(=O)Oc1ccc(-c2ccc(OC(=O)C=C)cc2F)c(F)c1]
RM-22
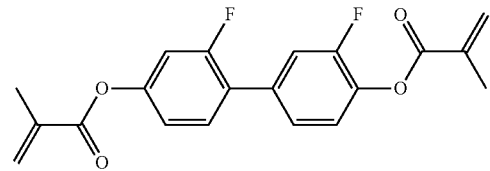 [SMILES: C=C(C)C(=O)Oc1ccc(-c2ccc(OC(=O)C(=C)C)c(F)c2)c(F)c1]
RM-23
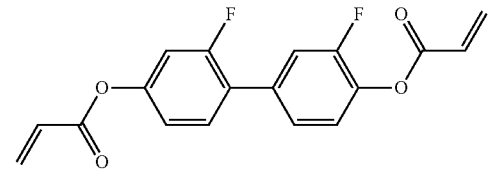 [SMILES: C=CC(=O)Oc1ccc(-c2ccc(OC(=O)C=C)c(F)c2)c(F)c1]
RM-24
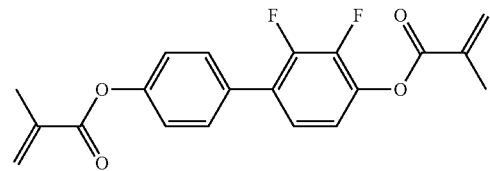
RM-25

TABLE D-continued
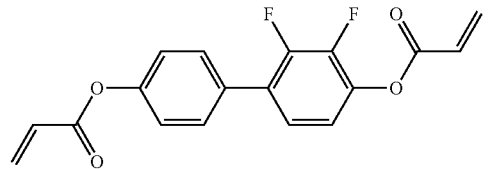 [SMILES: C=CC(=O)Oc1ccc(-c2ccc(OC(=O)C=C)c(F)c2F)cc1] RM-26
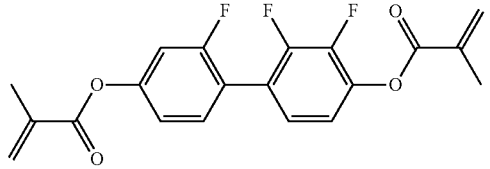 [SMILES: C=C(C)C(=O)Oc1ccc(-c2ccc(OC(=O)C(=C)C)c(F)c2F)c(F)c1] RM-27
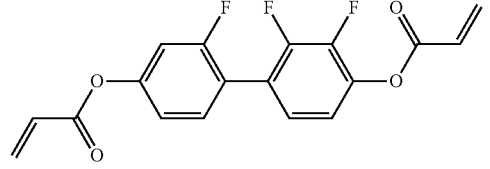 RM-28
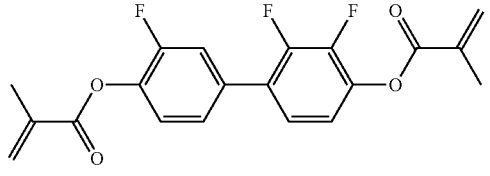 RM-29
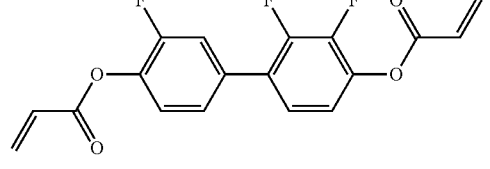 RM-30
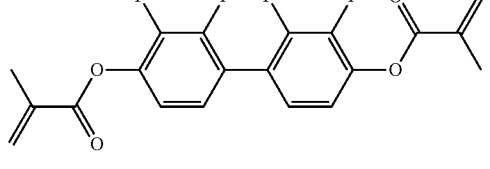 RM-31
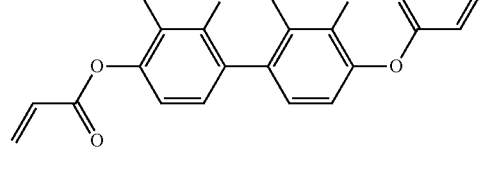 RM-32
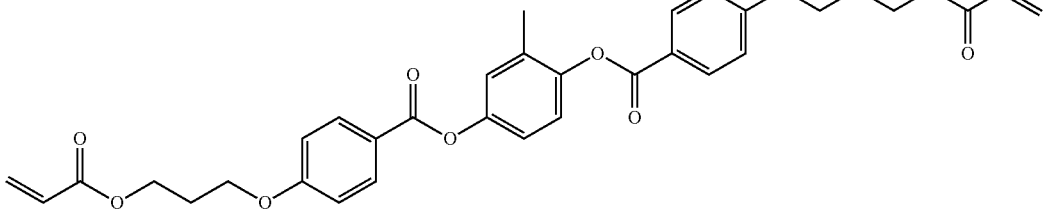 RM-33

TABLE D-continued
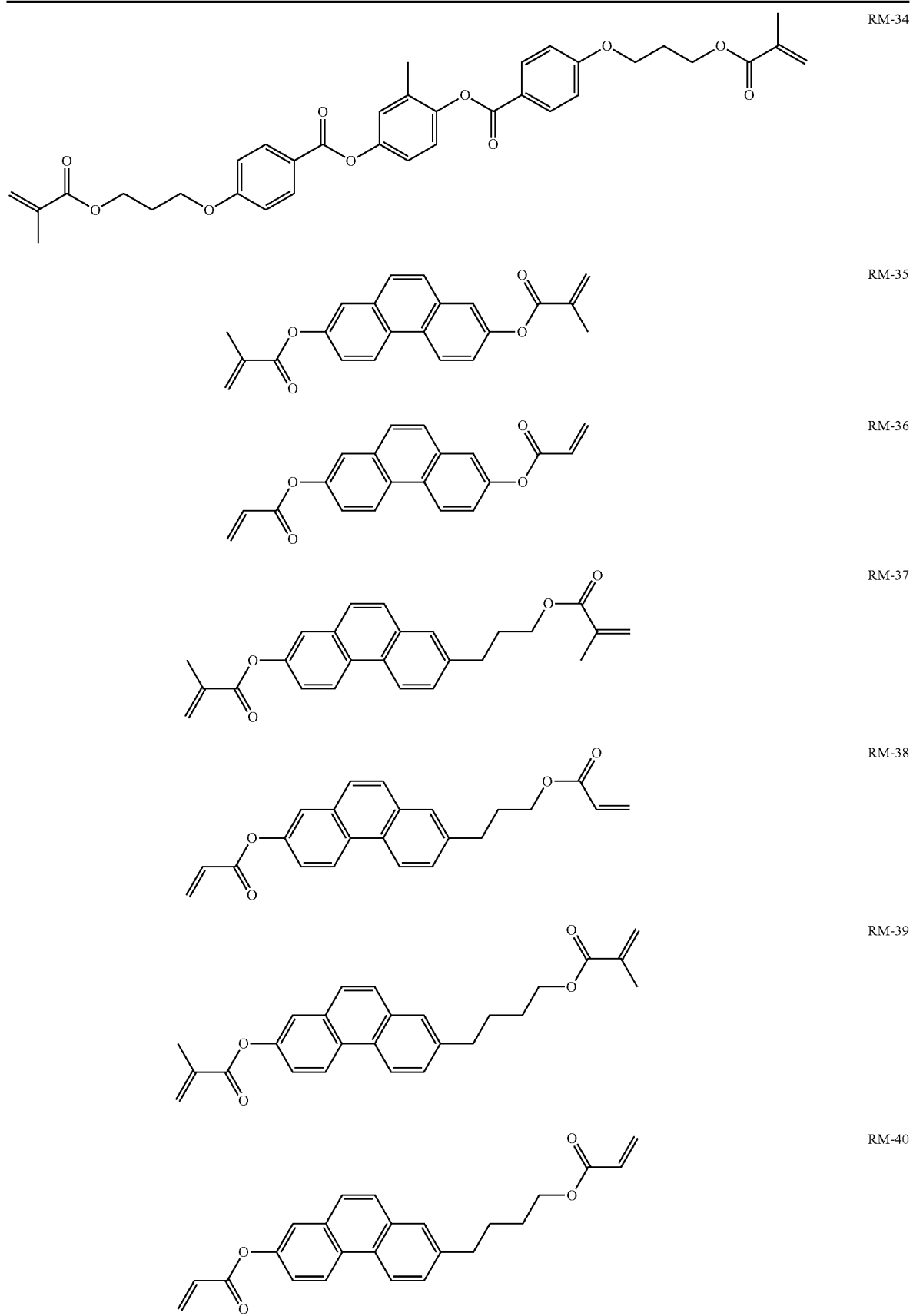
RM-34
RM-35
RM-36
RM-37
RM-38
RM-39
RM-40

TABLE D-continued
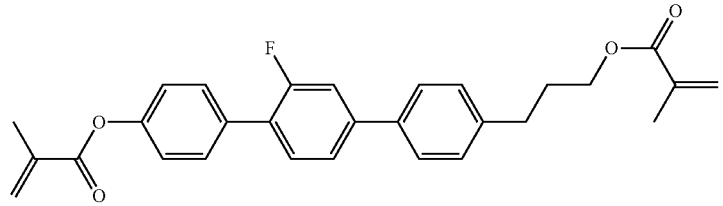 [SMILES: C=C(C)C(=O)OCCCc1ccc(-c2ccc(-c3ccc(OC(=O)C(=C)C)cc3)c(F)c2)cc1] RM-41
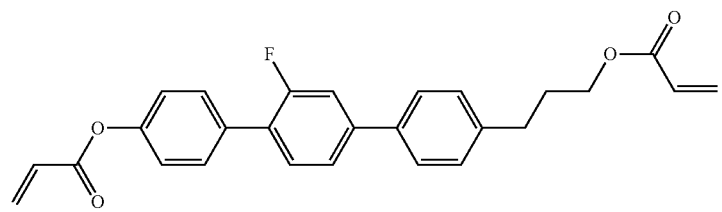 [SMILES: C=CC(=O)OCCCc1ccc(-c2ccc(-c3ccc(OC(=O)C=C)cc3)c(F)c2)cc1] RM-42
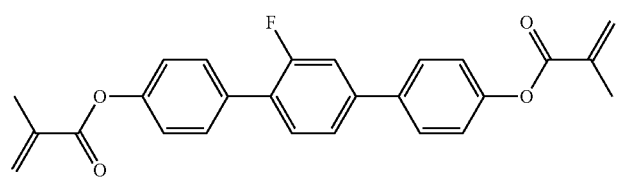 [SMILES: C=C(C)C(=O)Oc1ccc(-c2ccc(-c3ccc(OC(=O)C(=C)C)cc3)c(F)c2)cc1] RM-43
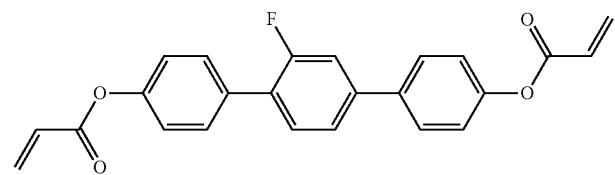 [SMILES: C=CC(=O)Oc1ccc(-c2ccc(-c3ccc(OC(=O)C=C)cc3)c(F)c2)cc1] RM-44
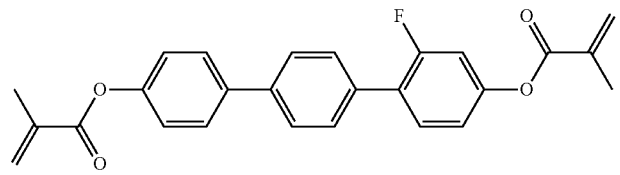 [SMILES: C=C(C)C(=O)Oc1ccc(-c2ccc(-c3ccc(OC(=O)C(=C)C)cc3F)cc2)cc1] RM-45
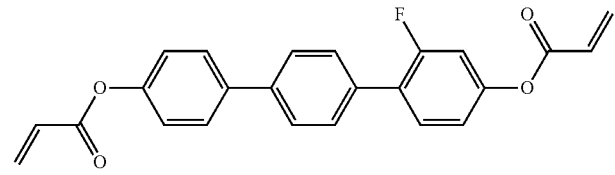 [SMILES: C=CC(=O)Oc1ccc(-c2ccc(-c3ccc(OC(=O)C=C)cc3F)cc2)cc1] RM-46
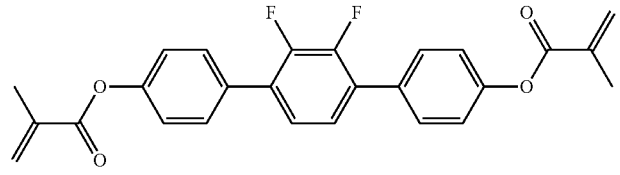 RM-47
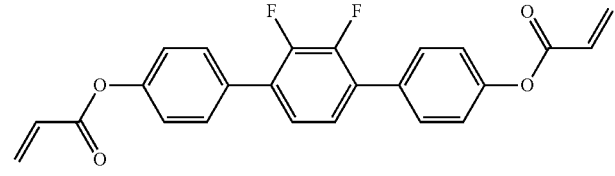 [SMILES: C=CC(=O)Oc1ccc(-c2ccc(-c3ccc(OC(=O)C=C)cc3)c(F)c2F)cc1] RM-48

TABLE D-continued
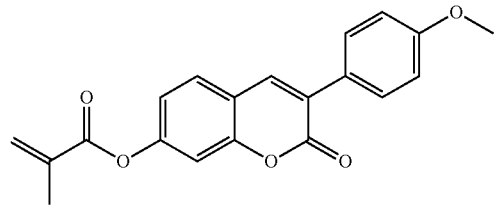 [SMILES: C=C(C)C(=O)Oc1ccc2cc(-c3ccc(OC)cc3)c(=O)oc2c1]
RM-49
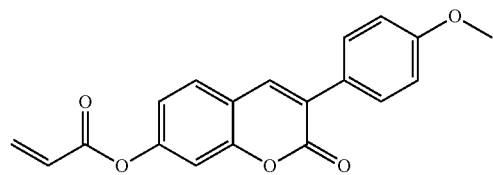 [SMILES: C=CC(=O)Oc1ccc2cc(-c3ccc(OC)cc3)c(=O)oc2c1]
RM-50
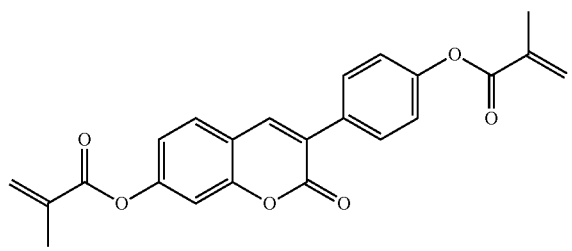 [SMILES: C=C(C)C(=O)Oc1ccc(-c2cc3ccc(OC(=O)C(=C)C)cc3oc2=O)cc1]
RM-51
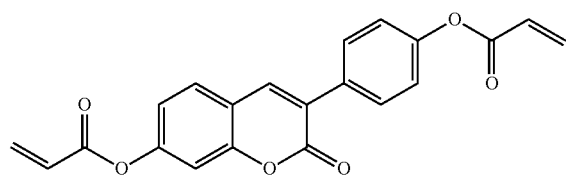 [SMILES: C=CC(=O)Oc1ccc(-c2cc3ccc(OC(=O)C=C)cc3oc2=O)cc1]
RM-52
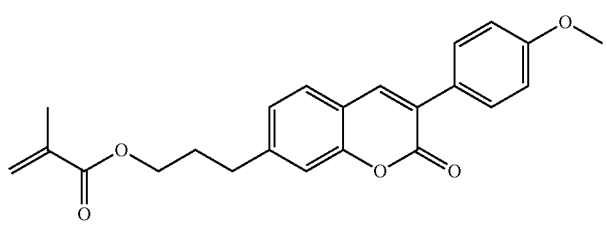 [SMILES: C=C(C)C(=O)OCCCc1ccc2cc(-c3ccc(OC)cc3)c(=O)oc2c1]
RM-53
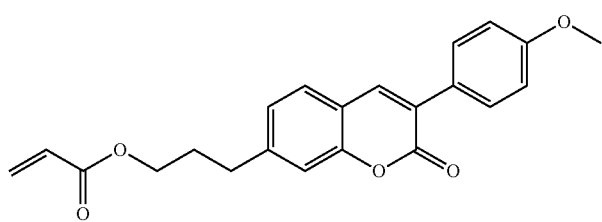 [SMILES: C=CC(=O)OCCCc1ccc2cc(-c3ccc(OC)cc3)c(=O)oc2c1]
RM-54
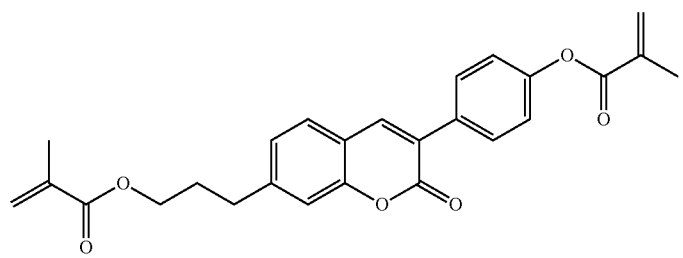 [SMILES: C=C(C)C(=O)OCCCc1ccc2cc(-c3ccc(OC(=O)C(=C)C)cc3)c(=O)oc2c1]
RM-55

TABLE D-continued
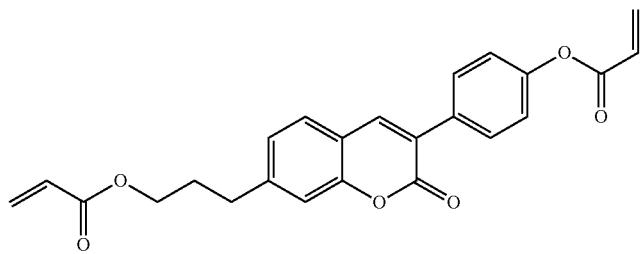 [SMILES: C=CC(=O)OCCCc1ccc2cc(-c3ccc(OC(=O)C=C)cc3)c(=O)oc2c1]
RM-56
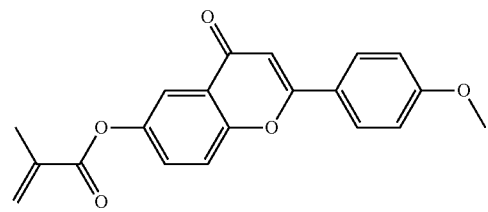 [SMILES: C=C(C)C(=O)Oc1ccc2oc(-c3ccc(OC)cc3)cc(=O)c2c1]
RM-57
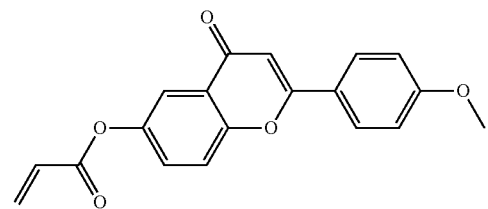 [SMILES: C=CC(=O)Oc1ccc2oc(-c3ccc(OC)cc3)cc(=O)c2c1]
RM-58
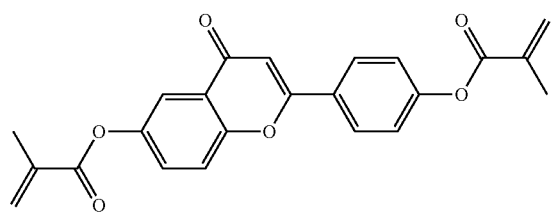 [SMILES: C=C(C)C(=O)Oc1ccc(-c2cc(=O)c3cc(OC(=O)C(=C)C)ccc3o2)cc1]
RM-59
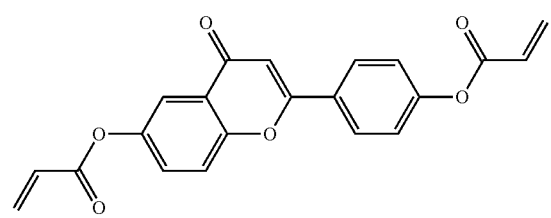 [SMILES: C=CC(=O)Oc1ccc(-c2cc(=O)c3cc(OC(=O)C=C)ccc3o2)cc1]
RM-60
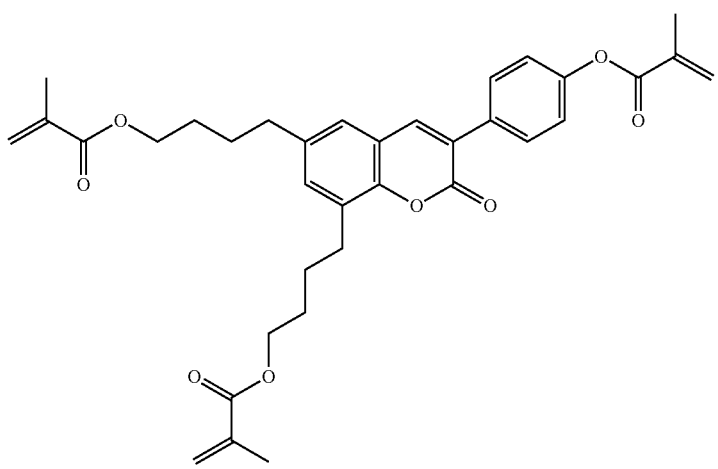 [SMILES: C=C(C)C(=O)OCCCCc1cc(CCCCOC(=O)C(=C)C)c2oc(=O)c(-c3ccc(OC(=O)C(=C)C)cc3)cc2c1]
RM-61

TABLE D-continued
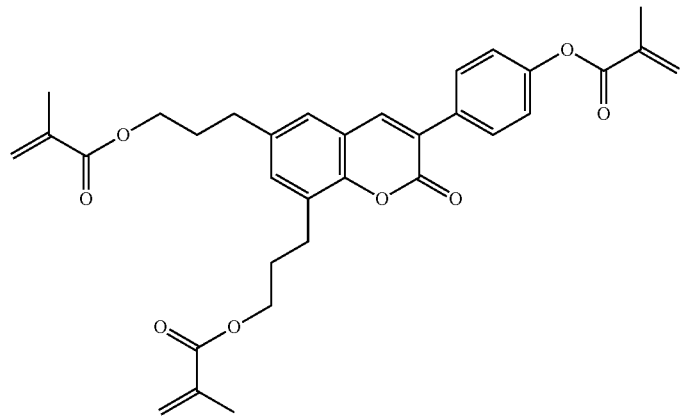 [SMILES: C=C(C)C(=O)OCCCc1cc(CCCOC(=O)C(=C)C)c2oc(=O)c(-c3ccc(OC(=O)C(=C)C)cc3)cc2c1]
RM-62
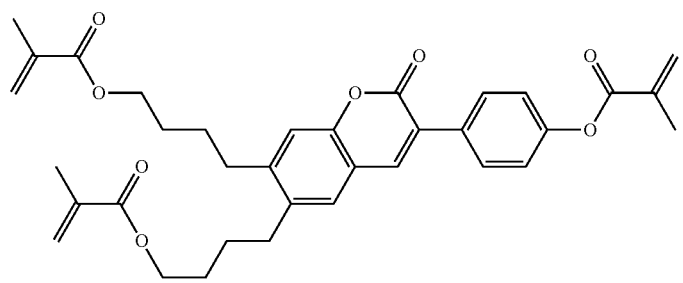 [SMILES: C=C(C)C(=O)OCCCCc1cc2cc(-c3ccc(OC(=O)C(=C)C)cc3)c(=O)oc2cc1CCCCOC(=O)C(=C)C]
RM-63
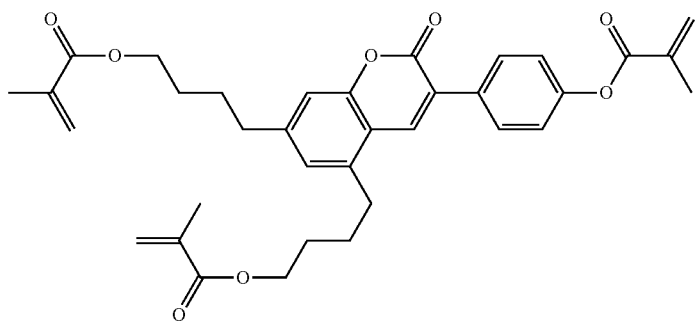 [SMILES: C=C(C)C(=O)OCCCCc1cc(CCCCOC(=O)C(=C)C)c2cc(-c3ccc(OC(=O)C(=C)C)cc3)c(=O)oc2c1]
RM-64
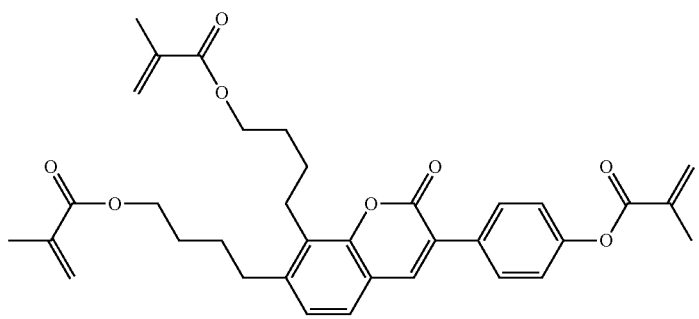 [SMILES: C=C(C)C(=O)OCCCCc1ccc2cc(-c3ccc(OC(=O)C(=C)C)cc3)c(=O)oc2c1CCCCOC(=O)C(=C)C]
RM-65

TABLE D-continued
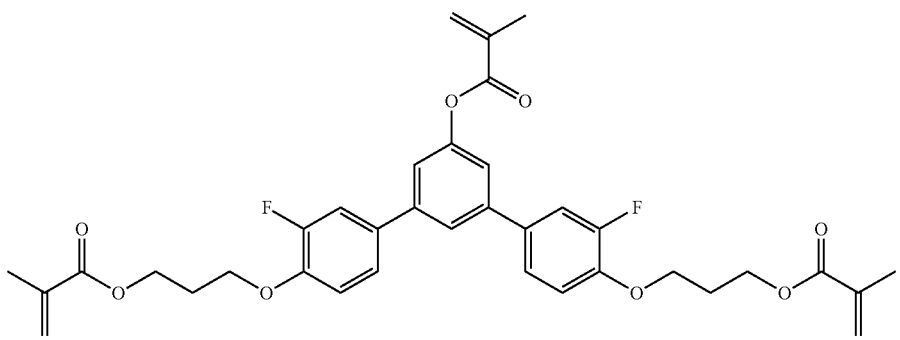 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-66
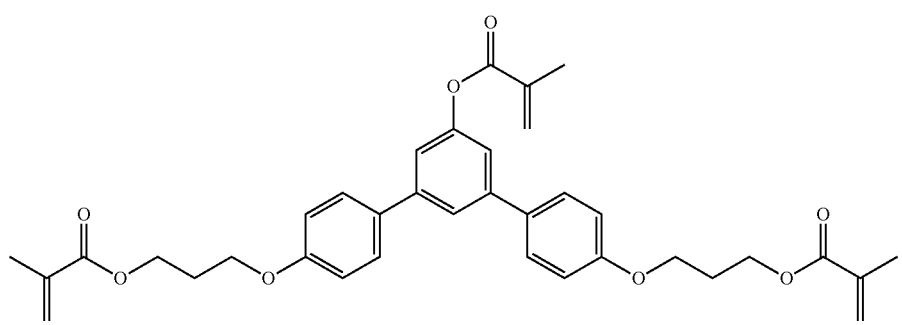 [SMILES: C=C(C)C(=O)OCCCOc1ccc(-c2cc(OC(=O)C(=C)C)cc(-c3ccc(OCCCOC(=O)C(=C)C)cc3)c2)cc1]
RM-67
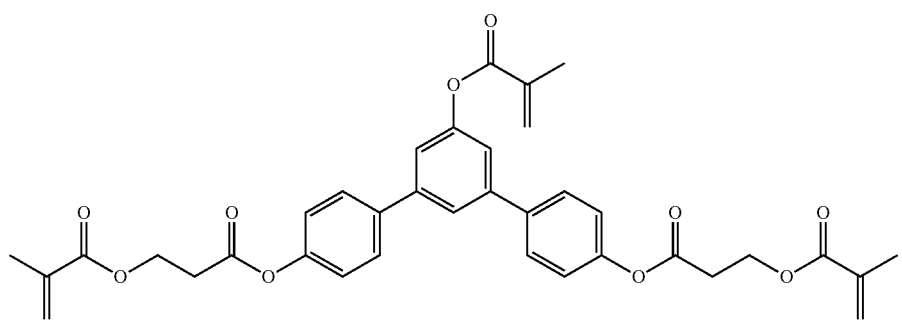 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-68
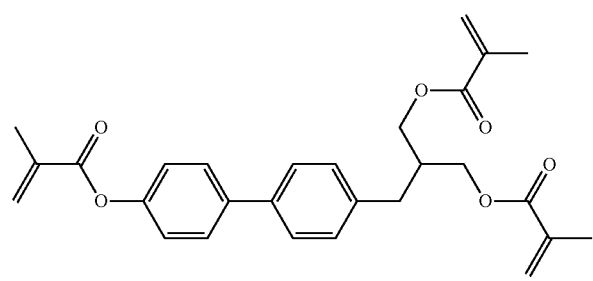 [SMILES: C=C(C)C(=O)OCC(COC(=O)C(=C)C)Cc1ccc(-c2ccc(OC(=O)C(=C)C)cc2)cc1]
RM-69
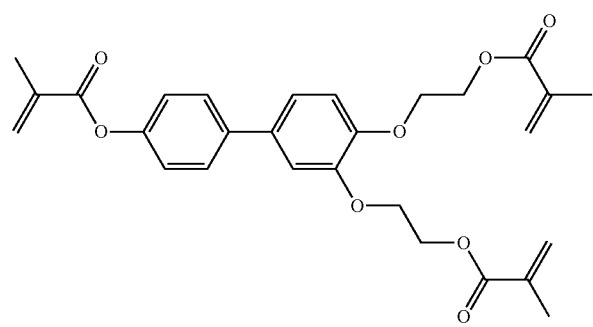 [SMILES: C=C(C)C(=O)OCCOc1ccc(-c2ccc(OC(=O)C(=C)C)cc2)cc1OCCOC(=O)C(=C)C]
RM-70

TABLE D-continued

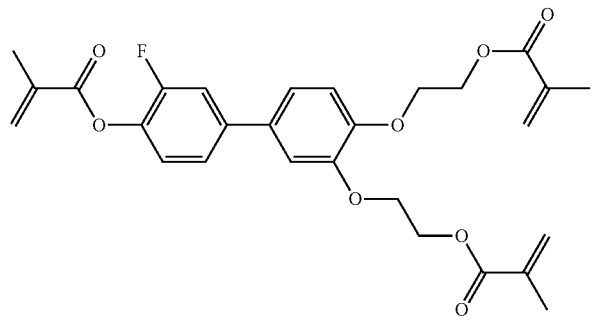 [SMILES: C=C(C)C(=O)OCCOc1ccc(-c2ccc(OC(=O)C(=C)C)c(F)c2)cc1OCCOC(=O)C(=C)C]

RM-71

Table D shows illustrative compounds which can be used in the LC media in accordance with the present invention, preferably as reactive mesogenic compounds.

In a preferred embodiment of the present invention, the mesogenic media comprise one or more compounds selected from the group of the compounds from Table D.

In addition, the following abbreviations and symbols are used:

$V_0$ threshold voltage, capacitive [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\epsilon_\perp$ dielectric permittivity perpendicular to the director at 20° C. and 1 kHz,
$\epsilon_\parallel$ dielectric permittivity parallel to the director at 20° C. and 1 kHz,
$\Delta\epsilon$ dielectric anisotropy at 20° C. and 1 kHz, cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole, comprising all solid or liquid crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and $\Delta\epsilon$ at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, the process of polymerizing the polymerizable compounds in the displays as described above and below is carried out at a temperature where the LC medium exhibits a liquid crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

The display used for measurement of the VHR consists of a glass substrate coated with an ITO layer which form a part of a parallel plate capacitor (because the glass substrate is sandwiched symmetrically with another identical substrate). On top of the ITO layer a layer of polyimide is provided, using a commercially available polyimide material as mentioned above. The distance of both coated glass substrates are controlled via spacer materials. Optionally the polyimide material is treated by a rubbing process or a photoalignment process.

The display or test cell used for measurement of the tilt angles consists of two plane-parallel glass outer plates at a separation of 3 to 4 μm, one of which has on the inside an unstructured electrode layer and a comb-shaped counter-electrode which are separated by an insulating layer, and a polyimide alignment layer on top of the comb-shaped electrode, where the polyimide layer is treated by a mechanical rubbing process, or alternatively by a photo alignment process using polarized UV light irradiation in a specific direction, as a result of which it effects a planar alignment of the LC molecules.

The polymerizable compounds are polymerized in the display or test cell by irradiation with UVA light of defined intensity for a prespecified time, with no voltage applied in order to sustain the off state alignment. In the examples, unless indicated otherwise, a metal halide lamp and an intensity of 100 mW/cm$^2$ is used for polymerization. The intensity is measured using a standard UVA meter (Hoenle UV-meter high end with UVA sensor).

The VHR value is measured as follows: 0.3% of a polymerizable monomeric compound is added to the LC host mixture, and the resultant mixture is introduced into FFS-VHR test cells (optionally rubbed or treated by a photoalignment process step, polyimide alignment layer, LC-layer thickness d between 3 and 6 urn). The VHR value is determined after 5 min at 100° C. before and after UV exposure at 1 V, 60 Hz, 64 μs pulse (measuring instrument: Autronic-Melchers VHRM-105).

A) LC HOST MIXTURES

Example 1

The nematic LC host mixture N1 is formulated as follows.

| | | | |
|---|---|---|---|
| CY-3-O2 | 13.00% | cl. p. | +80.0° C. |
| CCY-3-O2 | 6.00% | Δn | 0.1025 |
| CCY-4-O2 | 7.00% | Δε | −3.8 |
| CPY-2-O2 | 9.00% | $\epsilon_{\parallel}$ | 3.8 |
| CPY-3-O2 | 9.00% | $K_3/K_1$ | 1.15 |
| PYP-2-3 | 0.50% | $\gamma_1$ | 112 mPa s |
| PY-3-O2 | 10.00% | | |
| CCY-3-O1 | 10.00% | | |
| CC-3-V1 | 10.50% | | |
| CC-3-V | 25.00% | | |

Example 2

The nematic LC host mixture N2 is formulated as follows.

| | | | |
|---|---|---|---|
| BCH-32 | 4.50% | cl. p. | 85.5° C. |
| CC-3-V | 23.50% | Δn | 0.1109 |
| CCH-3O1 | 4.00% | Δε | −4.3 |
| CCY-3-O2 | 4.00% | $\epsilon_{\parallel}$ | 3.7 |
| CCY-3-O3 | 7.00% | $K_3/K_1$ | 1.13 |
| CCY-4-O2 | 8.00% | $\gamma_1$ | 140 mPa s |
| CLY-3-O2 | 8.00% | | |
| CPY-2-O2 | 7.00% | | |
| CPY-3-O2 | 11.00% | | |
| CY-3-O2 | 10.00% | | |
| CY-3-O4 | 1.00% | | |
| PY-3-O2 | 11.00% | | |
| PY-4-O2 | 1.0% | | |

Example 3

Polymerizable mixtures are prepared by adding in each case one of the monomers of Table 1 to the LC host mixtures N1 and N2, respectively, at a concentration of 0.3% by weight.

TABLE 1

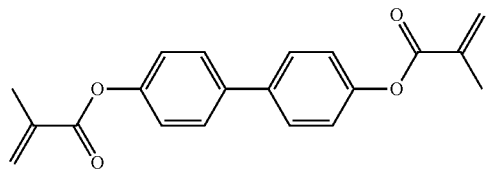
RM1

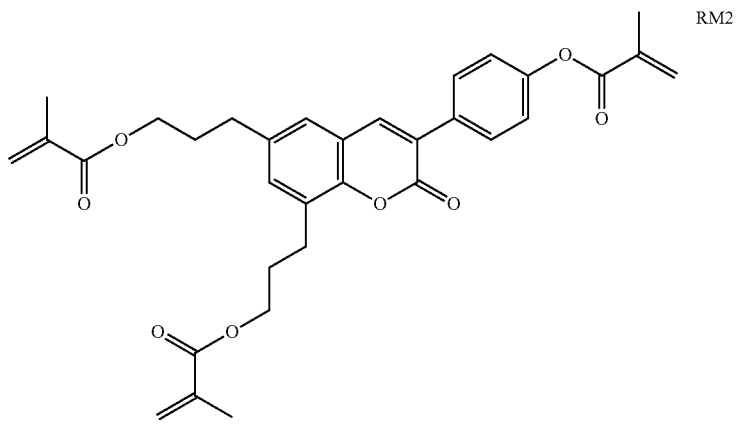
RM2

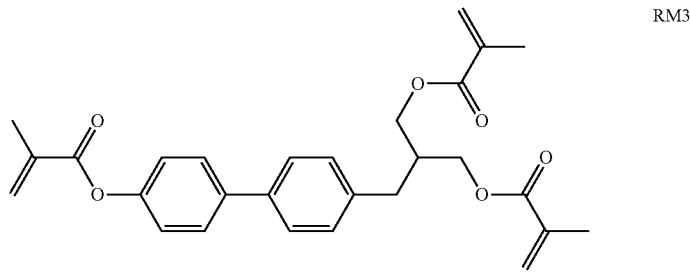
RM3

TABLE 1-continued

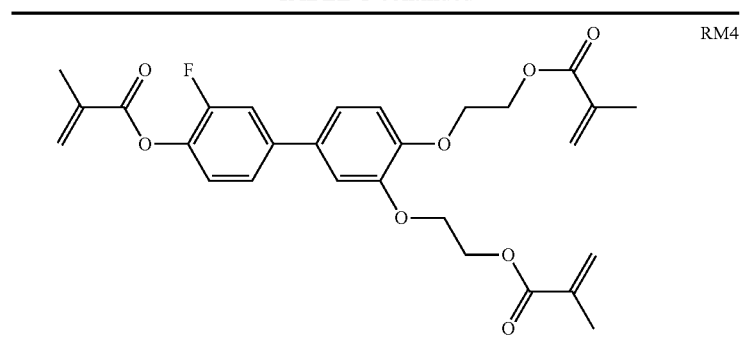

RM4

Example 4

Each of the polymerizable mixtures was inserted into a FFS e/o test cell (polyimide alignment layer which was rubbed or treated by photoalignment, LC-layer thickness d 3 to 4 μm). The test cells were irradiated with UV light having an intensity of 100 mW/cm² for the time indicated with application of a voltage of 24 $V_{rms}$ (alternating current), causing polymerization of the polymerizable monomeric compound.

The VHR values of the polymerizable mixtures before and after UV exposure were measured as described above. For comparison purposes similar measurements were carried out for the pure host mixtures N1 and N2 without a polymerizable compound as reference. The results are shown in Tables 2 and 3, wherein "suntest" means an irradiation step with lower UV intensity but longer exposure time than the UV step.

TABLE 2

|  | N1 | N1 + RM1 | N1 + RM2 | N1 + RM4 |
|---|---|---|---|---|
|  |  | VHR/% |  |  |
| initial | 60.23 | 50.30 | 56.14 | 57.23 |
| after 10 min UV |  | 64.38 | 75.30 | 77.65 |
| after 30 min sunstest | 49.81 | 66.72 | 74.71 | 73.02 |

TABLE 3

|  | N2 | N2 + RM1 | N2 + RM3 | N2 + RM4 |
|---|---|---|---|---|
|  |  | VHR/% |  |  |
| initial | 53.32 | 51.84 | 51.94 | 53.09 |
| after 10 min UV |  | 61.68 | 73.08 | 70.32 |
| after 30 min sunstest | 49.13 | 63.51 | 72.01 | 63.29 |

From Table 2 and 3 it can be seen that, in the LC media comprising a polymerizable compound, after polymerization the VHR value increased after 10 min UV compared to the initial value, and also compared to the VHR values of the reference LC media not containing a polymerizable compound.

Also after a typical light load of 30 min suntest the VHR value is stable in the LC media with the polymerized compound, whereas it decreases in the reference LC media. This shows that a significant improvement of the reliability behavior of an FFS LC medium according to the present invention could be achieved, compared to a standard FFS LC medium without a polymerizable compound.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding European patent application no. 14000204.9, filed Jan. 21, 2014, are incorporated by reference herein.

The invention claimed is:

1. A liquid crystal display of Fringe Field Switching mode, comprising:
    two substrates, two electrodes provided on one of the substrates, and a layer of a liquid crystal medium located between the substrates, said medium having negative dielectric anisotropy and comprising liquid crystal molecules and one or more polymerizable compounds having two or more polymerizable groups,
    said display further comprising an alignment layer provided on at least one of the substrates, wherein said alignment layer is in contact with the liquid crystal medium and induces planar alignment of the liquid crystal molecules of the liquid crystal medium, and
    wherein said liquid crystal medium comprises (a) a polymerizable component A) consisting of one or more polymerizable compounds, and (b) a liquid crystalline component B) consisting of non-polymerizable compounds and containing one or more mesogenic or liquid crystalline compounds comprising an alkenyl group,
    wherein component (B) contains one or more compounds of formula ZK1

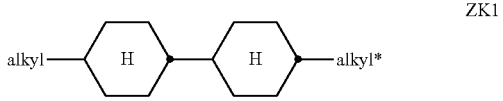

ZK1 in which alkyl and alkyl* each, independently of one another, each denote a straight-chain alkyl radical having 1-6 C atoms, one or more compounds of formula T:

in which

R⁵ and R⁶ each, independently of one another, denote alkyl having 1 to 12 C atoms, where, in addition, one or two non-adjacent CH₂ groups may each be replaced by —O—, —CH=CH—, —CO—, —OCO— or —COO— in such a way that O atoms are not linked directly to one another,

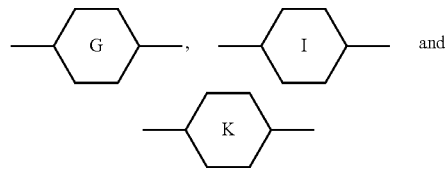

each, independently of one another, denote

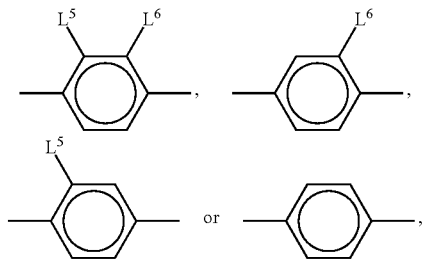

L⁵ denotes F or Cl, and

L⁶ denotes F, Cl, OCF₃, CF₃, CH₃, CH₂F or CHF₂, and one or more compounds selected from formula AN1 and PY1-PY8:

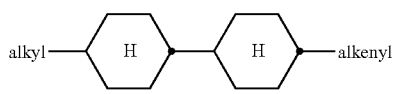

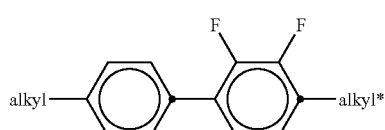

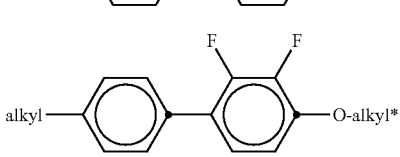

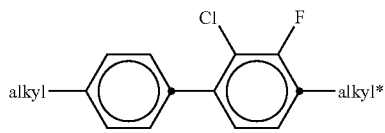

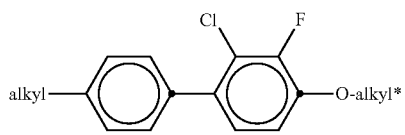

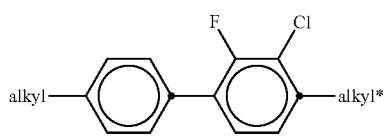

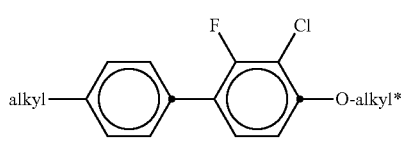

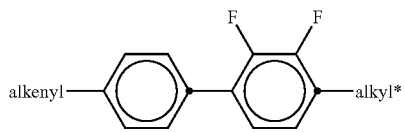

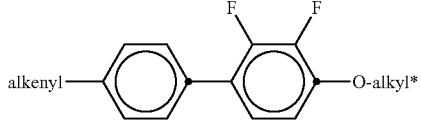

wherein alkyl and alkyl* each, independently of one another, denote a straight-chain alkyl radical having 1-6 C atoms, and alkenyl denotes a straight-chain alkenyl radical having 2-7 C atoms, wherein the concentration of alkenyl compounds in component B) is 20-60 wt. %, wherein the concentration of compounds of formulae PY1-PY8 is 2-20 wt. % based on the total weight of liquid crystal medium, and wherein the concentration of polymerizable compounds in the liquid crystal medium is >0 to <5 wt. %.

2. The liquid crystal display of claim 1, wherein one of the electrodes has a comb-shaped structure and the other electrode is unstructured.

3. The liquid crystal display of claim 1, wherein the alignment layer comprises a polyimide.

4. The liquid crystal display of claim 1, wherein the polymerizable compounds are polymerized in the liquid crystal display.

5. The liquid crystal display of claim 1, wherein the liquid crystal medium further comprises one or more compounds selected from formula AY which differ from compounds of formulae PY1-PY8:

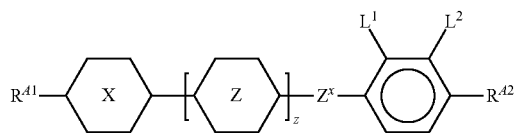

in which the individual radicals, on each occurrence identically or differently, each, independently of one another, have the following meaning:

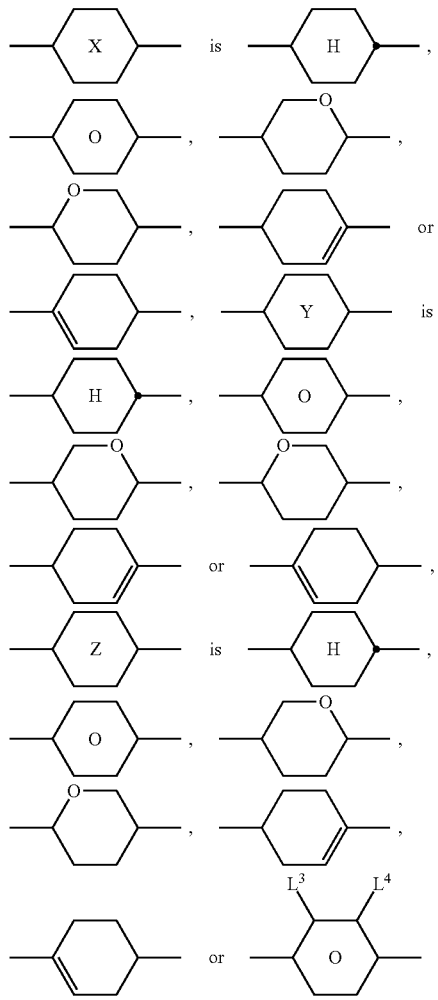

$R^{A1}$ is alkenyl having 2 to 9 C atoms or, if at least one of the rings X, Y and Z denotes cyclohexenyl, $R^{A1}$ can also be alkyl having 1 to 12 C atoms, in which, in addition, one or two non-adjacent $CH_2$ groups may each be replaced by —O—, —CH=CH—, —CO—, —OCO— or —COO— in such a way that O atoms are not linked directly to one another, $R^{A2}$ alkyl having 1 to 12 C atoms, in which, in addition, one or two non-adjacent $CH_2$ groups may each be replaced by —O—, —CH=CH—, —CO—, —OCO— or —COO— in such a way that O atoms are not linked directly to one another, $Z^x$ —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$—, or a single bond, $L^{1-4}$ each, independently of one another, H, F, Cl, $OCF_3$, $CF_3$, $CH_3$, $CH_2F$ or $CHF_2H$, x 1 or 2, and z 0 or 1.

6. The liquid crystal display of claim 1, wherein the liquid crystal medium comprises one or more compounds selected from the following formulae:

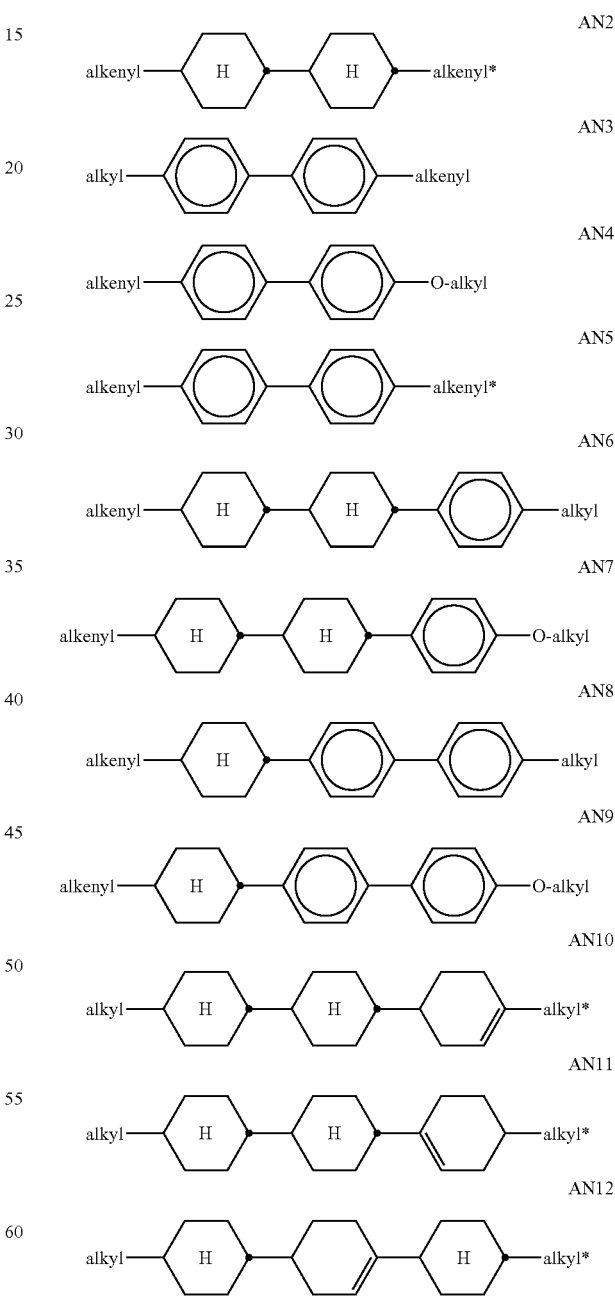

in which alkyl denotes a straight-chain alkyl radical having 1-6 C atoms, and alkenyl and alkenyl* each, independently of one another, denote a straight-chain alkenyl radical having 2-7 C atoms.

7. The liquid crystal display of claim 6, wherein the liquid crystal medium comprises one or more compounds selected from the following formulae:

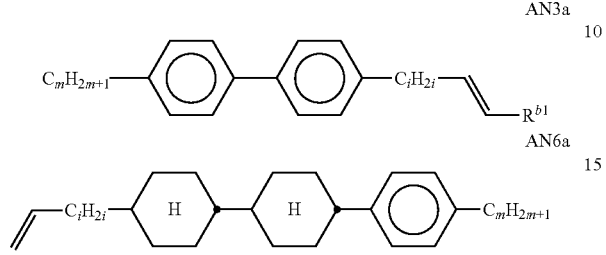
AN3a
AN6a in which
m denotes 1, 2, 3, 4, 5 or 6,
i denotes 0, 1, 2 or 3, and
$R^{b1}$ denotes H, $CH_3$ or $C_2H_5$.

8. The liquid crystal display of claim 1, wherein the liquid crystal medium comprises one or more compounds selected from the following formulae:

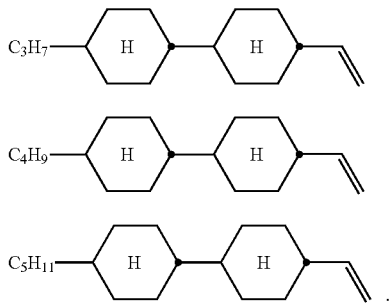
AN1a1
AN1a2
AN1a3

9. The liquid crystal display of claim 1, wherein the liquid crystal medium comprises one or more compounds selected from the following formulae:

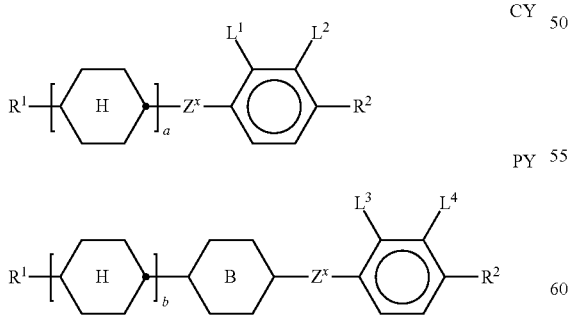
CY
PY in which the individual radicals have the following meanings:
a denotes 1 or 2,
b denotes 0 or 1,

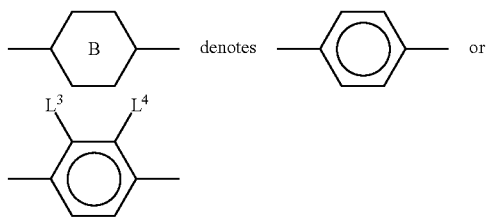

$R^1$ and $R^2$ each, independently of one another, denote alkyl having 1 to 12 C atoms, where, in addition, one or two non-adjacent $CH_2$ groups may each be replaced by —O—, —CH=CH—, —CO—, —O—CO— or —CO—O— in such a way that O atoms are not linked directly to one another, $Z^x$ denotes —CH=CH—, —$CH_2$O—, —O$CH_2$—, —$CF_2$O—, —O$CF_2$—, —O—, —$CH_2$—, —$CH_2CH_2$— or a single bond, and $L^{1-4}$ each, independently of one another, denote F, Cl, $OCF_3$, $CF_3$, $CH_3$, $CH_2F$, $CHF_2$.

10. The liquid crystal display of claim 1, wherein the liquid crystal medium further comprises one or more compounds selected from the following formula:

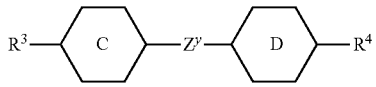
ZK in which the individual radicals have the following meanings:

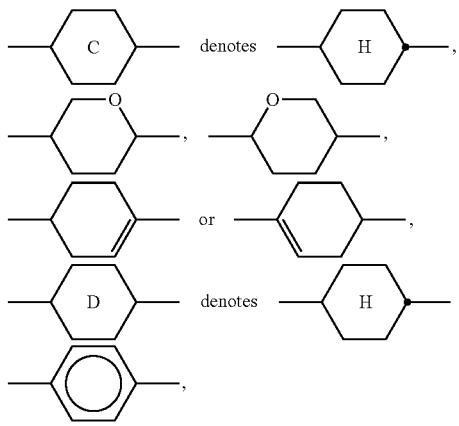

$R^3$ and $R^4$ each, independently of one another, denote alkyl having 1 to 12 C atoms, in which, in addition, one or two non-adjacent $CH_2$ groups may each be replaced by —O—, —CH=CH—, —CO—, —O—CO— or —CO—O— in such a way that O atoms are not linked directly to one another, and $Z^y$ denotes —$CH_2CH_2$—, —CH=CH—, —$CF_2$O—, —O$CF_2$—, —$CH_2$O—, —O$CH_2$—, —COO—, —OCO—, —$C_2F_4$—, —CF=CF— or a single bond.

11. The liquid crystal display of claim 1, wherein the liquid crystal medium comprises one or more polymerizable compounds selected from the following formula $R^a$-$A^1$-$(Z^1$-$A^2)_{m1}$-$R^b$         I* in which the individual radicals have the following meanings:

$R^a$ and $R^b$ each, independently of one another, denote P, P-Sp-, H, halogen, SF$_5$, NO$_2$, a carbyl group or a hydrocarbyl group, P on each occurrence, identically or differently, denotes a polymerizable group, Sp on each occurrence, identically or differently, denotes a spacer group or a single bond, $A^1$ and $A^2$ each, independently of one another, denote an aromatic, heteroaromatic, alicyclic or heterocyclic group, which may also contain fused rings, and which is optionally mono- or polysubstituted by L, $Z^1$ on each occurrence, identically or differently, denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^0$R$^{00}$ or a single bond, L denotes P, P-Sp-, H, OH, CH$_2$OH, halogen, SF$_5$, NO$_2$, a carbyl group or hydrocarbyl group, R$^0$ and R$^{00}$ each, independently of one another, denote H or alkyl having 1 to 12 C atoms, m1 denotes 0, 1, 2, 3 or 4, and n1 denotes 1, 2, 3 or 4, wherein at least one of the radicals $R^a$, $R^b$ and L denotes or contains a group P or P-Sp-.

12. The liquid crystal display of claim 11, wherein in the polymerizable compounds of formula I*

$A^1$ and $A^2$ each, independently of one another, denote 1,4-phenylene, 1,3-phenylene, 1,2-phenylene, naphthalene-1,4-diyl, naphthalene2,6-diyl, phenanthrene-2,7-diyl, anthracene-2,7-diyl, or fluorene-2,7-diyl, in which, in addition, one or more CH groups in these groups may each be replaced by N, cyclohexane-1,4-diyl, in which, in addition, one or more non-adjacent CH$_2$ groups may each be replaced by O or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl, octahydro-4,7-methanoindane-2,5-diyl, 9,10-dihydro-phenanthrene-2,7-diyl, 2H-chromen-2-one-3,6-diyl, 2H-chromen-2-one-3,8-diyl, or 2H-chromen-2-one-3,7-diyl, where all these groups may be unsubstituted or mono- or polysubstituted by L, L denotes P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, straight-chain or branched alkyl or alkoxy having 1 to 25 C atoms, or straight-chain or branched alkenyl, alkinyl, alkylcarbonyl, alkoxycarbonyl, alkylcarbonyloxy or alkoxycarbonyloxy having 2 to 25 C atoms, wherein in all of these groups, in addition, one or more H atoms may each be replaced by F, Cl or P-Sp-, Y$^1$ denotes halogen, R$^x$ denotes P, P-Sp-, H, halogen, straight-chain, branched or cyclic alkyl having 1 to 25 C atoms, in which, in addition, one or more non-adjacent CH$_2$ groups may each be replaced by —O—, —S—, —CO—, —CO—O—, —O—CO—, or —O—CO—O— in such a way that O and/or S atoms are not linked directly to one another, and in which, in addition, one or more H atoms may each be replaced by F, Cl or P-Sp-, an optionally substituted aryl or aryloxy group having 6 to 40 C atoms, or an optionally substituted heteroaryl or heteroaryloxy group having 2 to 40 C atoms, where at least one of the radicals $R^a$, $R^b$ and L denotes P or P-Sp-.

13. The liquid crystal display of claim 1, wherein the polymerizable compounds are selected from the following formulae

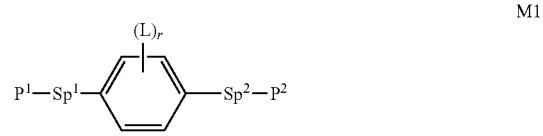

M1

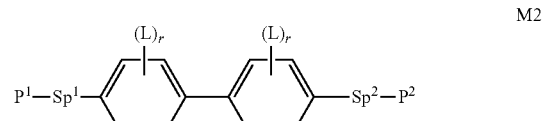

M2

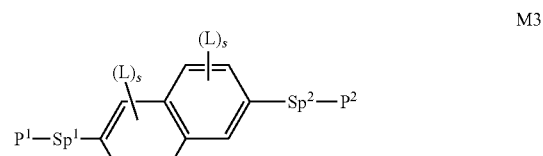

M3

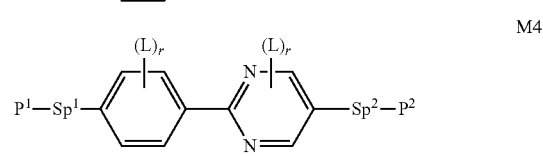

M4

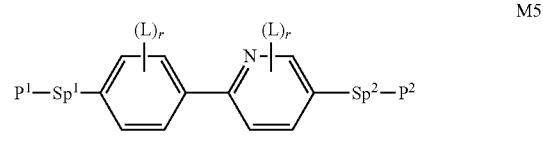

M5

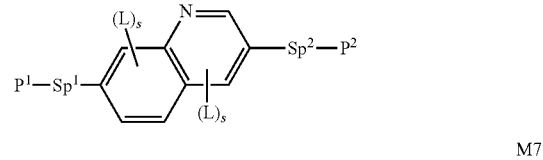

M6

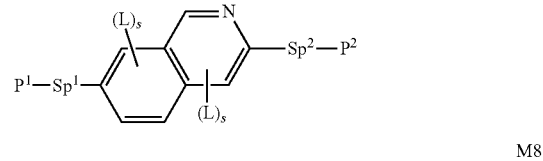

M7

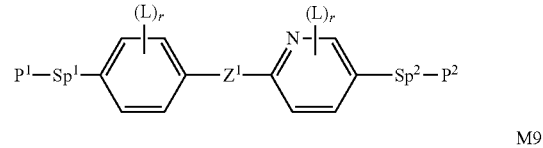

M8

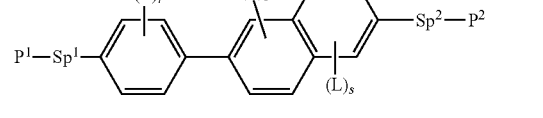

M9

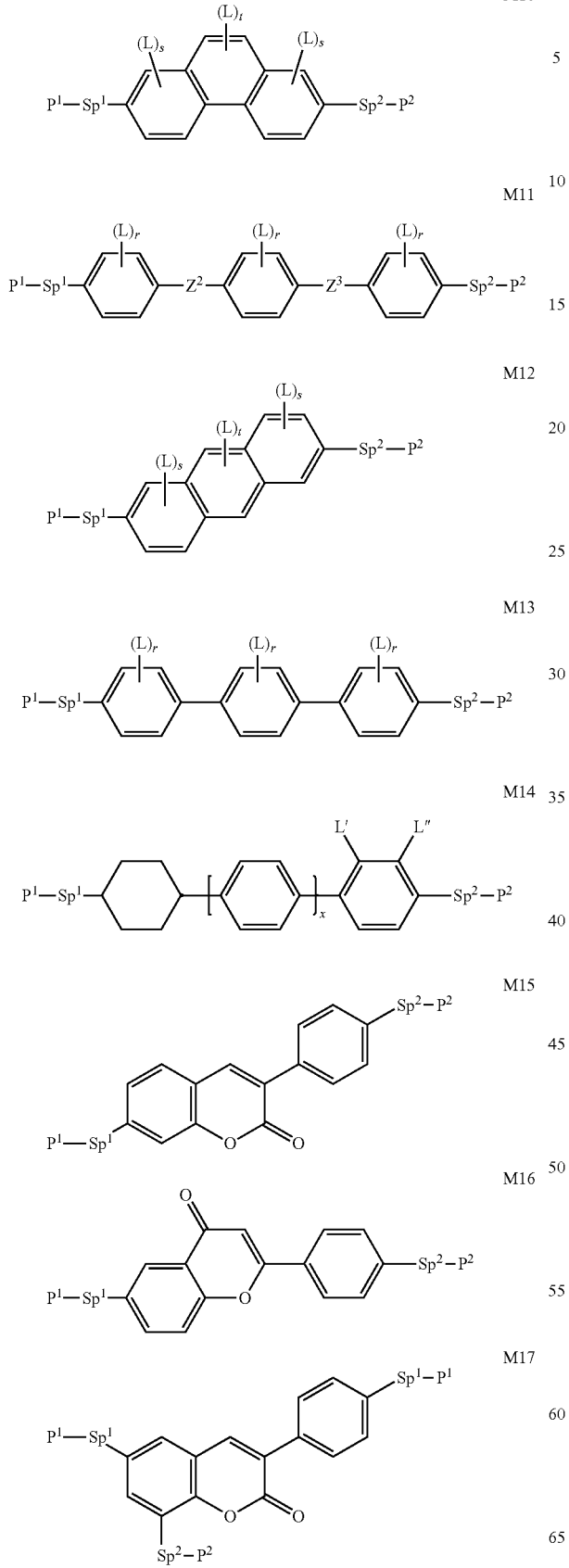
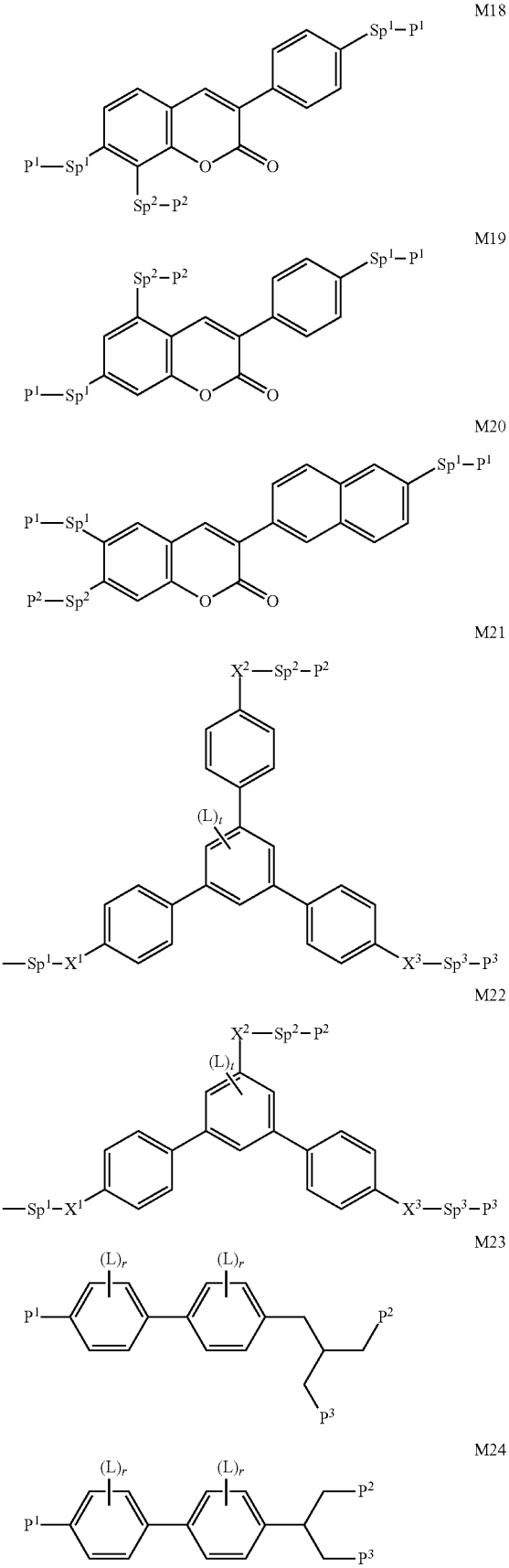

-continued

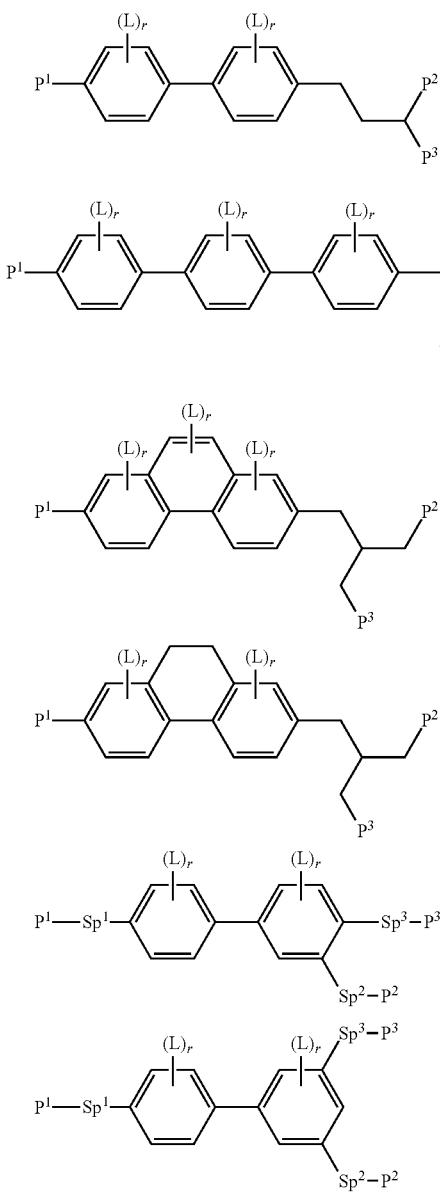

in which the individual radicals have the following meanings:

P¹, P² and P³ each, independently of one another, denote a polymerizable group,

Sp¹, Sp² and Sp³ each, independently of one another, denote a single bond or a spacer group of the formula Sp'-X', where, in addition, one or more of the radicals P¹-Sp¹-, P¹-Sp²- and P³-Sp³- may denote $R^{aa}$, with the proviso that at least one of the radicals P¹-Sp¹-, P²-Sp² and P³-Sp³- present is different from $R^{aa}$, Sp' denotes straight-chain or branched alkylene having 1 to 20 C atoms, which is optionally mono- or polysubstituted by F, Cl, Br, I, CN or P, and in which, in addition, one or more non-adjacent CH₂ groups may each be replaced, independently of one another, by —O—, —S—, —NH—, —N(R⁰)—, —Si(R⁰⁰R⁰⁰⁰)—, —CO—, —CO—O—, —O—CO—, —O—CO—O—, —S—CO—, —CO—S—, —N(R⁰⁰)—CO—O—, —O—CO—N(R⁰⁰)—, —N(R⁰⁰)—CO—N(R⁰⁰)—, —CH=CH— or —C≡C— in such a way that O and/or S atoms are not linked directly to one another, X' denotes —O—, —S—, —CO—, —CO—O—, —O—CO—, —O—CO—O—, —CO—N(R⁰⁰)—, —N(R⁰⁰)—CO—, —N(R⁰⁰)—CO—N(R⁰⁰)—, —OCH₂—, —CH₂O—, —SCH₂—, —CH₂S—, —CF₂O—, —OCF₂—, —CF₂S—, —SCF₂—, —CF₂CH₂—, —CH₂CF₂—, —CF₂CF₂—, —CH=N—, —N=CH—, —N=N—, —CH=CR⁰—, —CY²=CY³—, —C≡C—, —CH=CH—CO—O—, —O—CO—CH=CH— or a single bond, wherein X' denotes a single bond if it is adjacent to an ester group, $R^{aa}$ denotes H, F, Cl, CN or straight-chain or branched alkyl having 1 to 25 C atoms, in which, in addition, one or more non-adjacent CH₂ groups may each be replaced, independently of one another, by C(R⁰)=C(R⁰⁰)—, —C≡C—, —N(R⁰)—, —O—, —S—, —CO—, —CO—O—, —O—CO—, or —O—CO—O— in such a way that O and/or S atoms are not linked directly to one another, and in which, in addition, one or more H atoms may be replaced by F, Cl, CN or P¹-Sp¹, R⁰, R⁰⁰ each, independently of one another and identically or differently on each occurrence, denote H or alkyl having 1 to 12 C atoms, X¹, X² and X³ each, independently of one another, denote —CO—O—, —O—CO— or a single bond, Z¹ denotes —O—, —CO—, —C(RʸRᶻ)— or —CF₂CF₂—, Rʸ and Rᶻ each, independently of one another, denote H, F, CH₃ or CF₃, Z² and Z³ each, independently of one another, denote —CO—O—, —O—CO—, —CH₂O—, —OCH₂—, —CF₂O—, —OCF₂— or —(CH₂)ₙ—, where n is 2, 3 or 4, L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, L' and L" each, independently of one another, denote H, F or Cl, r denotes 0, 1, 2, 3 or 4, s denotes 0, 1, 2 or 3, t denotes 0, 1 or 2, and x denotes 0 or 1.

14. The liquid crystal display of claim 1, wherein the liquid crystal medium comprises one or more polymerizable compounds selected from the following formulae:

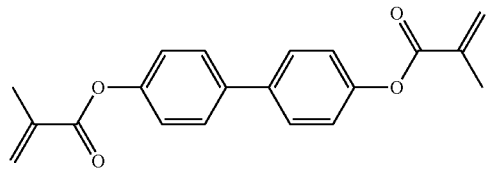 [SMILES: C=C(C)C(=O)Oc1ccc(-c2ccc(OC(=O)C(=C)C)cc2)cc1]
RM-1

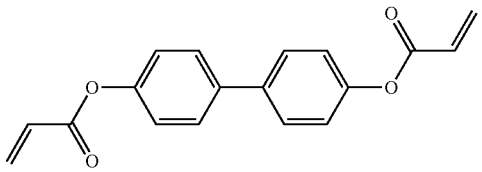
RM-2

-continued
RM-3
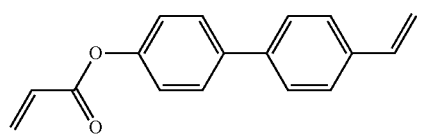
RM-4
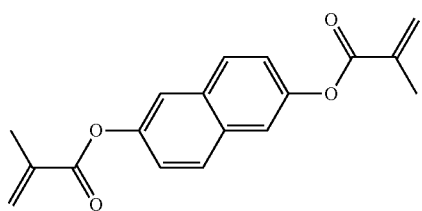
RM-5
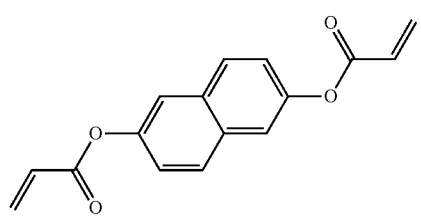
RM-6
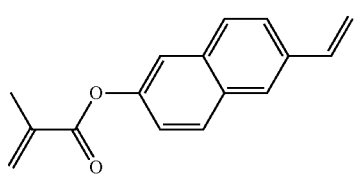
RM-7
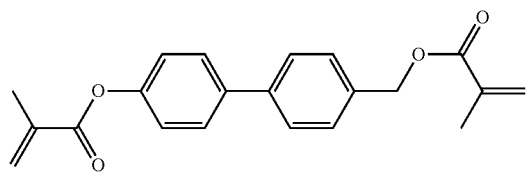
RM-8
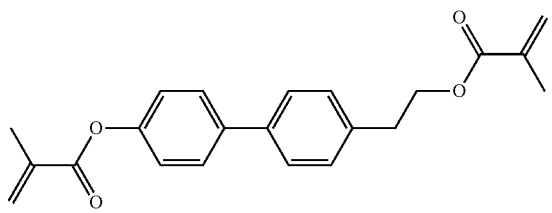
RM-9
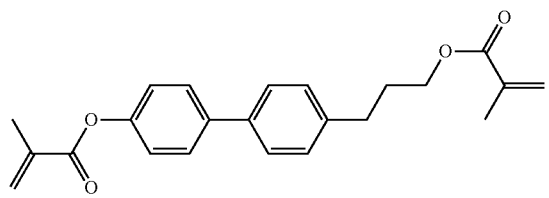
RM-10
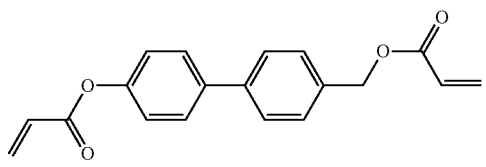
RM-11
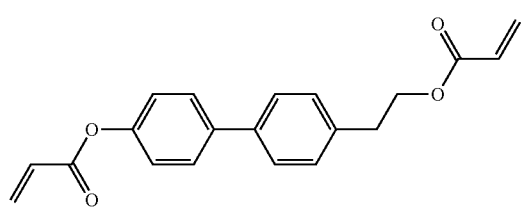
RM-12
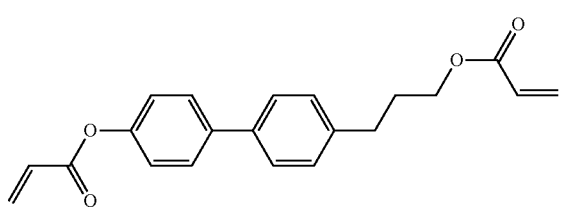
RM-13
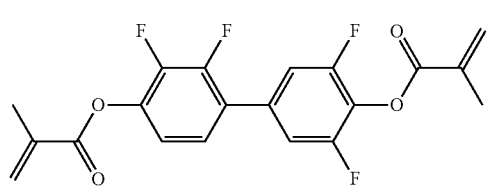
RM-14
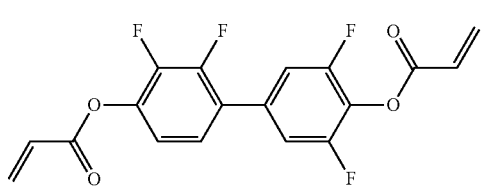
RM-15
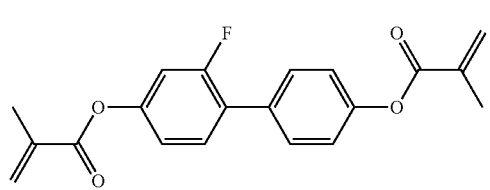
RM-16
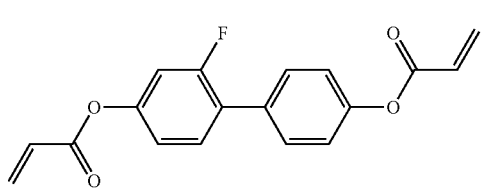

-continued
RM-17 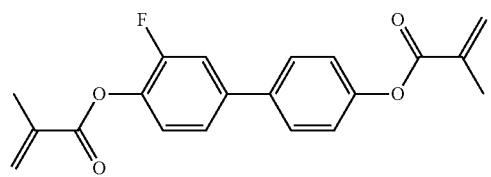
RM-18 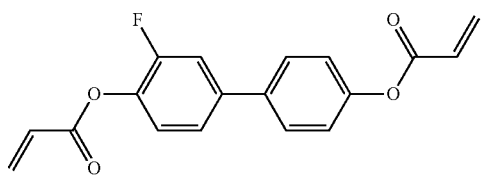
RM-19 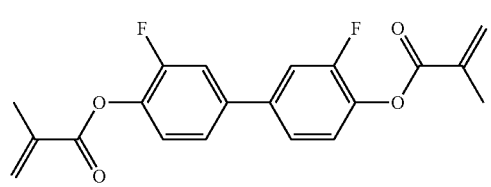
RM-20 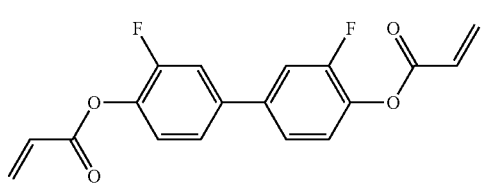
RM-21 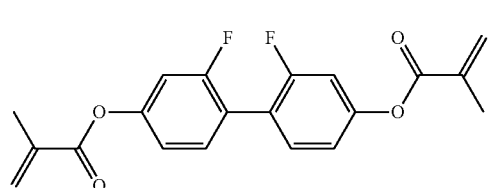
RM-22 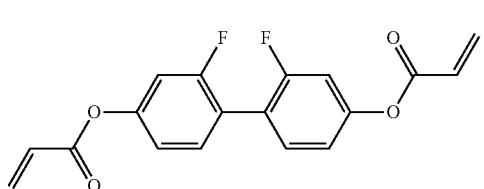
RM-23 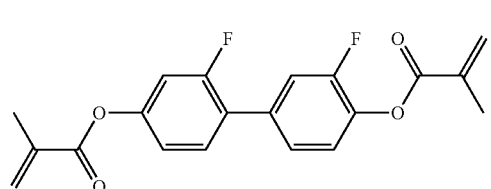
RM-24 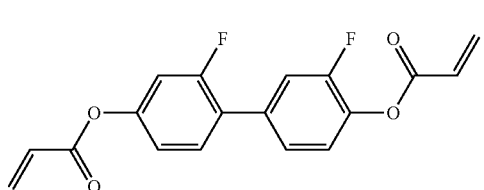
RM-25 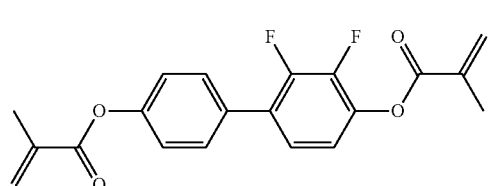
RM-26 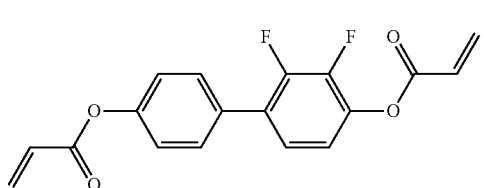
RM-27 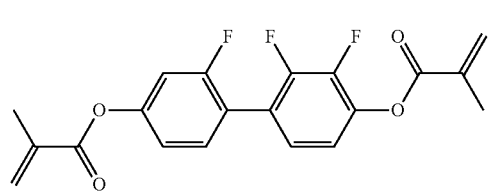
RM-28 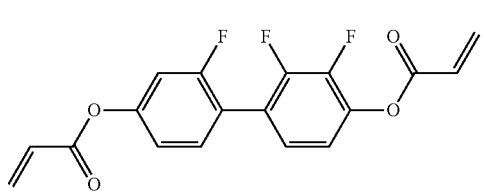
RM-29 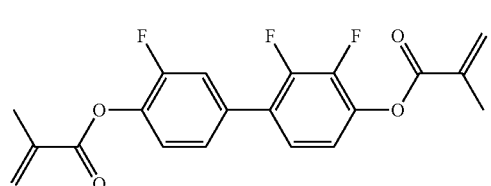
RM-30 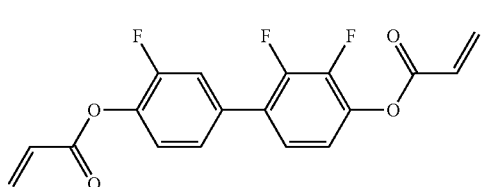
RM-31 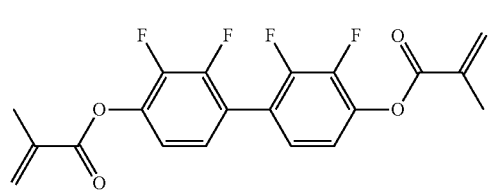
RM-32 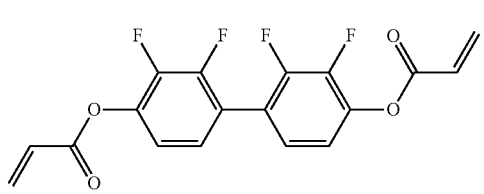

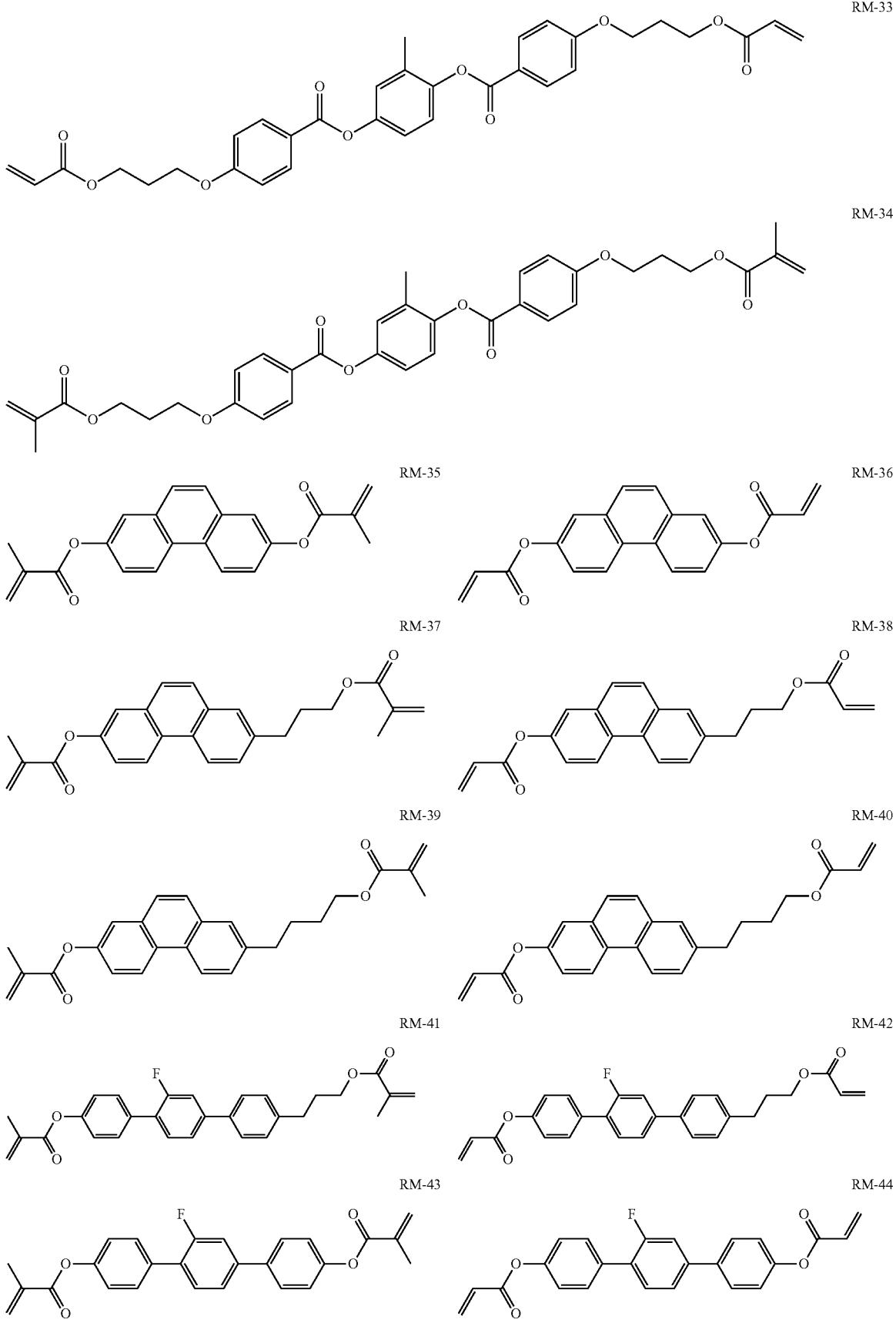

-continued
RM-45
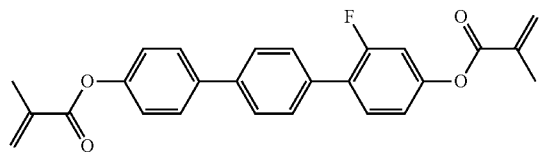
RM-46
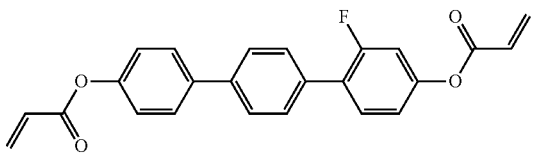
RM-47
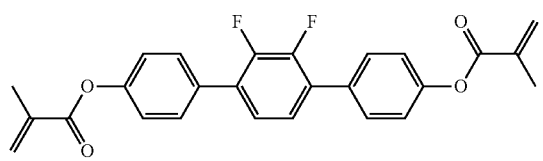
RM-48
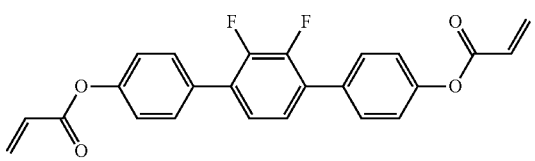
RM-49
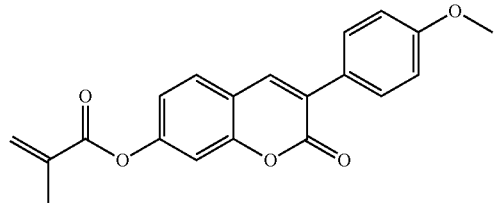
RM-50
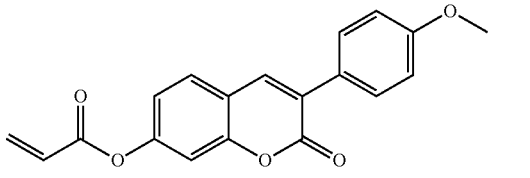
RM-51
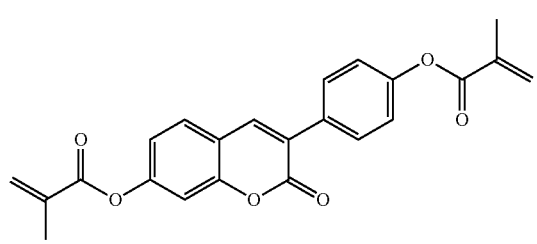
RM-52
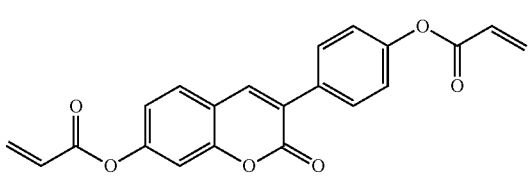
RM-53
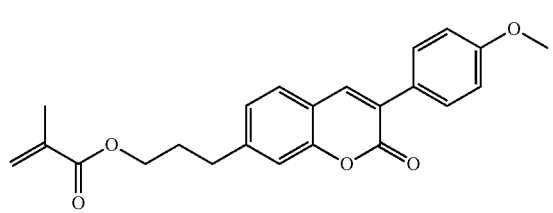
RM-54
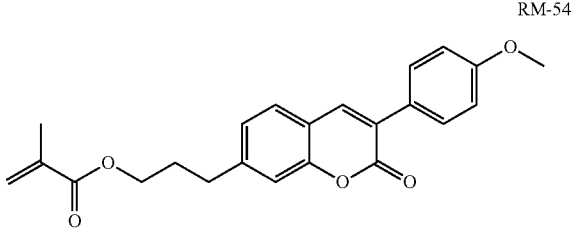
RM-55
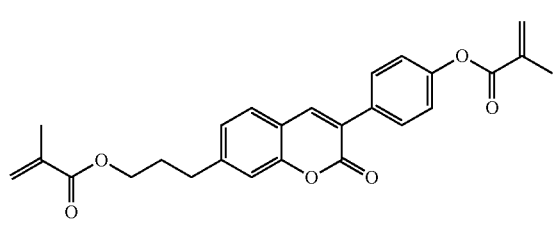
RM-56
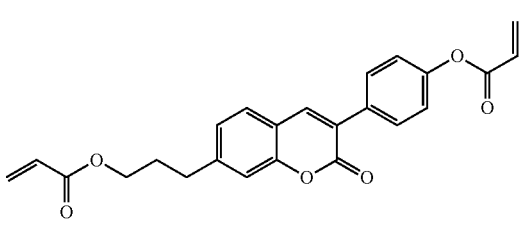
RM-57
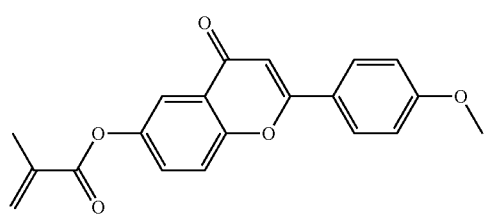
RM-58
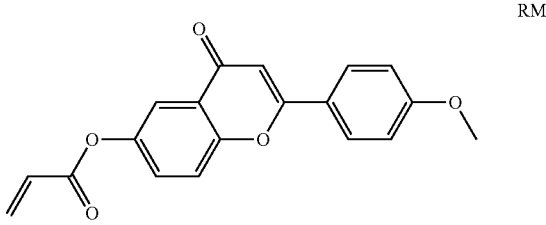

-continued
RM-59
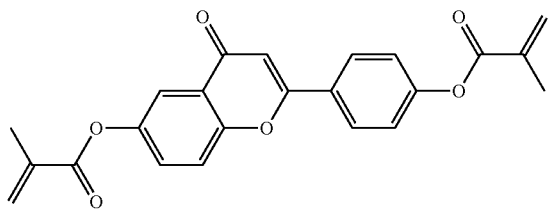
RM-60
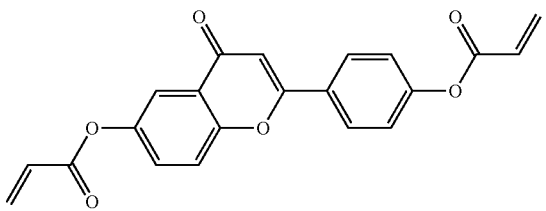
RM-61
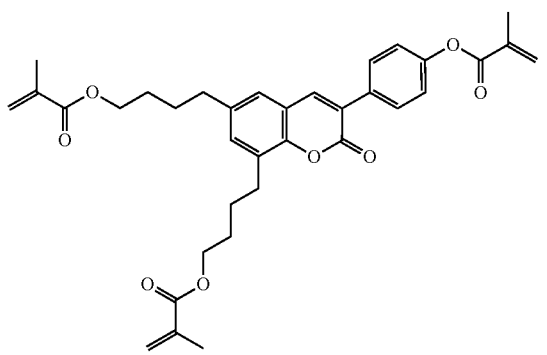
RM-62
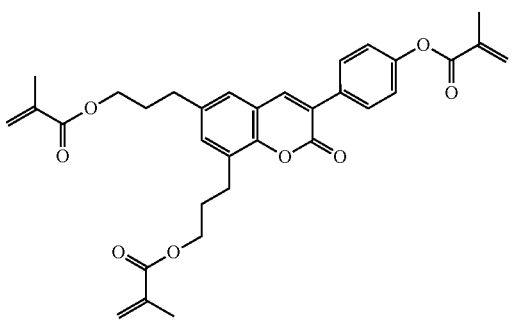 [SMILES: C=C(C)C(=O)OCCCc1cc(CCCOC(=O)C(=C)C)c2oc(=O)c(-c3ccc(OC(=O)C(=C)C)cc3)cc2c1]
RM-63
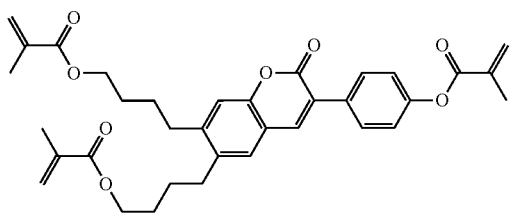
RM-64
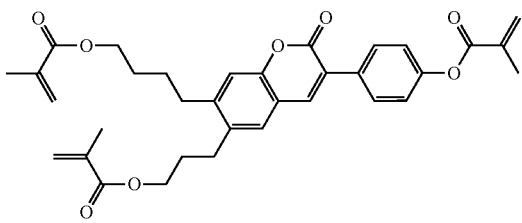
RM-65
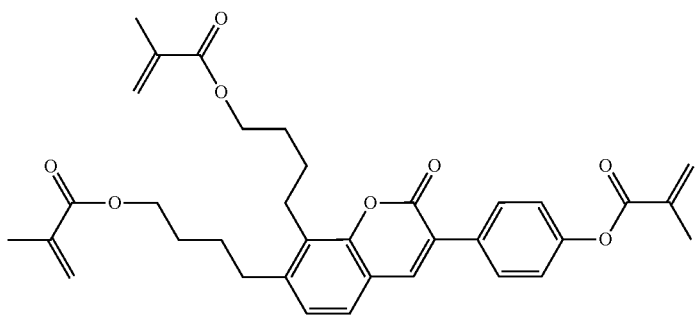
RM-66
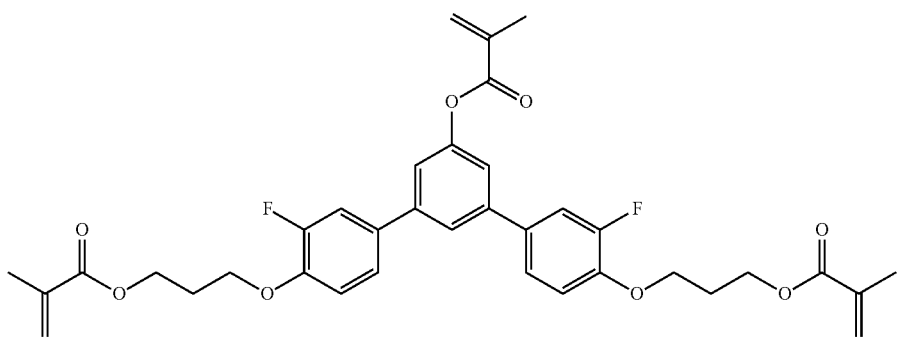

-continued
RM-67
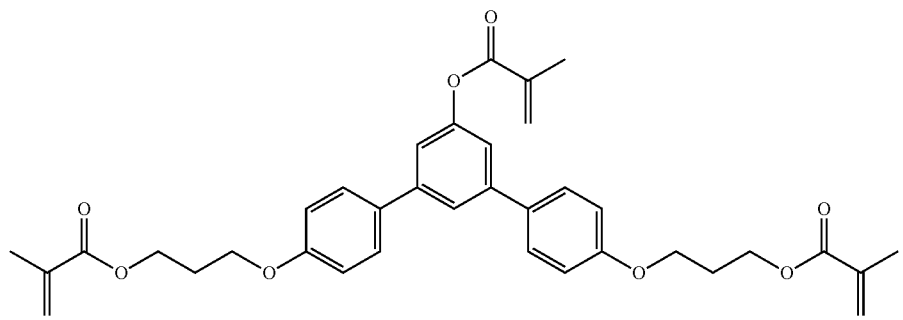
RM-68
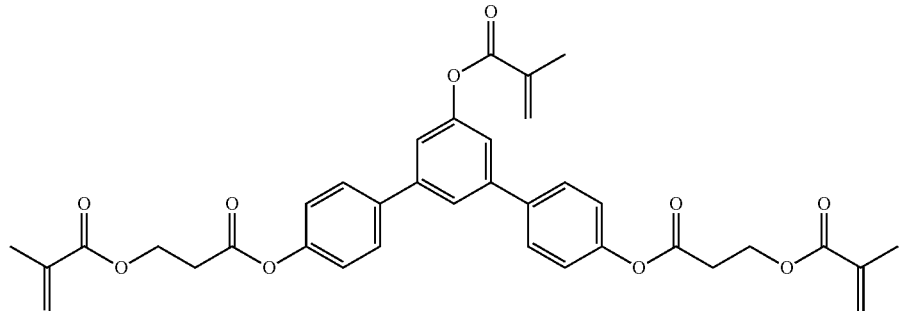
RM-69
RM-70
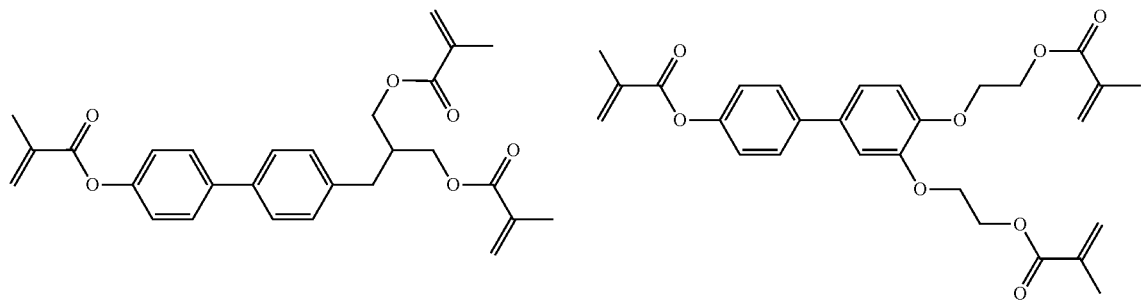
RM-71
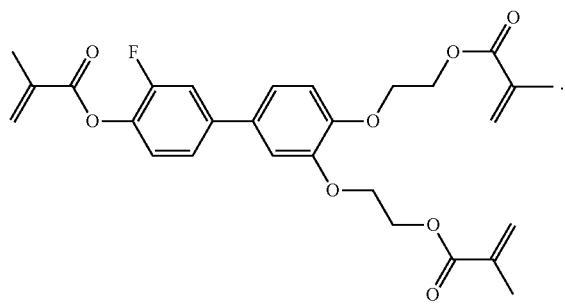
15. The liquid crystal display of claim 1, wherein the liquid crystal medium contains at least one chiral dopant selected from the following compounds:
C 15
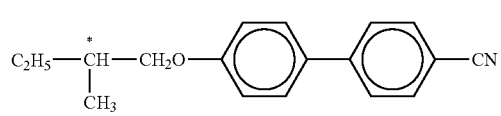
CB 15
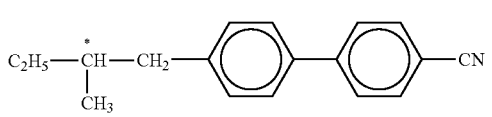

-continued
CM 21
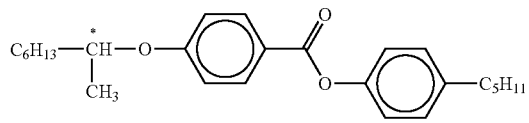
R/S-811
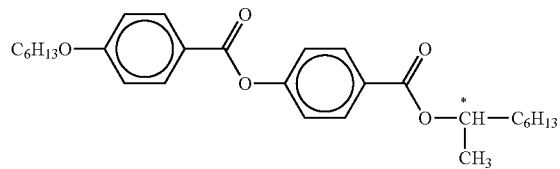
CM 44
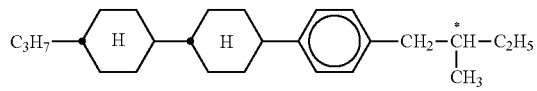
CM 45
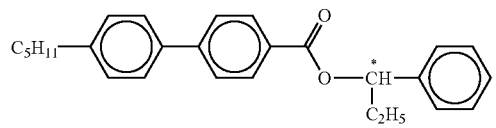
CM 47
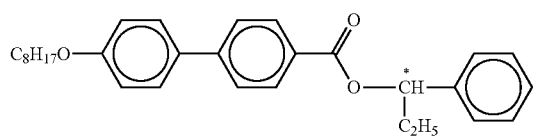
CN
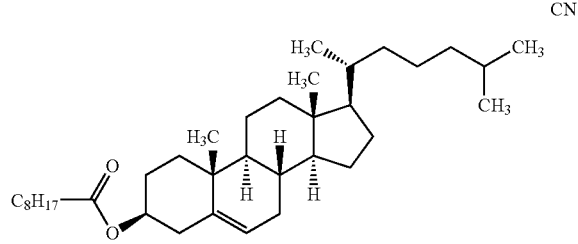
R/S-2011
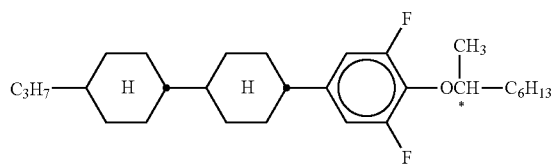
R/S-3011
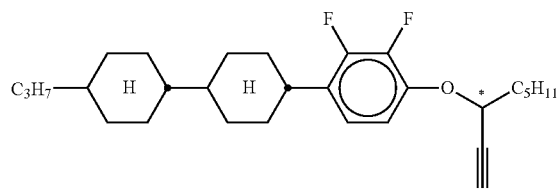
R/S-4011
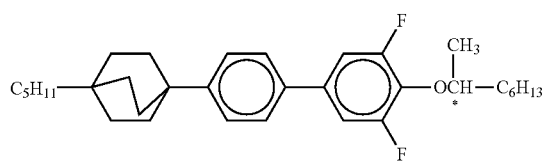
R/S-5011
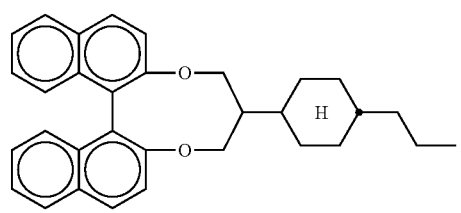
R/S-1011
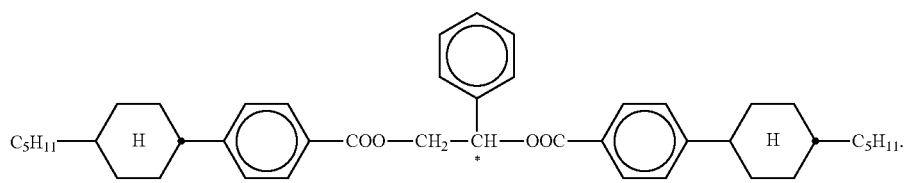
16. The liquid crystal display of claim 1, wherein the liquid crystal medium contains at least one stabilizer selected from the following formulae:
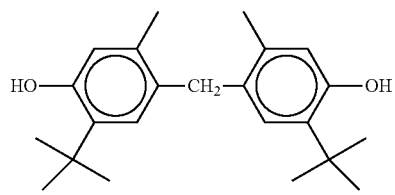
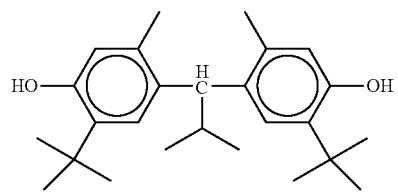

-continued
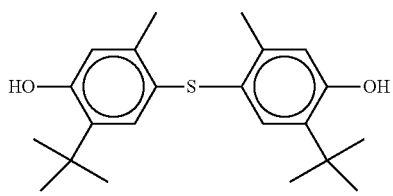
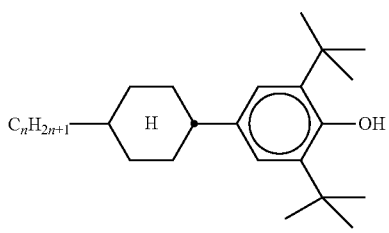
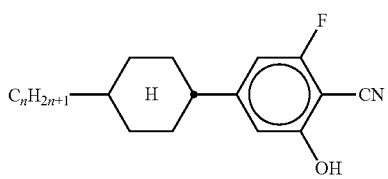
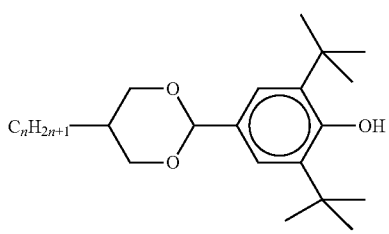
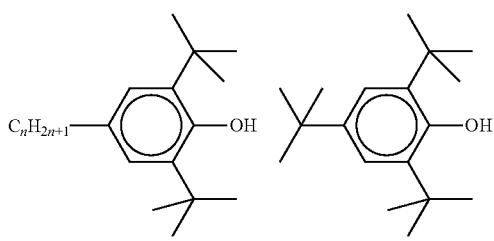
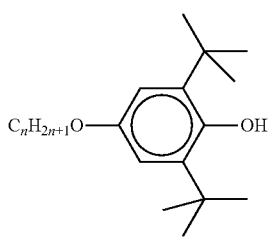
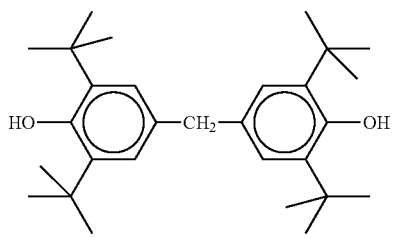
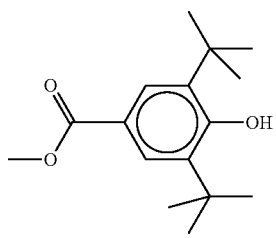
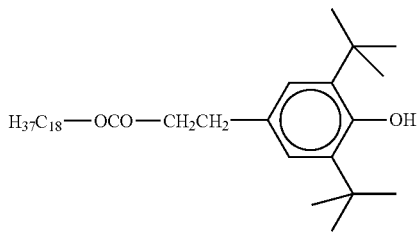
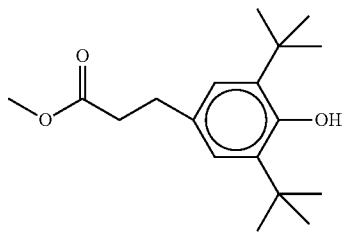
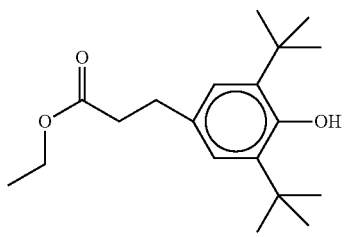
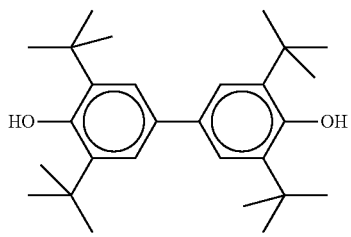

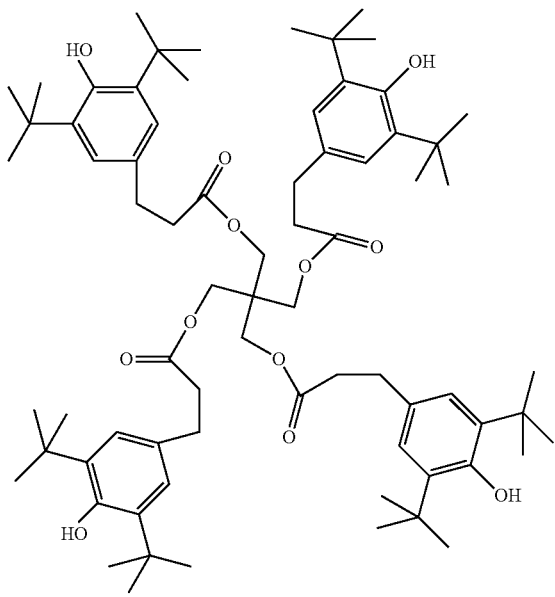
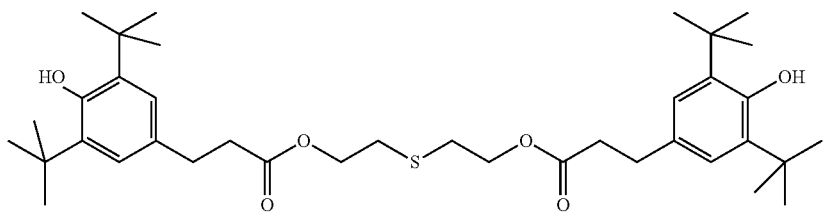
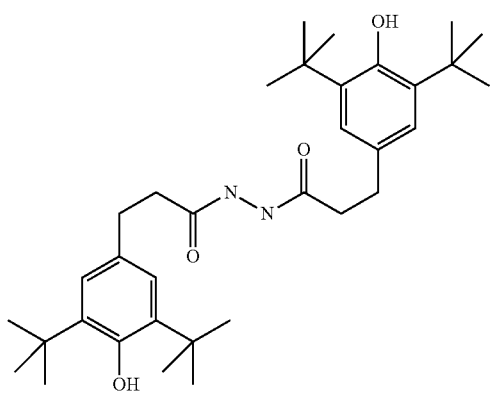
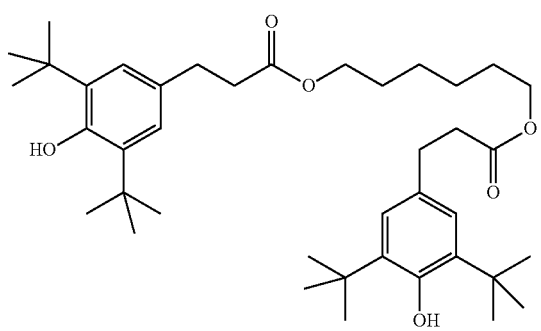

155
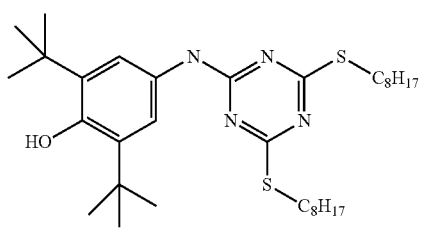
156
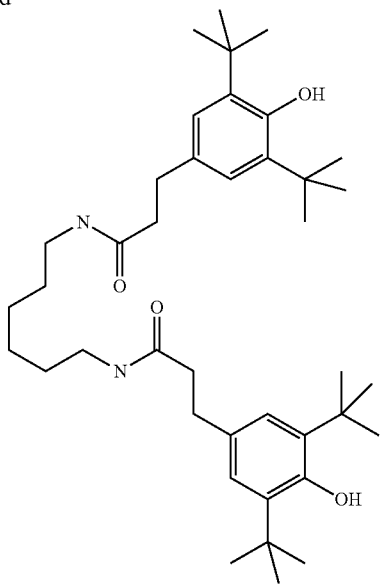
-continued
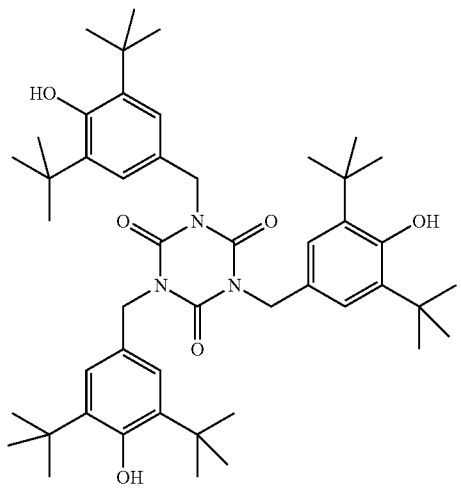
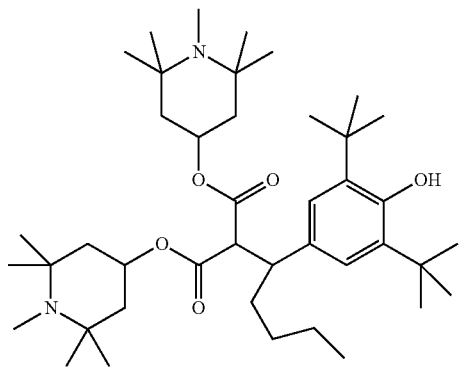
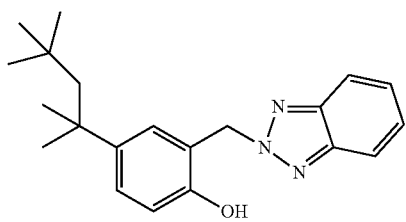
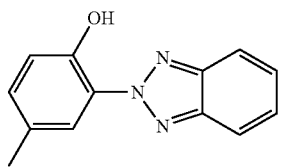
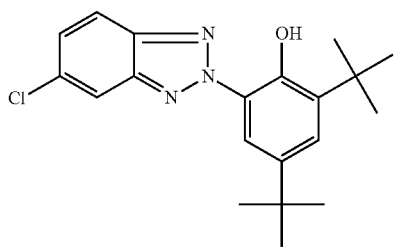
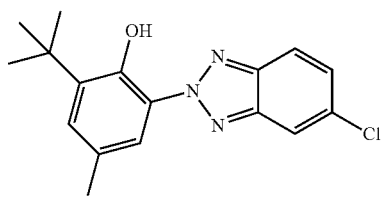

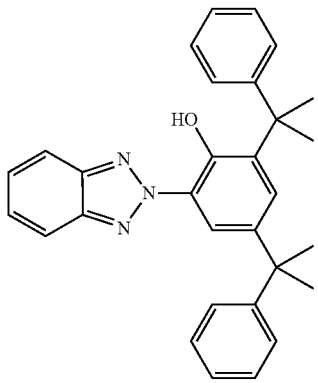
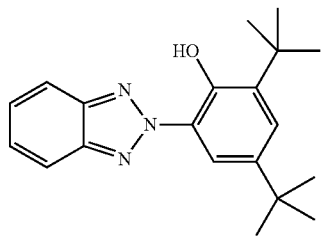
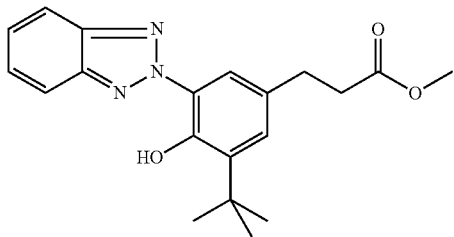
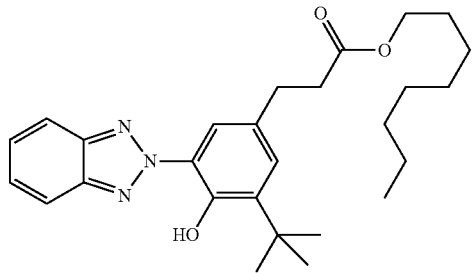
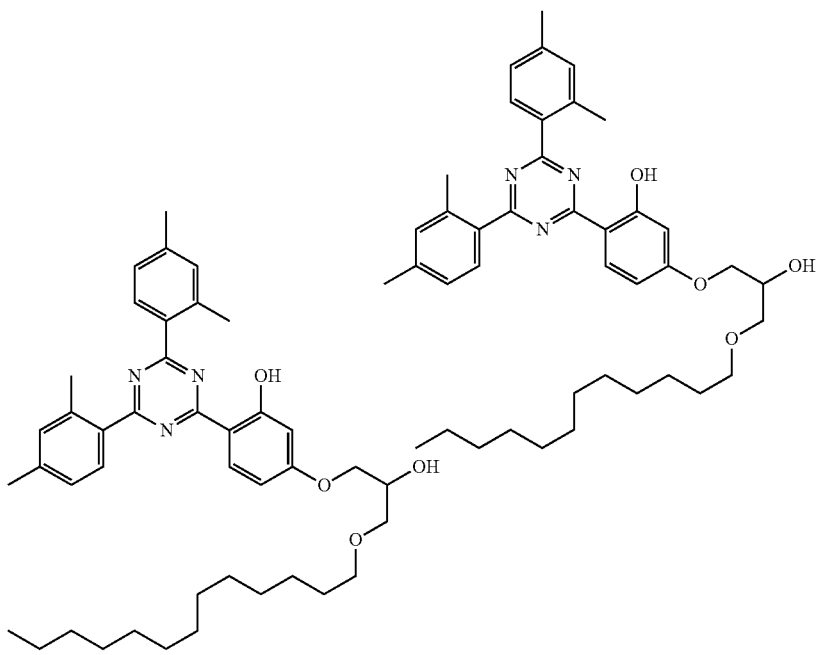

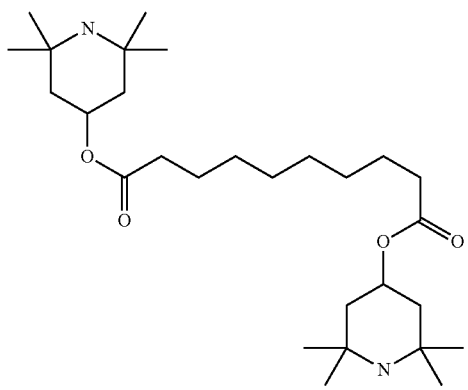
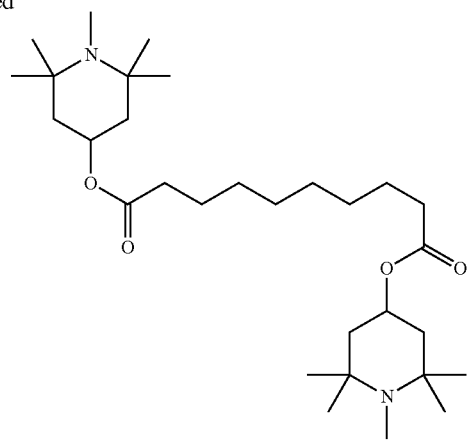

wherein n denotes an integer from 1 to 12.

17. A process for the production of a liquid crystal display according to claim 1, comprising:
filling said liquid crystal medium between the substrates of the display, and
polymerizing the polymerizable compounds.

18. The liquid crystal display according to claim 5, wherein $Z^x$ is a single bond, and $L^{1-4}$ are each, independently of one another, H, F or Cl.

19. The liquid crystal display of claim 6, wherein alkenyl and alkenyl* each, independently of one another, denote $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—.

20. The liquid crystal display according to claim 9, wherein $Z^x$ is a single bond.

21. The liquid crystal display according to claim 11, wherein P on each occurrence, identically or differently, denotes an acrylate or methacrylate group.

22. The liquid crystal display according to claim 13, wherein
$P^1$, $P^2$ and $P^3$ each, independently of one another, denote an acrylate or methacrylate groups, and
$Sp^1$, $Sp^2$ and $Sp^3$ each, independently of one another, denote a single bond or —(CH$_2$)$_{p1}$—, —(CH$_2$)$_{p1}$—O—, —(CH$_2$)$_{p1}$—CO—O—, —(CH$_2$)$_{p1}$—O—CO— or —(CH$_2$)$_{p1}$—O—CO—O—, in which p1 is an integer from 1 to 12, where, in addition, one or more of the radicals $P^1$-$Sp^1$-, $P^1$-$Sp^2$- and $P^3$-$Sp^3$- may denote $R^{aa}$, with the proviso that at least one of the radicals $P^1$-$Sp^1$-, $P^2$-$Sp^2$ and $P^3$-$Sp^3$- present is different from $R^{aa}$.

23. The liquid crystal display according to claim 1, wherein the liquid crystal medium comprises a compound of the following formula:

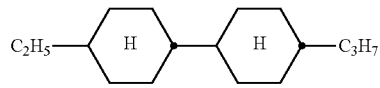

wherein the propyl is a straight-chain groups.

24. The liquid crystal display according to claim 1, wherein the liquid crystal medium comprises one or more compounds of formula T2:

T2

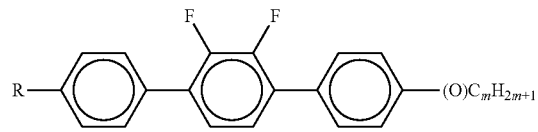

wherein (O) denotes an oxygen atom or a single bond, and m denotes an integer from 1 to 6.

25. The liquid crystal display according to claim 1, wherein the liquid crystal medium comprises a compound of the following formula:

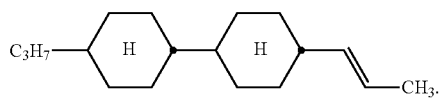

26. The liquid crystal display according to claim 1, wherein the liquid crystal medium comprises one or more compounds of formulas CY30 and/or CY32:

CY30

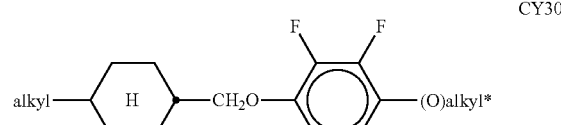

CY32

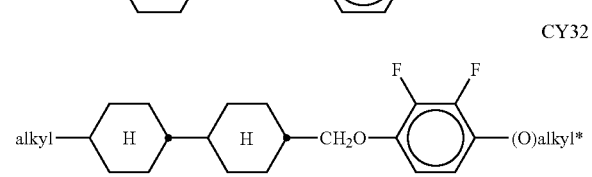

wherein
alkyl and alkyl* each, independently of one another, denote a straight-chain alkyl radical having 1-6 C atoms, and
(O) denotes an oxygen atom or a single bond.

27. The liquid crystal display according to claim 1, wherein said medium contains one or more polymerizable compounds selected from formulae M29 and M30

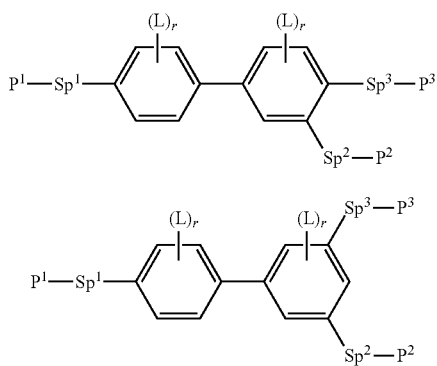

M29

M30 in which the individual radicals have the following meanings:

$P^1$, $P^2$ and $P^3$ each, independently of one another, denote a polymerizable group, $Sp^1$, $Sp^2$ and $Sp^3$ each, independently of one another, denote a single bond or a spacer group of the formula Sp'-X', where, in addition, one or more of the radicals $P^1$-$Sp^1$-, $P^1$-$Sp^2$- and $P^3$-$Sp^3$- may denote $R^{aa}$, with the proviso that at least one of the radicals $P^1$-$Sp^1$-, $P^2$-$Sp^2$ and $P^3$-$Sp^3$- present is different from $R^{aa}$, Sp' denotes straight-chain or branched alkylene having 1 to 20 C atoms, which is optionally mono- or polysubstituted by F, Cl, Br, I, CN or P, and in which, in addition, one or more non-adjacent $CH_2$ groups may each be replaced, independently of one another, by —O—, —S—, —NH—, —N($R^0$)—, —Si($R^{00}R^{000}$)—, —CO—, —CO—O—, —O—CO—, —O—CO—O—, —S—CO—, —CO—S—, —N($R^{00}$)—CO—O—, —O—CO—N($R^{00}$)—, —N($R^{00}$)—CO—N($R^{00}$)—, —CH=CH— or —C≡C— in such a way that O and/or S atoms are not linked directly to one another, X' denotes —O—, —S—, —CO—, —CO—O—, —O—CO—, —O—CO—O—, —CO—N($R^{00}$)—, —N($R^{00}$)—CO—, —N($R^{00}$)—CO—N($R^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond, wherein X' denotes a single bond if it is adjacent to an ester group, $R^{aa}$ denotes H, F, Cl, CN or straight-chain or branched alkyl having 1 to 25 C atoms, in which, in addition, one or more non-adjacent $CH_2$ groups may each be replaced, independently of one another, by C($R^0$)=C($R^{00}$)—, —C≡C—, —N($R^0$)—, —O—, —S—, —CO—, —CO—O—, —O—CO—, or —O—CO—O— in such a way that O and/or S atoms are not linked directly to one another, and in which, in addition, one or more H atoms may be replaced by F, Cl, CN or $P^1$-$Sp^1$-, $R^0$, $R^{00}$ each, independently of one another and identically or differently on each occurrence, denote H or alkyl having 1 to 12 C atoms, $X^1$, $X^2$ and $X^3$ each, independently of one another, denote —CO—O—, —O—CO— or a single bond, $Z^1$ denotes —O—, —CO—, —C($R^yR^z$)— or —CF$_2$CF$_2$—, $R^y$ and $R^z$ each, independently of one another, denote H, F, CH$_3$ or CF$_3$, $Z^2$ and $Z^3$ each, independently of one another, denote —CO—O—, —O—CO—, —CH$_2$O—, —OCH$_2$—, —CF$_2$O—, —OCF$_2$— or —(CH$_2$)$_n$—, where n is 2, 3 or 4, L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, L' and L" each, independently of one another, denote H, F or Cl, r denotes 0, 1, 2, 3 or 4, s denotes 0, 1, 2 or 3, t denotes 0, 1 or 2, and x denotes 0 or 1.

28. The liquid crystal display according to claim 27, wherein said medium contains one or more polymerizable compounds selected from formulae M70 and M71.

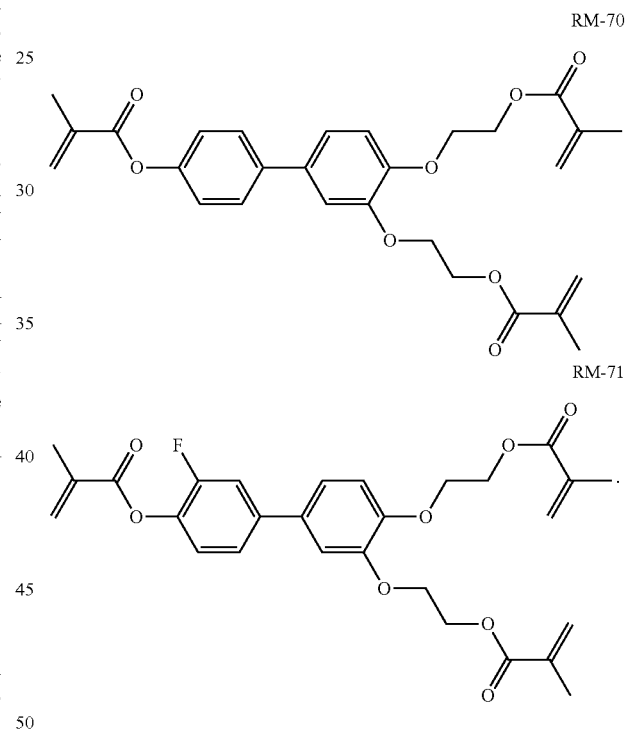

RM-70

RM-71

29. The liquid crystal display of claim 1, wherein the liquid crystal medium comprises one or more compounds selected from the following formula:

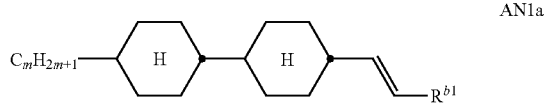

AN1a in which m denotes 1, 2, 3, 4, 5 or 6, and $R^{b1}$ denotes H, CH$_3$ or C$_2$H$_5$.

30. The liquid crystal display of claim 1, wherein the liquid crystal medium comprises one or more compounds selected from the following formula:

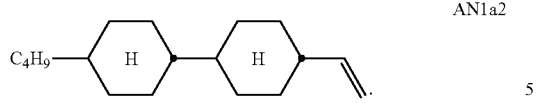
AN1a2

31. The liquid crystal display of claim 1, wherein the liquid crystal medium comprises one or more compounds selected from formula PY2.

32. The liquid crystal display of claim 31, wherein the liquid crystal medium as a whole contains 1 to 20% of compounds of formula PY2.

33. The liquid crystal display of claim 1, wherein said medium comprises one or more polymerizable compounds having three or more polymerizable groups.

* * * * *